US 10,473,455 B2

(12) United States Patent
Kuga

(10) Patent No.: US 10,473,455 B2
(45) Date of Patent: Nov. 12, 2019

(54) CONFOCAL DISPLACEMENT SENSOR

(71) Applicant: Keyence Corporation, Osaka (JP)

(72) Inventor: Shoma Kuga, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 16/282,333

(22) Filed: Feb. 22, 2019

(65) Prior Publication Data

US 2019/0186896 A1    Jun. 20, 2019

Related U.S. Application Data

(63) Continuation of application No. 15/989,215, filed on May 25, 2018, now Pat. No. 10,260,859, which is a
(Continued)

(30) Foreign Application Priority Data

Dec. 25, 2015  (JP) ................................ 2015-254804

(51) Int. Cl.
*G01B 11/06*    (2006.01)
*G01B 11/02*    (2006.01)
(Continued)

(52) U.S. Cl.
CPC .......... *G01B 11/0608* (2013.01); *G01B 11/00* (2013.01); *G01B 11/026* (2013.01); *G01D 5/268* (2013.01); *G01B 2210/50* (2013.01)

(58) Field of Classification Search
CPC ... G01B 11/0608; G01B 11/00; G01B 11/026; G01B 2210/50; G01D 5/268; G01J 3/0208; G01J 3/0243; G01J 3/14; G01J 2/2823
See application file for complete search history.

(56) References Cited

U.S. PATENT DOCUMENTS 3,788,741 A    1/1974  Buechler
4,585,349 A    4/1986  Gross et al.
(Continued)

FOREIGN PATENT DOCUMENTS

EP    2950039 A1    12/2015
JP    S62-144014 A    6/1987
(Continued)

OTHER PUBLICATIONS

International Search Report issued in corresponding International Patent Application No. PCT/JP2016/088008 dated Mar. 7, 2017 (4 pages).
(Continued)

*Primary Examiner* — Sang H Nguyen
(74) *Attorney, Agent, or Firm* — Kilyk & Bowersox, P.L.L.C.

(57) ABSTRACT

To provide a confocal displacement sensor capable of reducing a measurement error. Light having a plurality of wavelengths is emitted by a light processing section 120. A chromatic aberration along an optical axis direction is caused by a lens unit 220 in the light emitted by the light projecting section 120. The light having the chromatic aberration converged and irradiated on a measurement object S by the lens unit 220. In the light irradiated on the measurement object S by the lens unit 220, light having a wavelength reflected while focusing on the surface of the measurement object S passes through a plurality of pinholes. Displacement of the measurement object S is calculated by an arithmetic processing section 150 on the basis of signal intensity for each wavelength of an average signal corresponding to an average of intensities for each wavelength concerning a plurality of lights passed through the plurality of pinholes.

13 Claims, 32 Drawing Sheets

Related U.S. Application Data continuation of application No. PCT/JP2016/088008, filed on Dec. 21, 2016.

(51) Int. Cl.
   *G01D 5/26* (2006.01)
   *G01B 11/00* (2006.01)

(56) References Cited

U.S. PATENT DOCUMENTS

| | | | |
|---|---|---|---|
| 5,248,876 A * | 9/1993 | Kerstens | G01B 9/04 |
| | | | 250/201.3 |
| 5,737,084 A | 4/1998 | Ishihara | |
| 5,760,950 A | 6/1998 | Maly et al. | |
| 6,248,995 B1 | 6/2001 | Tanaami et al. | |
| 6,674,572 B1 | 1/2004 | Scheruebl et al. | |
| 7,283,306 B2 | 10/2007 | Mikuriya et al. | |
| 7,616,986 B2 | 11/2009 | Seibel et al. | |
| 8,194,240 B1 | 6/2012 | Vaez-Iravani et al. | |
| 10,161,740 B1 | 12/2018 | Takei et al. | |
| 2004/0051879 A1 | 3/2004 | Schick | |
| 2005/0030553 A1 | 2/2005 | Akishiba | |
| 2006/0087660 A1 * | 4/2006 | Zabolitzky | G01B 9/04 |
| | | | 356/609 |
| 2007/0146869 A1 * | 6/2007 | Lauer | G02B 5/005 |
| | | | 359/368 |
| 2009/0056156 A1 | 3/2009 | Hellstrom et al. | |
| 2010/0188742 A1 * | 7/2010 | Chen | G02B 21/0032 |
| | | | 359/385 |
| 2010/0208486 A1 * | 8/2010 | Gladnick | G01B 11/026 |
| | | | 362/551 |
| 2011/0013186 A1 * | 1/2011 | Miki | G01B 11/026 |
| | | | 356/364 |
| 2011/0102774 A1 * | 5/2011 | Sinke | G02B 7/28 |
| | | | 356/123 |
| 2011/0137126 A1 * | 6/2011 | French | A61B 1/00165 |
| | | | 600/178 |
| 2012/0019821 A1 | 1/2012 | Chen et al. | |
| 2012/0050723 A1 * | 3/2012 | Emtman | G01B 11/026 |
| | | | 356/123 |
| 2013/0222815 A1 * | 8/2013 | Patzwald | G01B 11/026 |
| | | | 356/612 |
| 2014/0236022 A1 | 8/2014 | Zeng et al. | |
| 2015/0055215 A1 | 2/2015 | Chen et al. | |
| 2015/0085289 A1 * | 3/2015 | Kang | G02B 21/004 |
| | | | 356/445 |
| 2015/0185454 A1 | 7/2015 | Kalkbrenner et al. | |
| 2015/0211850 A1 * | 7/2015 | Harsila | G01B 21/047 |
| | | | 356/4.01 |
| 2018/0274902 A1 | 9/2018 | Kuga | |
| 2018/0274903 A1 | 9/2018 | Kuga | |
| 2018/0356208 A1 | 12/2018 | Kuga et al. | |
| 2018/0356284 A1 | 12/2018 | Takei et al. | |

FOREIGN PATENT DOCUMENTS

| | | |
|---|---|---|
| JP | 2011-017552 A | 1/2011 |
| JP | 2013-130581 A | 7/2013 |

OTHER PUBLICATIONS

Extended European Search Report issued in corresponding European Patent Application No. 16878724.0 dated Jul. 3, 2019 (6 pages).

* cited by examiner

CONFOCAL DISPLACEMENT SENSOR

CROSS-REFERENCE TO RELATED APPLICATIONS

This application is a continuation of U.S. patent application Ser. No. 15/989,215, filed May 25, 2018, which is a continuation of PCT/JP2016/088008 filed Dec. 21, 2016. The present application claims foreign priority based on Japanese Patent Application No. 2015-254804, filed Dec. 25, 2015, the contents of which is incorporated herein by reference.

BACKGROUND OF THE INVENTION

1. Field of the Invention

The present invention relates to a confocal displacement sensor in which light in a wide wavelength band is used.

2. Description of Related Art

As a device that measures displacement of the surface of a measurement object in a noncontact manner, there is known a confocal displacement sensor. For example, JP-A-2013-130581 (Patent Literature 1) describes a chromatic point sensor (CPS) system that measures the distance from a predetermined reference position to a measurement object as displacement of the surface of the measurement object. The CPS described in Patent Literature 1 includes two confocal-system optical paths. Lights having a plurality of wavelengths are input to the optical paths. The light passed through either optical path is selectively output to the measurement object.

A first optical path is configured such that lights having different wavelengths are focused at different distances near a surface position of the measurement object in an optical axis direction. The light passed through the first optical path is reflected on the surface of the measurement object. In the reflected light, only light focused on the position of an opening section disposed in the first path as a spatial filter passes through the opening section to be guided to a wavelength detector. A spectrum profile (a first output spectrum profile) of the light detected by the wavelength detector includes a component indicating a measurement distance (distance-dependent profile component) and includes a distance-independent profile component.

A second optical path is configured such that lights having different wavelengths are focused at substantially the same distance near the surface position of the measurement object. The light passed through the second optical path is reflected on the surface of the measurement object. In the reflected light, only light focused on the position of an opening section disposed in a second path as a spatial filter passes through the opening section to be guided to a wavelength detector. A spectrum profile (a second output spectrum profile) of the light detected by the wavelength detector does not include a distance-dependent profile component and includes only a distance-independent profile component.

Correction for a potential measurement error related to the distance-independent profile component is performed concerning the first output spectrum profile using the second output spectrum profile.

In the CPS system described in Patent Literature 1, since the correction is performed concerning the first output spectrum profile, reliability is improved. Specifically, a measurement error due to, as the distance-independent profile component, a material component of the measurement object, a spectrum profile component of a light source associated with the light source, or a component associated with the wavelength detector is reduced. However, in the confocal displacement sensor, a measurement error in a degree larger than the roughness of the surface occurs because of the influence of irregular reflection on the surface of the measurement object. In the CPS system described in Patent Literature 1, such a measurement error cannot be reduced.

SUMMARY OF THE INVENTION

An object of the present invention is to provide a confocal displacement sensor capable of reducing a measurement error.

(1) A confocal displacement sensor according to the present invention is a confocal displacement sensor that measures displacement of a measurement object using a confocal optical system. The confocal displacement sensor includes: a light projecting section configured to emit light having a plurality of wavelengths; an optical member configured to cause a chromatic aberration along an optical axis direction in the light emitted by the light projecting section, converge the light having the chromatic aberration, and irradiate the light on the measurement object; a pinhole member including a plurality of pinholes that allow, in the light irradiated on the measurement object by the optical member, light having a wavelength reflected while focusing on a surface of the measurement object to pass; and a displacement measuring section configured to calculate the displacement of the measurement object on the basis of signal intensity for each wavelength of an average signal corresponding to an average of intensities for the each wavelength concerning a plurality of lights passed through the plurality of pinholes.

In the confocal displacement sensor, the light having the plurality of wavelengths is emitted by the light projecting section. The chromatic aberration along the optical axis direction is caused by the optical member in the light emitted by the light projecting section. The light having the chromatic aberration is converged and irradiated on the measurement object by the optical member. In the light irradiated on the measurement object by the optical member, the light having the wavelength reflected while focusing on the surface of the measurement object passes through the plurality of pinholes of the pinhole member. The displacement of the measurement object is calculated by the displacement measuring section on the basis of the signal intensity for each wavelength of the average signal corresponding to the average of the intensities for each wavelength concerning the plurality of lights passed through the plurality of pinholes.

Light focused on a position different from the position of the surface of the measurement object sometimes passes through any one of the pinholes because of irregular reflection on the surface of the measurement object. Even in such a case, with the configuration explained above, intensities for each wavelength concerning the plurality of lights passed through the plurality of pinholes are averaged in the average signal. Consequently, a component of light that causes a random measurement error due to irregular reflection is cancelled. As a result, it is possible to reduce an error of the displacement of the measurement object measured by the confocal displacement sensor.

(2) The confocal displacement sensor may include a first optical fiber. An end portion of the first optical fiber may be the pinhole. The first optical fiber may be the pinhole member. In this case, it is unnecessary to dispose the pinhole separately from the first optical fiber. Consequently, it is possible to make the configuration of the confocal displacement sensor compact. It is possible to more efficiently guide the light passes through the plurality of pinholes to the displacement measuring section with the first optical fiber. Further, flexibility of the configuration of an optical path for guiding the light passed through the pinholes to the displacement measuring section is improved.

(3) The light projecting section may include: a second optical fiber including one end portion and another end portion; a laser light source; and a phosphor disposed at the one end portion of the second optical fiber and configured to absorb light emitted by the laser light source and discharge light having a wavelength different from a wavelength of the light emitted by the laser light source. The second optical fiber may receive the light discharged by the phosphor from the one end portion and guide the received light to the first optical fiber from the other end portion.

In this case, it is possible to easily generate light having a plurality of wavelengths with the laser light source and the phosphor. It is possible to efficiently emit the generated light through the second optical fiber and the first optical fiber.

(4) A plurality of the first optical fibers may be provided. End portions of the plurality of first optical fibers may be respectively the plurality of pinholes. In this case, it is unnecessary to dispose the plurality of pinholes separately from the plurality of first optical fibers. Consequently, it is possible to make the configuration of the confocal displacement sensor compact. It is possible to efficiently guide lights passed through the plurality of pinholes to the displacement measuring section respectively through the plurality of first optical fibers. Further, flexibility of the configuration of an optical path for guiding the lights passed through the plurality of pinholes to the displacement measuring section is improved.

(5) The displacement measuring section may include: a combining section configured to combine the plurality of lights passed through the plurality of pinholes to thereby generate one combined light; a spectral section configured to spectrally disperse the combined light combined by the combining section; a light receiving section configured to receive the light spectrally dispersed by the spectral section and output, as the average signal, an electric light reception signal indicating a light reception amount for each wavelength concerning the light combined by the combining section; and a calculating section configured to calculate the displacement of the measurement object on the basis of the average signal output from the light receiving section.

In this case, the plurality of lights passed through the plurality of pinholes are combined by the combining section before being received by the light receiving section, whereby one combined light is generated. Therefore, the electric light reception signal indicating the light reception amount for each wavelength output from the light receiving section is an average signal obtained by integrating intensities for each wavelength concerning the plurality of lights. With this configuration, it is unnecessary to perform an arithmetic operation for generating the average signal. Consequently, it is possible to efficiently calculate the displacement of the measurement object at high speed.

(6) The combining section may include a first fiber coupler, a second fiber coupler, a plurality of the first optical fibers, the second optical fiber, a third optical fiber, and a fourth optical fiber. The second optical fiber may be connected to the first fiber coupler to guide the light emitted by the light projecting section to the first fiber coupler. The fourth optical fiber may be connected to the first and second fiber couplers such that light is transmitted between the first fiber coupler and the second fiber coupler. Each of the plurality of first optical fibers may be connected to the second fiber coupler to guide, to the optical member, the light guided to the second fiber coupler by the second optical fiber and the fourth optical fiber and guide, to the second fiber coupler, the light reflected while focusing on the surface of the measurement object. The third optical fiber may be connected to the first fiber coupler to guide, to the spectral section, the light guided to the first fiber coupler by the plurality of first optical fibers and the fourth optical fiber.

In this case, the light emitted by the light projecting section is guided to the optical member through the second optical fiber, the first fiber coupler, the fourth optical fiber, the second fiber coupler, and the plurality of first optical fibers. Consequently, with a simple configuration, it is possible to converge the light emitted by the light projecting section and irradiate the light on the measurement object while causing a chromatic aberration in the light. The light reflected while focusing on the surface of the measurement object passes through the plurality of pinholes. The plurality of lights passed through the plurality of pinholes are guided to the spectral section through the plurality of first optical fibers, the second fiber coupler, the fourth optical fiber, the first fiber coupler, and the third optical fiber. Therefore, the plurality of lights passed through the plurality of pinholes are combined into one light in a process in which the plurality of lights are guided to the spectral section. Consequently, it is possible to easily generate the average signal.

(7) The combining section may include a fiber coupler, a plurality of the first optical fibers, the second optical fiber, and a third optical fiber. The second optical fiber may be connected to the fiber coupler to guide the light emitted by the light projecting section to the fiber coupler. Each of the plurality of first optical fibers may be connected to the fiber coupler to guide, to the optical member, the light guided to the fiber coupler by the second optical fiber and guide, to the fiber coupler, the light reflected while focusing on the surface of the measurement object. The third optical fiber may be connected to the fiber coupler to guide, to the spectral section, the light guided to the fiber coupler by the plurality of first optical fibers.

In this case, the light emitted by the light projecting section is guided to the optical member through the second optical fiber, the fiber coupler, and the plurality of first optical fibers. Consequently, with a simple configuration, it is possible to converge the light emitted by the light projecting section and irradiate the light on the measurement object while causing a chromatic aberration in the light. The light reflected while focusing on the surface of the measurement object passes through the plurality of pinholes. The plurality of lights passed through the plurality of pinholes are guided to the spectral section through the plurality of first optical fibers, the fiber coupler, and the third optical fiber. Therefore, the plurality of lights passed through the plurality of pinholes are combined into one light in a process in which the plurality of lights are guided to the spectral section. Consequently, it is possible to easily generate the average signal.

(8) The displacement measuring section may include: a spectral section configured to respectively spectrally disperse the plurality of lights passed through the plurality of pinholes; a light receiving section configured to respectively receive the plurality of lights spectrally dispersed by the spectral section and output a plurality of electric light reception signals indicating light reception amounts for each wavelength concerning the respective plurality of lights passed through the plurality of pinholes; and a calculating section configured to average or integrate, for each wavelength, the plurality of light reception signals output from the light receiving section to thereby calculate the average signal as signal intensity for the each wavelength and calculate the displacement of the measurement object on the basis of the calculated average signal.

In this case, the plurality of light reception signals respectively corresponding to the plurality of lights passed through the plurality of pinholes are output by the light receiving section. The plurality of light reception signals output from the light receiving section are averaged or integrated for each wavelength by the calculating section, whereby the average signal is calculated. With this configuration, in the calculation of the average signal, it is possible to perform desired average or integration taking into account the intensities of the plurality of lights. Consequently, it is possible to more accurately calculate the displacement of the measurement object.

(9) The displacement measuring section may include: a combining section configured to partially combine the plurality of lights passed through the plurality of pinholes to thereby generate a plurality of combined lights; a spectral section configured to respectively spectrally disperse the plurality of combined lights combined by the combining section; a light receiving section configured to respectively receive the plurality of lights spectrally dispersed by the spectral section and output a plurality of electric light reception signals indicating light reception amounts for each wavelength concerning the respective plurality of lights passed through the plurality of pinholes; and a calculating section configured to average or integrate, for each wavelength, the plurality of light reception signals output from the light receiving section to thereby calculate the average signal as signal intensity for the each wavelength and calculate the displacement of the measurement object on the basis of the calculated average signal.

In this case, the plurality of lights passed through the plurality of pinholes are partially combined by the combining section before being received by the light receiving section, whereby the plurality of combined lights are generated. The plurality of light reception signals respectively corresponding to the plurality of combined lights are output by the light receiving section. The plurality of light reception signals output from the light receiving section is averaged or integrated for each wavelength, whereby the average signal is calculated. With this configuration, in the calculation of the average signal, it is possible to perform desired averaging or integration taking into account the intensities of the plurality of combined lights. Consequently, it is possible to more accurately calculate the displacement of the measurement object.

(10) The displacement measuring section may include: a switching section configured to switch irradiation and non-irradiation on the measurement object of the light converged by the optical member such that the plurality of lights are sequentially irradiated on the measurement object; a spectral section configured to respectively spectrally disperse the plurality of lights sequentially passed through the plurality of pinholes after being irradiated on the measurement object by the switching section; a light receiving section configured to receive, in a single exposure period, the plurality of lights spectrally dispersed by the spectral section and output, as the average signal, an electric light reception signal indicating a light reception amount for each wavelength concerning the received lights; and a calculating section configured to calculate the displacement of the measurement object on the basis of the average signal output from the light receiving section.

In this case, the plurality of lights sequentially passed through the plurality of pinholes are received by the light receiving section in the single exposure period. Therefore, the electric light reception signal indicating the light reception amount for each wavelength output from the light receiving section is an average signal obtained by integrating intensities for each wavelength concerning the plurality of lights. With this configuration, it is unnecessary to perform an arithmetic operation for generating the average signal. Consequently, it is possible to efficiently calculate the displacement of the measurement object.

(11) The displacement measuring section may include: a switching section configured to switch irradiation and non-irradiation on the measurement object of the light converged by the optical member such that the plurality of lights are sequentially irradiated on the measurement object; a spectral section configured to respectively spectrally disperse the plurality of lights sequentially passed through the plurality of pinholes after being irradiated on the measurement object by the switching section; a light receiving section configured to respectively receive the plurality of lights spectrally dispersed by the spectral section and output a plurality of electric light reception signals indicating light reception amounts for each wavelength concerning the respective plurality of lights passed through the plurality of pinholes; and a calculating section configured to average or integrate, for each wavelength, the plurality of light reception signals output from the light receiving section to thereby calculate an average signal as signal intensity for the each wavelength and calculate the displacement of the measurement object on the basis of the calculated average signal.

In this case, the plurality of light reception signals respectively corresponding to the plurality of lights sequentially passed through the plurality of pinholes are output by the light receiving section. The plurality of light reception signals output from the light receiving section are averaged or integrated for each wavelength by the calculating section, whereby the average signal is calculated. With this configuration, in the calculation of the average signal, it is possible to perform desired averaging or integration taking into account the intensities of the plurality of lights. Consequently, it is possible to more accurately calculate the displacement of the measurement object.

(12) The first optical fiber may be provided to guide the light emitted by the light projecting section to the optical member. In this case, it is possible to more efficiently guide the light emitted by the light projecting section to the optical member with the first optical fiber. Flexibility of the configuration of an optical path for guiding the light emitted by the light projecting section to the optical member is improved.

(13) The confocal displacement sensor may further include a processing device and a head section. The processing device may include the light projecting section, the spectral section, the light receiving section, and the calculating section and further include a first housing configured to house the light projecting section, the spectral section, the light receiving section, and the calculating section. The head section may include the optical member and further include a second housing configured to house the optical member.

In this case, the processing device including the light projecting section, the spectral section, the light receiving section, and the calculating section and the head section including the optical member are separately provided. Therefore, it is easy to use, according to the shape, the disposition, or the like of the measurement object, the head section including an optical member that causes an appropriate chromatic aberration or an optical member having an appropriate focal length. Consequently, it is possible to more easily measure the displacement of the measurement object.

(14) The pinhole at the end portion of the first optical fiber may be provided in the head section. The first optical fiber may be disposed to guide light from the head section to the processing device. In this case, it is possible to dispose only the head section in various environments in which the measurement object is placed while separating the processing device from the head section.

(15) The plurality of pinholes may be disposed side by side in a plane crossing an optical path.

In this case, the plurality of pinholes allow lights reflected on unidentical portions of the surface of the measurement object to pass. Therefore, in the average signal, a component of light that causes a random measurement error due to irregular reflection on the surface of the measurement object is more surely cancelled. Consequently, it is possible to further reduce an error of the displacement of the measurement object measured by the confocal displacement sensor.

(16) The plurality of pinholes may be disposed to respectively allow, in the light converged by the optical member, a plurality of lights reflected while focusing on a plurality of portions of the surface of the measurement object to pass. In this case, in the average signal, a component of light that causes a random measurement error due to irregular reflection on the surface of the measurement object is more surely cancelled. Consequently, it is possible to further reduce an error of the displacement of the measurement object measured by the confocal displacement sensor.

(17) The light projecting section may include: a light source configured to emit light having a single wavelength; and a phosphor configured to absorb the light emitted by the light source and discharge light having a wavelength different from the wavelength of the light emitted by the light source. In this case, it is possible to easily generate light having a plurality of wavelengths.

According to the present invention, it is possible to reduce a measurement error of a measurement object.

DESCRIPTION OF EMBODIMENTS

[1] First Embodiment
(1) Basic Configuration of a Confocal Displacement Sensor

Figure 1:
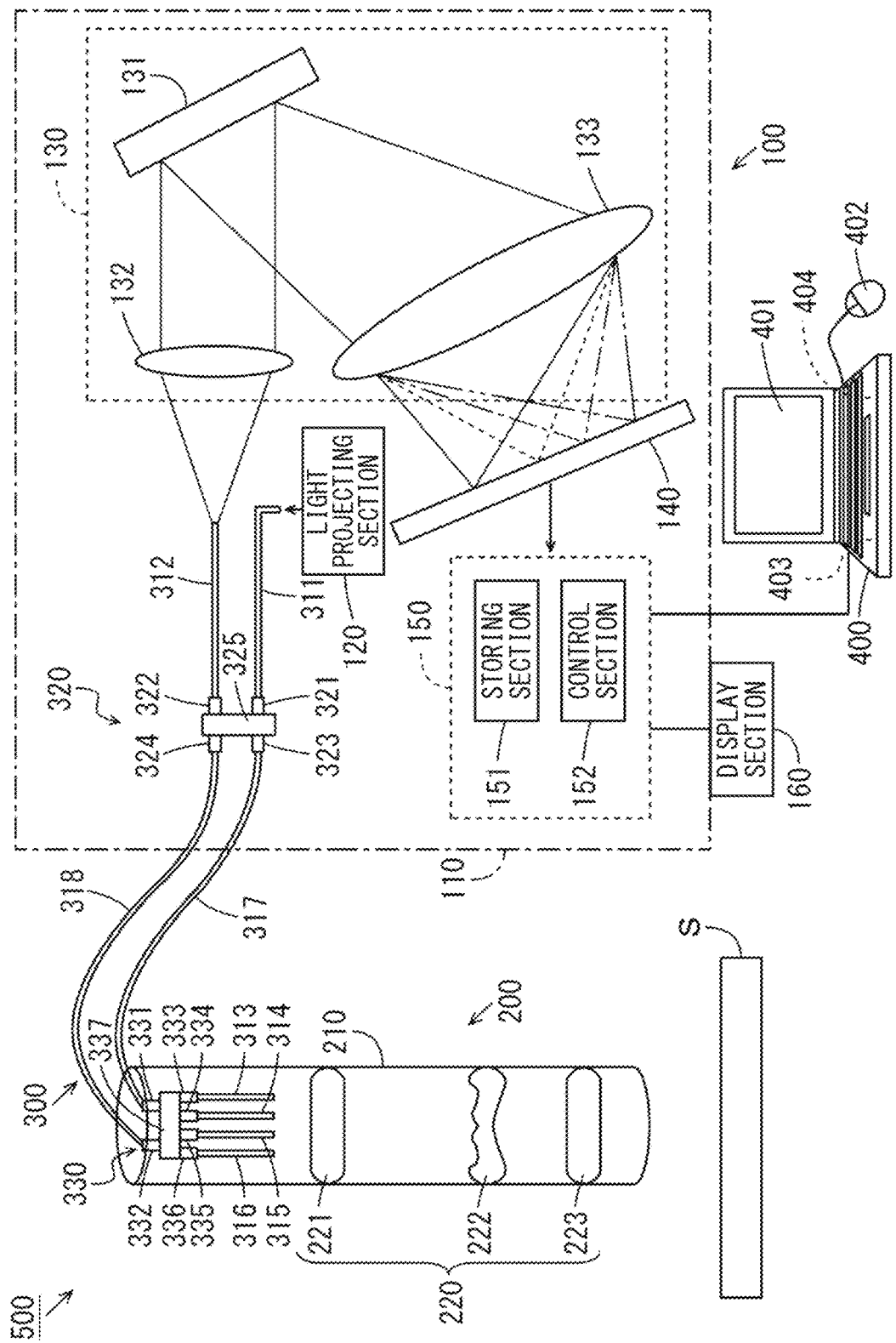
FIG. 1 is a schematic diagram showing the configuration of a confocal displacement sensor according to a first embodiment of the present invention.

A confocal displacement sensor according to a first embodiment of the present invention is explained below with reference to the drawings. FIG. 1 is a schematic diagram showing the configuration of the confocal displacement sensor according to the first embodiment of the present invention. As shown in FIG. 1, a confocal displacement sensor 500 includes a processing device 100, a measurement head 200, a light guide section 300, and a control device 400. The light guide section 300 includes a plurality of optical fibers and optically connects the processing device 100 and the measurement head 200.

The processing device 100 includes a housing 110, a light projecting section 120, a spectral section 130, a light receiving section 140, an arithmetic processing section 150, and a display section 160. The housing 110 houses the light projecting section 120, the spectral section 130, the light receiving section 140, and the arithmetic processing section 150. The light projecting section 120 is configured to be capable of emitting light in a wide wavelength band (e.g., 500 nm to 700 nm), that is, light having a plurality of wavelengths. A detailed configuration of the light projecting section 120 is explained below. Light emitted by the light projecting section 120 is input to an optical fiber 311 of the light guide section 300 explained below.

The spectral section 130 includes a diffraction grating 131 and a plurality of (in this example, two) lenses 132 and 133. As explained bellow, a part of light emitted by the light projecting section 120 and reflected on the surface of a measurement object S is output from an optical fiber 312 of the light guide section 300. The light output from the optical fiber 312 passes through the lens 132 to thereby be substantially collimated and made incident on the diffraction grating 131. In this embodiment, the diffraction grating 131 is a reflection-type diffraction grating. The light made incident on the diffraction grating 131 is spectrally dispersed to be reflected at a different angle for each wavelength and passes through the lens 133 to thereby be focused on a position on one dimension different for each wavelength.

The light receiving element 140 includes an imaging element (a one-dimensional line sensor) on which a plurality of pixels are one-dimensionally arrayed. The imaging element may be a multi-division PD (photodiode), a CCD (charge coupled device) camera, or a CMOS (complementary metal oxide semiconductor) image sensor or may be other elements. The light receiving section 140 is disposed such that the plurality of pixels of the imaging element respectively receive lights in a plurality of focus positions different for each wavelength formed by the lens 133 of the spectral section 130. Analog electric signals (hereinafter referred to as light reception signals) corresponding to light reception amounts are output from the pixels of the light receiving section 140.

The arithmetic processing section 150 includes a storing section 151 and a control section 152. The storing section 151 includes, for example, a ROM (read only memory), a RAM (random access memory), or a hard disk. In the storing section 151, a displacement measurement program is stored and various data used for displacement measurement are stored. The control section 152 includes, for example, a CPU (central processing unit). The control section 152 acquires a light reception signal output by the light receiving section 140 and executes displacement measurement processing for the measurement object S on the basis of the displacement measurement program and the data stored in the storing section 151.

The measurement head 200 includes a housing 210 having a substantially axially symmetrical shape (e.g., a cylindrical shape) and a lens unit 220. The housing 210 houses the lens unit 220. The lens unit 220 includes a refraction lens 221, a diffraction lens 222, and an objective lens 223. Light from the processing device 100 output from the light guide section 300 passes through the refraction lens 221 and the diffraction lens 222 in order. Consequently, a chromatic aberration occurs in the light along the optical axis direction. The objective lens 223 is disposed such that the light in which the chromatic aberration occurs is capable of focusing on a position near the surface of the measurement object S.

The light guide section 300 includes a plurality of (in this example, eight) optical fibers 311 to 318 and a plurality of (in this example, two) fiber couplers 320 and 330. In the example shown in FIG. 1, the fiber coupler 320 is provided in the housing 110 of the processing device 100 and the fiber coupler 330 is provided in the housing 210 of the measurement head 200. The present invention is not limited to this. The fiber coupler 320 may be provided in a portion other than the housing 110 of the processing device 100. The fiber coupler 330 may be provided in a portion other than the housing 210 of the measurement head 200.

The fiber coupler 320 has a so-called 2×2-type configuration. The fiber coupler 320 includes four ports 321 to 324 and a main body section 325. The ports 321 and 322 and the ports 323 and 324 are connected to the main body section 325 to be opposed to each other across the main body section 325. Light input to at least one of the ports 321 and 322 is output from each of the ports 323 and 324. Light input to at least one of the ports 323 and 324 is output from each of the ports 321 and 322.

The fiber coupler 330 has a so-called 2×4-type configuration. The fiber coupler 330 includes six ports 331 to 336 and a main body section 337. The ports 331 and 332 and the ports 333 to 336 are connected to the main body section 337 to be opposed to each other across the main body section 337. Light input to at least one of the ports 331 and 332 is output from each of the ports 333 to 336. Light input to at least one of the ports 333 to 336 is output from each of the ports 331 and 332.

The optical fibers 311 and 312 are respectively connected to the ports 321 and 322 of the fiber coupler 320. The optical fibers 313 to 316 are respectively connected to the ports 333 to 336 of the fiber coupler 330. The port 323 of the fiber coupler 320 and the port 331 of the fiber coupler 330 are connected by the optical fiber 317. The port 324 of the fiber coupler 320 and the port 332 of the fiber coupler 330 are connected by the optical fiber 318.

With this configuration, light emitted by the light projecting section 120 of the processing device 100 is input to the port 321 of the fiber coupler 320 through the optical fiber 311. The light input to the port 321 is output from the ports 323 and 324 and input to the ports 331 and 332 of the fiber coupler 330 through the optical fibers 317 and 318. The light input to the ports 331 and 332 is output from the ports 333 to 336 and irradiated on the measurement object S through the optical fibers 313 to 316 and the lens unit 220.

A part of the light reflected on the surface of the measurement object S is input to the ports 333 to 336 of the fiber coupler 330 through the lens unit 220 and the optical fibers 313 to 316. The light input to the ports 333 to 336 is output from the ports 331 and 332 and input to the ports 323 and 324 of the fiber coupler 320 through the optical fibers 317 and 318. The light input to the ports 323 and 324 is output from the ports 321 and 322. The light output from the port 322 is guided to the spectral section 130 through the optical fiber 312. Consequently, the displacement measurement processing is performed.

The display section 160 includes an indicator such as a seven-segment indicator or a dot-matrix indicator. The display section 160 is provided in the housing 110 of the processing device 100 and connected to the arithmetic processing section 150. A numerical value such as a measurement distance calculated by the displacement measurement processing of the arithmetic processing section 150 is displayed on the display section 160.

The control device 400 is configured by, for example, a personal computer and connected to the arithmetic processing section 150 of the processing device 100. The control device 400 includes a display device 401, an operation section 402, a CPU (central processing unit) 403, and a memory 404. The display device 401 includes, for example, a liquid crystal display panel or an organic EL (electroluminescence) panel. The display device 401 is capable of displaying a waveform of a light reception signal (a light reception waveform W0) indicated by a solid line shown in FIG. 4 referred to below in addition of the numerical value such as the measurement distance calculated by the displacement measurement processing of the arithmetic processing section 150. The operation section 402 includes a pointing device such as a mouse and a keyboard.

The CPU 403 is configured to be capable of operating in a measurement mode and a confirmation mode explained below. A reference range for pass/fail determination with respect to a measurement distance of the measurement object S may be set in the CPU 403. In this case, when the measurement distance is within the reference range, a result of the determination (e.g., "OK") indicating that the measurement object S is a non-defective product is displayed on the display device 401. On the other hand, when the measurement distance is outside the reference range, a result of the determination (e.g., "NG") indicating that the measurement object S is a defective product is displayed on the display device 401. In the memory 404, a displacement measurement program is stored and various data used for the displacement measurement are stored.

(2) Operation Principle of the Confocal Displacement Sensor

Figure 2:
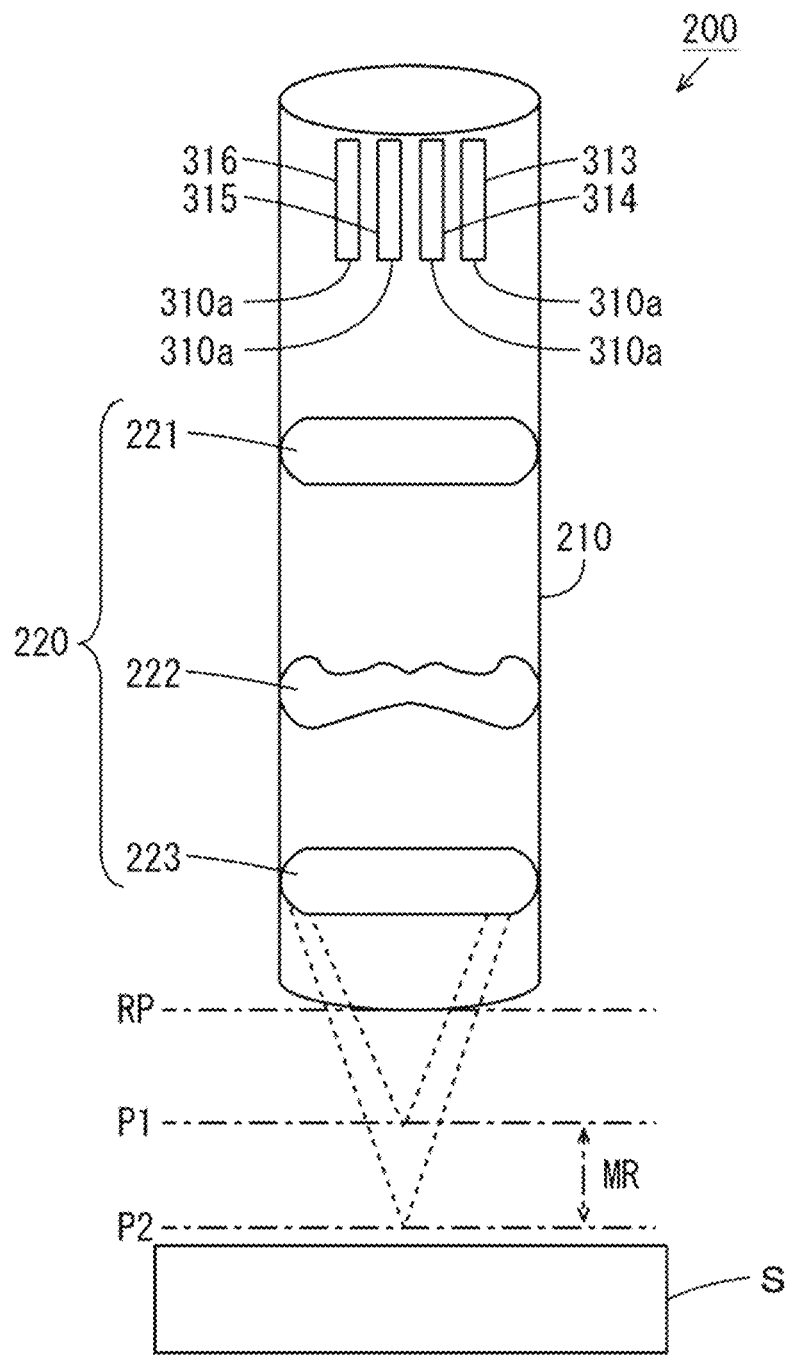
FIG. 2 is a diagram for explaining an operation principle of the confocal displacement sensor.

FIG. 2 is a diagram for explaining an operation principle of the confocal displacement sensor 500. In the following explanation, in order to facilitate understanding of the operation principle of the confocal displacement sensor 500 according to this embodiment, first, an operation principle of a general confocal displacement sensor is explained using light output from one optical fiber (in this example, the optical fiber 313) to the measurement head 200.

Light output from the optical fiber 313 passes through the refraction lens 221 and the diffraction lens 222. Consequently, a chromatic aberration occurs in the light. The light in which the chromatic aberration occurs passes through the objective lens 223 to thereby focus in a position different for each wavelength. For example, light having a short wavelength focuses on a position close to the objective lens 223. Light having a long wavelength focuses on a position far from the objective lens 223. A range between a focus position P1 closest to the objective lens 223 and a focus position P2 farthest from the objective lens 223 is a measurement range MR. In this example, the refraction lens 221 has a convex shape and the diffraction lens 222 has a concave shape. In this case, the chromatic aberration that occurs in the light increases. Consequently, it is possible to increase the measurement range MR.

When the surface of the measurement object S is present in the measurement range MR, the light passed through the objective lens 223 is irradiated on the surface of the measurement object S and thereafter reflected to a wide range by the surface. As explained below, the optical fiber 313 is configured by a core 310a and a clad 310b (see FIG. 3 referred to below). In this embodiment, a distal end portion of the optical fiber 313 functions as a spatial filter including very small pinholes. Therefore, most of the light reflected on the surface of the measurement object S is not input to the optical fiber 313.

On the other hand, light having a specific wavelength focused on the position of the surface of the measurement object S is reflected on the surface to thereby pass through the lens unit 220 to be input to the distal end portion of the core 310a of the optical fiber 313. The wavelength of the light input to the optical fiber 313 indicates a measurement distance. The measurement distance is the distance from a predetermined reference position RP to the position of the surface of the measurement object S. Note that, in this example, the reference position RP is the position of the distal end portion of the housing 210 closest to the measurement object S.

The light input to the optical fiber 313 is guided to the processing device 100 shown in FIG. 1 and spectrally dispersed by the diffraction grating 131 and focused on a position different for each wavelength by the lens 133. The plurality of pixels of the light receiving section 140 are respectively disposed in focus positions of a plurality of lights different for each wavelength. Therefore, the pixels of the light receiving section 140 receive lights having wavelengths associated with the pixels and output light reception signals.

With this configuration, it is possible to specify the wavelengths of the received lights by specifying the positions of the pixels of the light receiving section 140 that output the light reception signals. It is possible to specify a measurement distance by specifying the wavelengths of the received lights. The operation principle of the general confocal displacement sensor is as explained above. However, light focusing on a position different from the position of the surface of the measurement object S is sometimes input to the optical fiber 313 because of irregular reflection of the light on the surface of the measurement object S. In this case, in the measurement distance specified by the processing device 100, a measurement error in a degree larger than the roughness of the surface of the measurement object S occurs.

Figure 3:
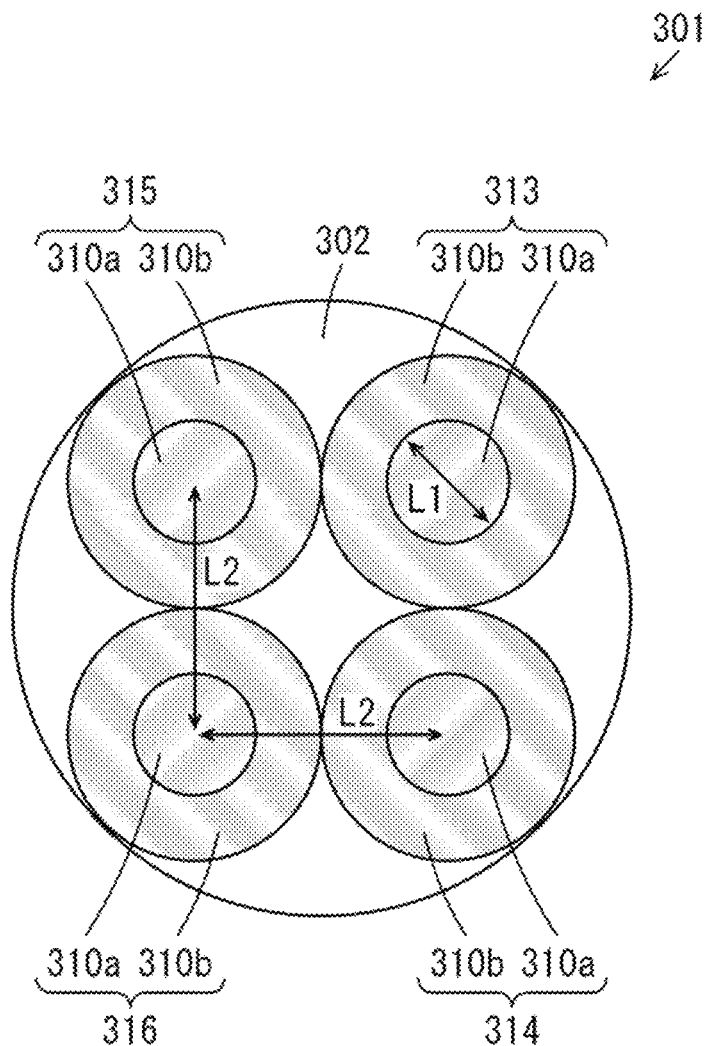
FIG. 3 is a sectional view showing the disposition of optical fibers of a fiber unit.

Therefore, in the confocal displacement sensor 500 according to this embodiment, light input from the processing device 100 is output from each of the four optical fibers 313 to 316. The four optical fibers 313 to 316 are integrally configured as a fiber unit. FIG. 3 is a sectional view showing the disposition of the optical fibers 313 to 316 of the fiber unit. As shown in FIG. 3, in a fiber unit 301, the four optical fibers 313 to 316 are integrally held by a holding member 302.

The optical fibers 313 to 316 include cores 310a and clads 310b. The cores 310a are covered by the clads 310b. Lights input to one end portions of the cores 310a of the optical fibers 313 to 316 are output from the other end portions of the core 310a. Note that the optical fibers 311, 312, 317, and 318 have the same configuration as the configuration of the optical fibers 313 to 316.

When the center of the fiber unit 301 and the center of the lens unit 220 shown in FIG. 2 substantially coincide, the optical fibers of the fiber unit 301 is desirably symmetrically disposed with respect to the optical axis of the lens unit 220. In an example shown in FIG. 3, the center of the fiber unit 301 is disposed on the optical axis of the optical system 220. The cores 310a (optical axes) of the optical fibers 313 to 316 are symmetrically disposed with respect to the optical axis of the lens unit 220. In this case, the cores 310a (the optical axes) of the optical fibers 313 to 316 are separated from the center of the fiber unit 301, that is, the optical axis of the lens unit 220 by substantially the same distance.

The cores 310a of the optical fibers 313 to 316 are disposed in the positions a substantially equal interval apart from the optical axis of the lens unit 220 in this way. Therefore, it is possible to easily perform optical design of the lens unit 220 for causing an aberration along the optical axis direction. The optical axis not only means the optical axes of the refraction lens 221, the diffraction lens 222, and the object lens 223 substantially coinciding with one another. The optical axis may mean the optical axis of any one or more of the refraction lens 221, the diffraction lens 222, and the objective lens 223.

The behavior of the lights output from the optical fibers 314 to 316 is the same as the behavior of the light output from the optical fiber 313 explained above. Therefore, the lights are irradiated on four portions of the surface of the measurement object S from the measurement head 200. In the example shown in FIG. 3, the optical fibers 313 to 316 are disposed to be located at the four corners of a square. A diameter L1 of the cores 310a is desirably 200 µm or less and more desirably 50 µm or less. In this case, since the four optical fibers 313 to 316 are disposed in proximity to one another, for a user, it is recognized as if light is irradiated on one portion of the surface of the measurement object S.

Among the lights reflected in the four portions of the surface of the measurement object S, light focused on a portion of the surface of the measurement object S is input to the optical fibers 313 to 316 corresponding to the portion and received by the light receiving section 140. A distance L2 between the centers of the cores 310a adjacent to each other is desirably three times or more of the diameter L1. In this case, when the distance L2 is three times or more of the diameter L1, light reflected while focusing on a portion of the surface of the measurement object S passes through the pinholes of the optical fibers 313 to 316 corresponding to the portion. The light hardly passes through the pinholes of the other optical fibers 313 to 316 not corresponding to the portion as disturbance light.

The distance L2 between the centers of the cores 310a adjacent to each other is more desirably five times or more and ten times or less of the diameter L1. In this case, when the distance L2 is five times or more and ten times or less of the diameter L1, light reflected while focusing on a portion of the surface of the measurement object S is further prevented from passing through the other pinholes not corresponding to the portion as disturbance light. Since the plurality of lights are not greatly separated, the plurality of lights can pass near the center of the lens unit 220. Therefore, an aberration that reduces measurement accuracy such as a comatic aberration hardly occurs. In this example, the diameter L1 is, for example, 50 µm and the distance L2 is, for example, 250 µm.

Figure 4:
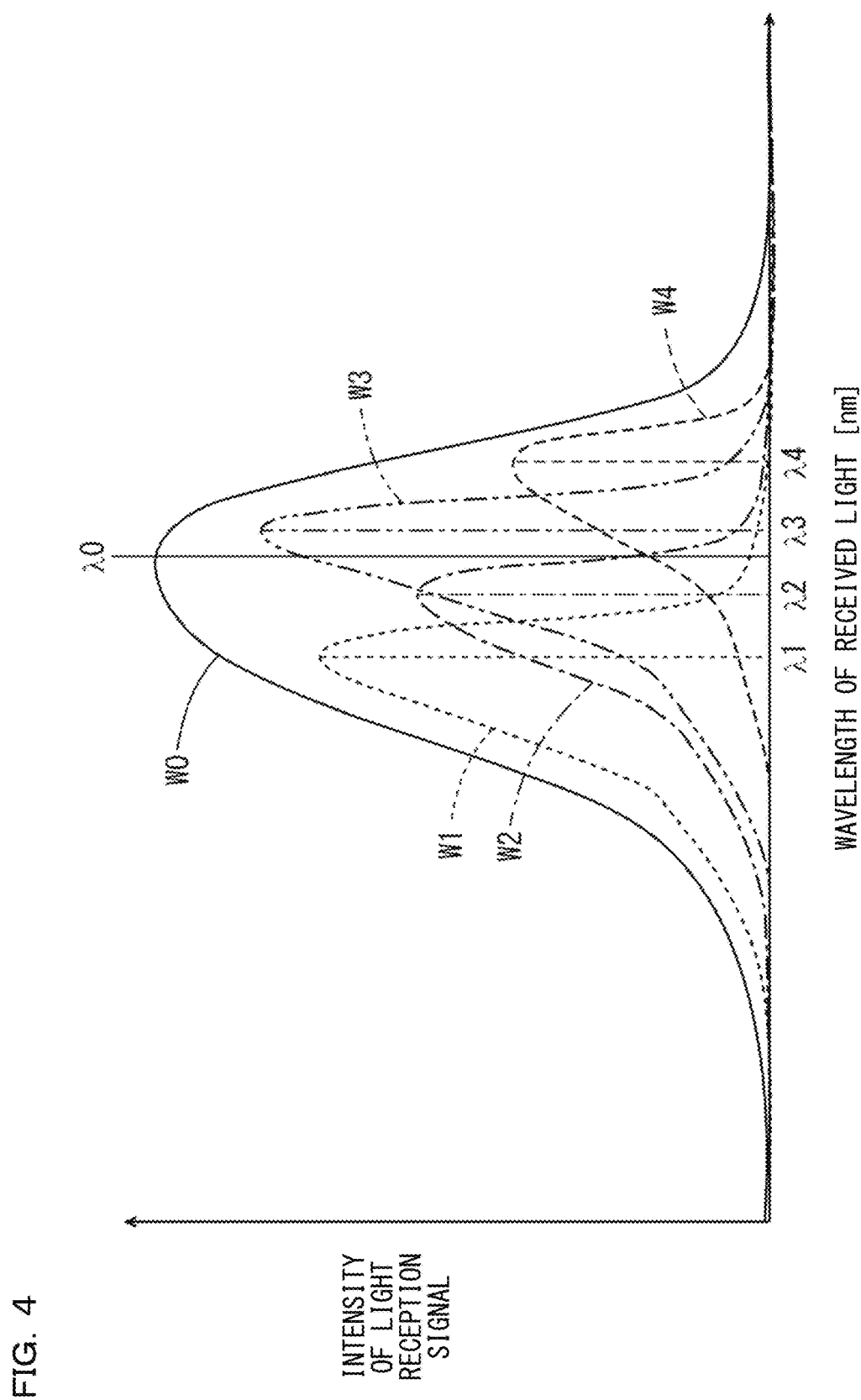
FIG. 4 is a diagram showing a relation between the wavelength of light received by a light receiving section and the intensity of a light reception signal.

FIG. 4 is a diagram showing a relation between the wavelength of light received by the light receiving section 140 and the intensity of a light reception signal. The horizontal axis of FIG. 4 indicates the wavelength of received light and the vertical axis indicates the intensity of the light reception signal. The same applies to FIGS. 7 to 9 referred to below. The horizontal axis of FIG. 4 and FIGS. 7 to 9 referred to below is equivalent to the positions of the pixels of the light receiving section 140.

In FIG. 4, waveforms of light reception signals (hereinafter referred to as light reception waveforms) W1 to W4 of lights input to the optical fibers 313 to 316 are respectively indicated by a dotted line, an alternate long and short dash line, an alternate long and two short dashes line, and a broken line in an imaginarily separated state. Wavelengths of peaks (hereinafter referred to as peak wavelengths) of the light reception waveforms W1 to W4 are respectively $\lambda 1$ to $\lambda 4$. The peak wavelengths $\lambda 1$ to $\lambda 4$ of a plurality of light reception waveforms W1 to W4 are different from one another because of irregular reflection on the surface of the measurement object S.

However, actually, the lights input to the optical fibers 313 to 316 are mixed in a process until the lights are output from the optical fiber 312. Consequently, averaging processing for intensity is performed on the lights output from the optical fiber 312. The averaging processing means processing for generating an average signal corresponding to an average of intensities for each wavelength concerning a plurality of lights passed through the plurality of pinholes. In this example, the averaging processing is integration processing.

In this example, optical signals passed through the pinholes are mixed while the optical signals pass through the fiber coupler 330, the optical fibers 317 and 318, the fiber coupler 320, and the optical fiber 312. Thereafter, a mixed optical signal is converted into an electric signal by the light receiving section 140 through the spectral section 130. That is, in this example, the averaging processing is performed in a state of the optical signal. In FIG. 4, the light reception waveform W0 corresponding to later light received by the light receiving section 140 is indicated by a solid line. A peak wavelength of the light reception waveform W0 is $\lambda 0$.

The averaging processing for the light reception waveform W0 is optically performed in this way, whereby a component of light that causes a random measurement error due to irregular reflection is cancelled. Therefore, the peak wavelength 20 is closer to a peak wavelength corresponding to a real measurement distance than the peak wavelengths λ1 to λ4. The real measurement distance is a measurement distance that should be specified when irregular reflection of light does not occur. Therefore, it is possible to more accurately specify a measurement distance by specifying the peak wavelength λ0 of the light reception waveform W0.

(3) Light Projecting Section

Figure 5A:
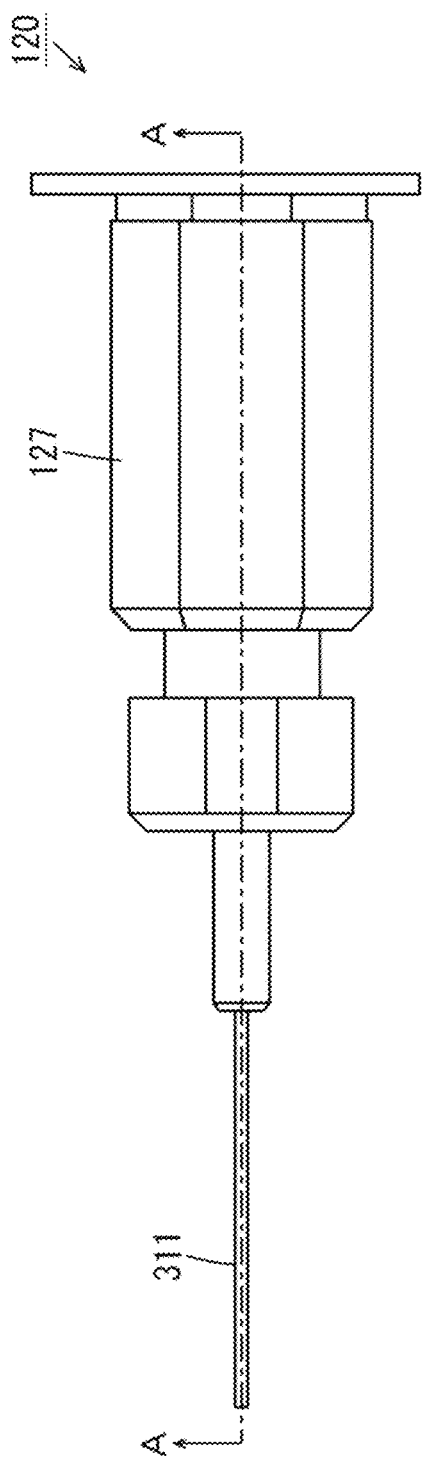
FIGS. 5A and 5B are a plan view and a sectional view showing the configuration of a light projecting section.
Figure 5B:
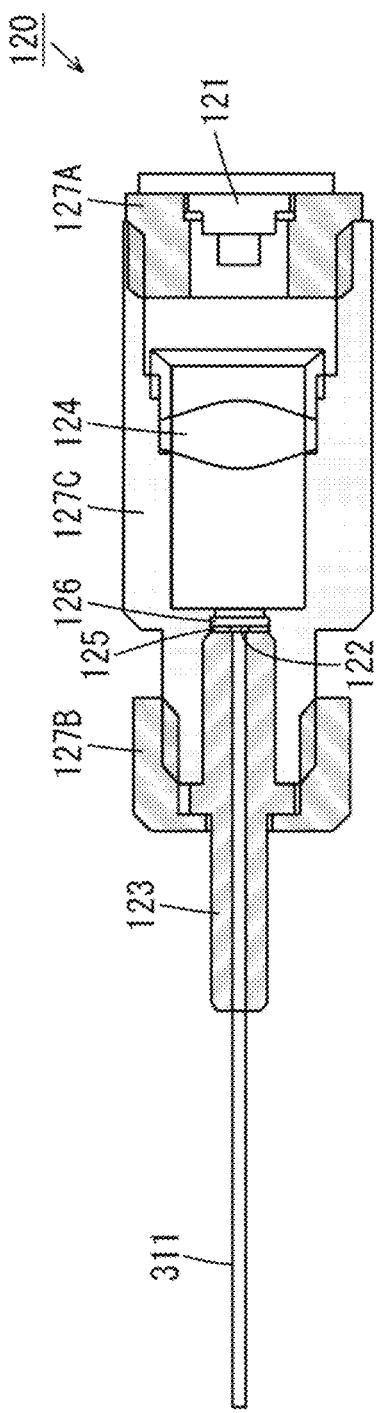

FIGS. 5A and 5B are respectively a plan view and a sectional view showing the configuration of the light projecting section 120. As shown in FIG. 5B, the light projecting section 120 includes a light source 121, a phosphor 122, a ferrule 123, a lens 124, a holder 125, a filter element 126, and an element holder 127. The element holder 127 includes a light-source fixing section 127A, a ferrule fixing section 127B, and a lens fixing section 127C. The light source 121, the ferrule 123, and the lens 124 are respectively fixed to the light-source fixing section 127A, the ferrule fixing section 127B, and the lens fixing section 127C of the element holder 127.

The light source 121 is a laser light source that emits light having a single wavelength. In this embodiment, the light source 121 emits light in a blue region or an ultraviolet region having a wavelength of 450 nm or less. The phosphor 122 absorbs excitation light in the blue region or the ultraviolet region and discharges fluorescent light in a wavelength region different from the wavelength region of the excitation light. The phosphor 122 may discharge fluorescent light in a yellow region, may discharge fluorescent light in a green region, or may discharge fluorescent light in a red region. The phosphor 122 may be configured by a plurality of fluorescent members.

The ferrule 123 holds the end portion of the optical fiber 311 of the light guide section 300 shown in FIG. 1. The lens 124 is disposed between the light source 121 and the ferrule 123. One end face of the holder 125 having an annular shape is attached to the end portion of the ferrule 123 (the optical fiber 311). The phosphor 122 is housed in the inner circumferential portion of the holder 125. The filter element 126 is attached to the other end face of the holder 125 to cover the phosphor 122 in the holder 125. The filter element 126 is a reflection-type filter. The filter element 126 reflects light in the yellow region, the green region, or the red region and transmits light in the blue region or the ultraviolet region.

With this configuration, light emitted by the light source 121 passes through the lens 124 to thereby be condensed on the phosphor 122 as excitation light. The phosphor 122 absorbs the excitation light and discharges fluorescent light. The excitation light transmitted through the phosphor 122 without being absorbed by the phosphor 122 and the fluorescent light discharged from the phosphor 122 are mixed, whereby light in a wide wavelength band is generated. In this example, in order to generate light obtained by mixing the excitation light and the fluorescent light at a desired ratio, the thickness of the phosphor 122 in the optical path direction is set to, for example, 10 µm to 200 µm. The concentration of the phosphor 122 in the holder 125 is set to, for example, 30% to 60%.

Light generated in the light projecting section 120 passes through the ferrule 123 to thereby be input to the optical fiber 311. Fluorescent light discharged to a direction opposite to the optical fiber 311 by the phosphor 122 is reflected to the direction of the optical fiber 311 by the filter element 126. Consequently, it is possible to efficiently input the fluorescent light to the optical fiber 311.

In this example, the phosphor 122 is housed in the holder 125. However, the present invention is not limited to this. The phosphor 122 may be applied to the end face of the ferrule 123. In this case, the light projecting section 120 does not include the holder 125. The light projecting section 120 includes the filter element 126. However, the present invention is not limited to this. When sufficient fluorescent light is input to the optical fiber 311, the light projecting section 120 may not include the filter element 126.

(4) Arithmetic Processing Section

In the storing section 151 of the arithmetic processing section 150 shown in FIG. 1, a conversion formula for the positions of the pixels of the light receiving section 140, the peak wavelength λ0 of the output light reception waveform W0, and the measurement distance is stored in advance. The control section 152 of the arithmetic processing section 150 specifies the positions of the pixels, which output light reception signals, and sequentially calculates the peak wavelength λ0 of the light reception waveform W0 and the measurement distance on the basis of the specified positions of the pixels and the conversion formula stored in the storing section 151. Consequently, it is possible to measure thickness, a distance, or displacement of the measurement object S. The control section 152 performs removal of a base waveform and correction of a temperature characteristic of the light receiving section 140 in order to more accurately calculate the measurement distance.

(a) Removal of a Base Waveform

Figure 6:
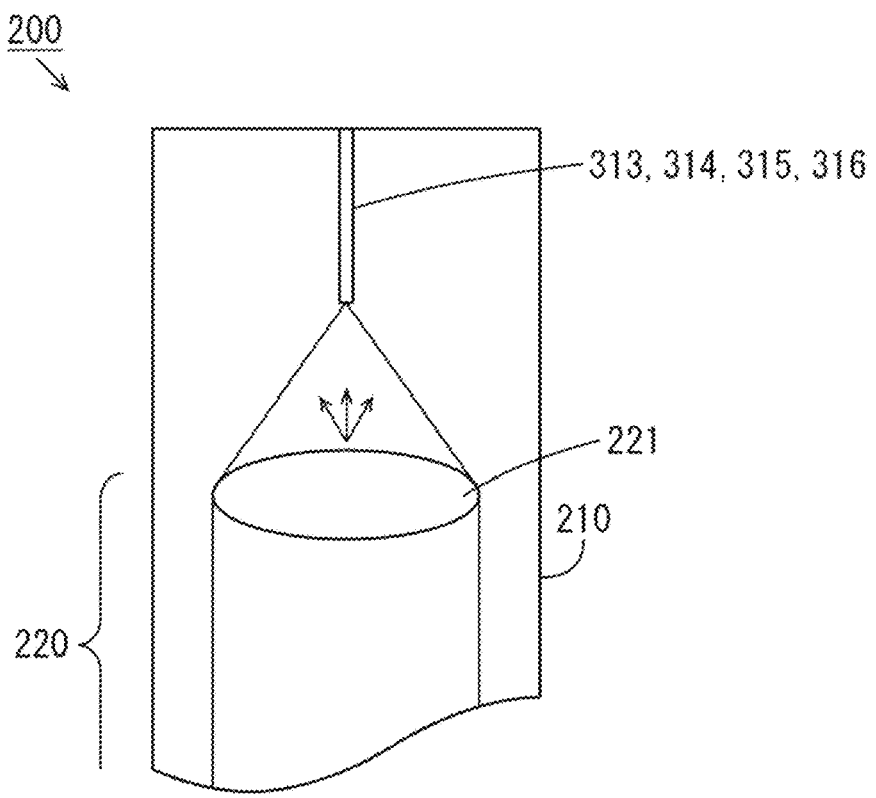
FIG. 6 is a schematic diagram showing an example of light reflected in a portion different from a measurement object.

Light reflected on a portion different from the measurement object S is sometimes received by the light receiving section 140. FIG. 6 is a schematic diagram showing an example of the light reflected on the portion different from the measurement object S. In the example shown in FIG. 6, light (light indicated by an arrow) directly reflected by the refractive lens 221 of the lens unit 220 is input to the optical fibers 313 to 316. Such light does not include a component indicating the measurement distance and includes an unnecessary component.

Figure 7:
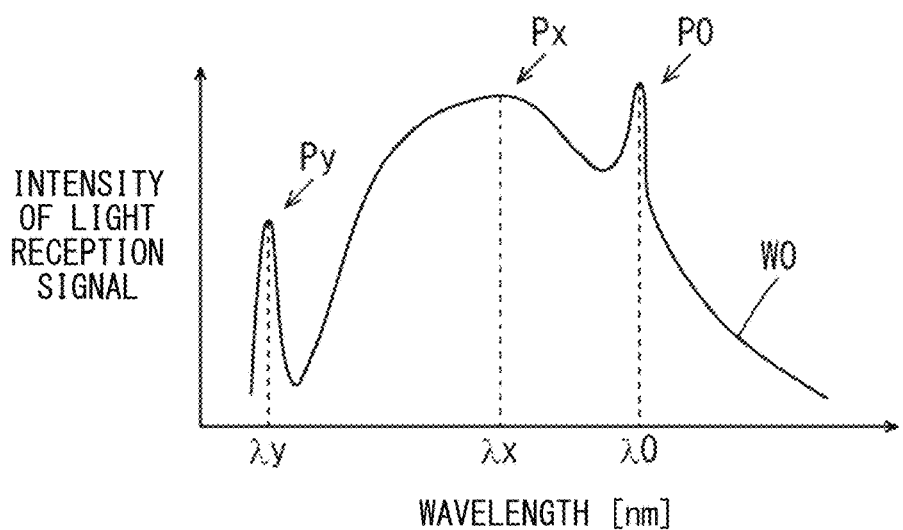
FIG. 7 is a diagram showing a light reception waveform including an unnecessary component.

FIG. 7 is a diagram showing the light reception waveform W0 including an unnecessary component. As shown in FIG. 7, the light reception waveform W0 includes three peaks P0, Px, and Py. The peak P0 is generated by the light reflected on the surface of the measurement object S. The peak P0 has a steep shape. A peak wavelength is λ0. The peak Px is generated by the light reflected on the portion different from the measurement object S. The peak Px has a smooth shape. A peak wavelength is λx.

The peak Py is generated by light of the light source 121 (FIG. 5B) having an oscillation wavelength λy reflected on a portion different from the measurement object S. The peak Py has a steep shape. A peak wavelength is λy. Note that, in this example, the intensity of excitation light emitted by the light source 121, which is a laser light source, is large. Therefore, light having a wavelength component equivalent to the excitation light is not used as measurement light.

The peak wavelength λx is relatively close to the peak wavelength λ0. The peak Px is wide. Therefore, the peak P0 is buried in the peak Px. In this case, it is difficult to accurately specify the peak wavelength λ0. Therefore, correction for removing a portion due to the peak Px (hereinafter referred to as base waveform BL) from the light reception waveform W0 is performed.

Figure 8:
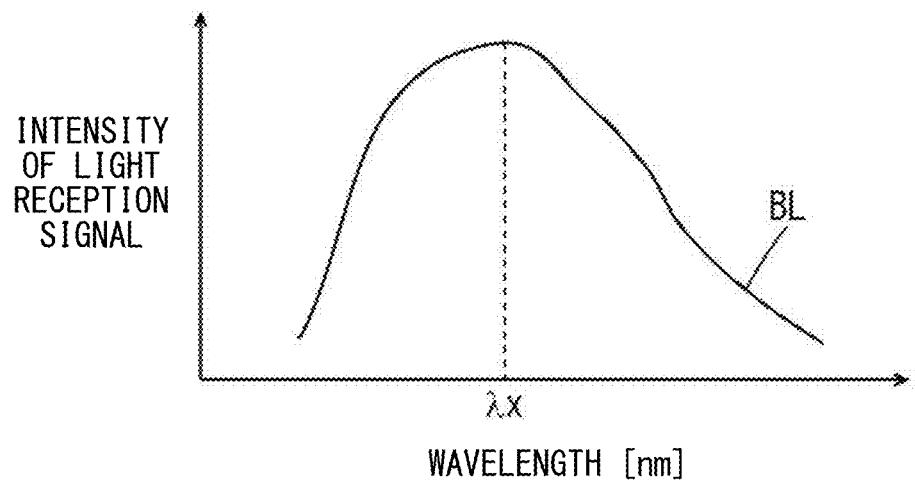
FIG. 8 is a diagram showing a base waveform of a light reception waveform.

FIG. 8 is a diagram showing the base waveform BL of the light reception waveform W0. In this embodiment, the control section 152 applies low-pass filter processing for identifying the peak Px and the peak P0 to the light reception waveform W0 to thereby acquire the base waveform BL shown in FIG. 8. A method of acquiring the base waveform BL is not limited to the method explained above. Data indicating the base waveform BL may be stored in advance in the storing section 151 shown in FIG. 1. In this case, the control section 152 performs, on the basis of the acquired base waveform BL shown in FIG. 8, correction of the light reception waveform W0 to remove the base waveform BL from the light reception waveform W0 shown in FIG. 7.

Figure 9:
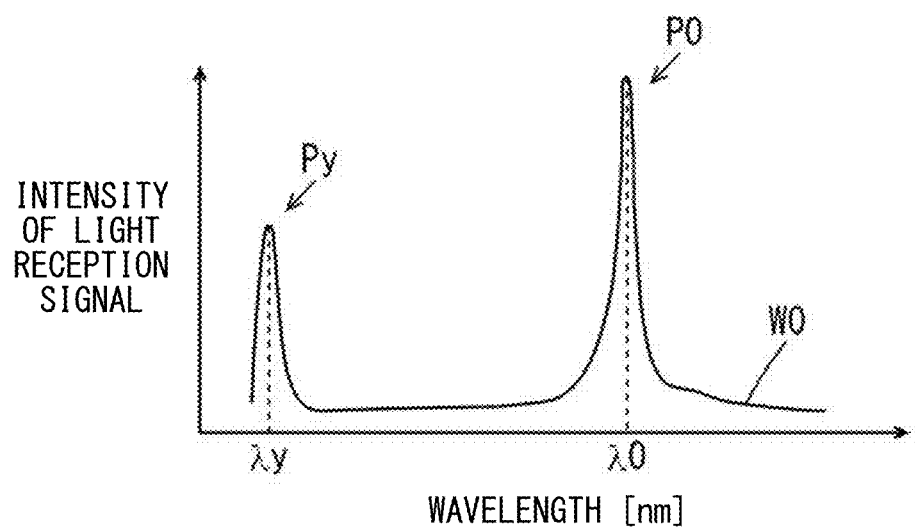
FIG. 9 is a diagram showing a light reception waveform from which the base waveform is removed.

FIG. 9 is a diagram showing the light reception waveform W0 from which the base waveform BL is removed. In an example shown in FIG. 9, the peak wavelength λ0 slightly further shifts to the short wavelength side than the peak wavelength λ0 shown in FIG. 7. In this way, by removing the base waveform BL from the light reception waveform W0, it is possible to more accurately specify the peak wavelength λ0. As a result, it is possible to more accurately calculate a measurement distance. Note that a portion due to the peak Py of the light receipt waveform W0 does not affect accurate specifying of the peak wavelength λ0. Therefore, the portion is not removed from the light reception waveform W0. The present invention is not limited to this. Processing for removing the portion due to the peak Py from the light reception waveform W0 may be performed.

(b) Correction of a Temperature Characteristic of the Light Receiving Section.

As explained above, light having a specific wavelength is received by the pixel of the light receiving section 140 associated with the wavelength. However, because of a change in the position of the light receiving surface of the light receiving section 140 or a change in a tilt of the light receiving surface involved in an ambient temperature change, the light having the specific wavelength is sometimes received by a pixel different from the pixel associated with the wavelength. In this case, a measurement distance cannot be accurately calculated. Therefore, correction of a temperature characteristic of the light receiving section 140 explained below is performed.

Figure 10:
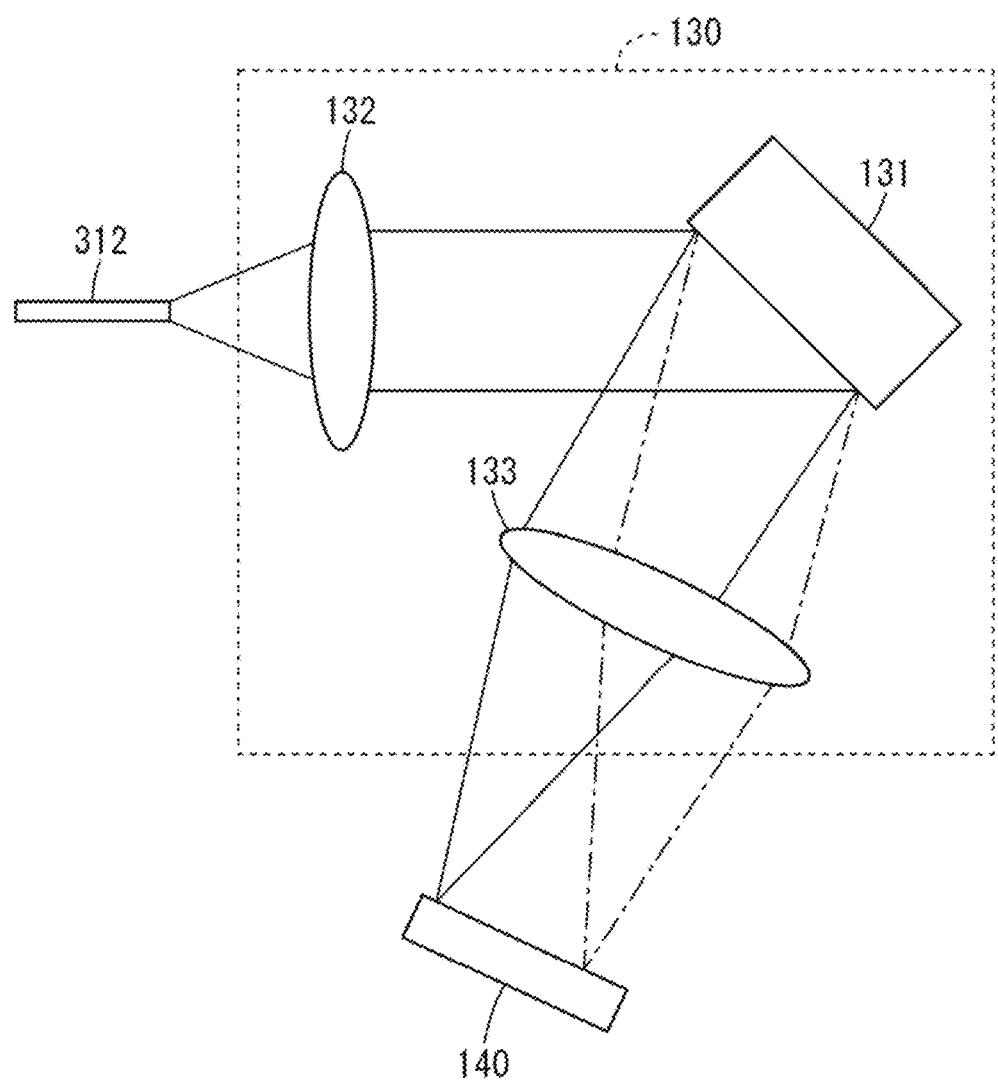
FIG. 10 is a diagram showing a path of light guided to the light receiving section.

FIG. 10 is a diagram showing a path of light guided to the light receiving section 140. As shown in FIG. 10, in addition to primary light spectrally dispersed by the diffraction grating 131, zero-th order light regularly reflected by the diffraction grating 131 is guided to the light receiving section 140. In FIG. 10, the primary light is indicated by a solid line and the zero-th order light is indicated by an alternate long and short dash line. The zero-th order light is not used for the calculation of a measurement distance.

Figure 11:
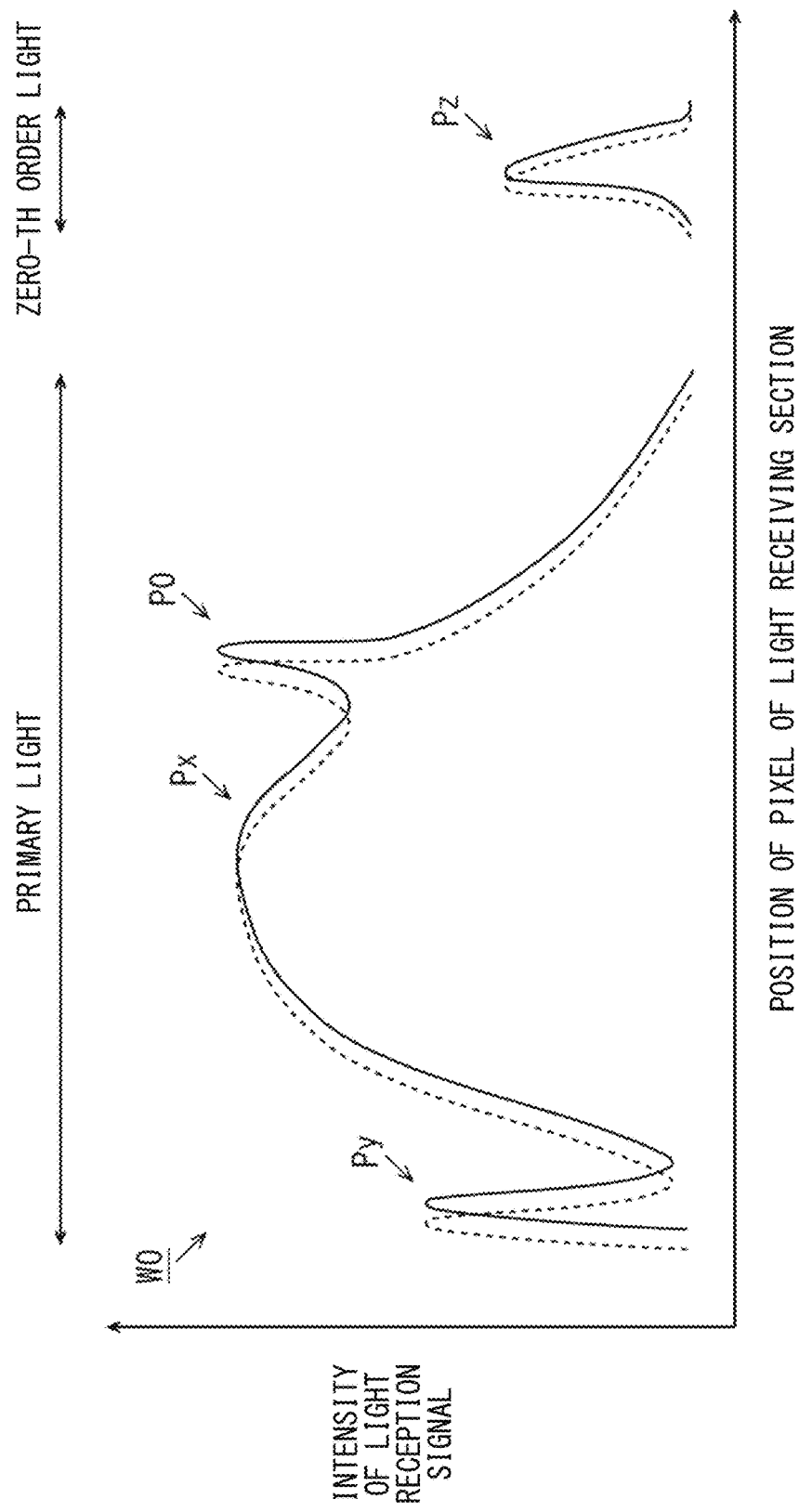
FIG. 11 is a diagram showing a light reception waveform of the light guided to the light receiving section shown in FIG. 10.

FIG. 11 is a diagram showing the light reception waveform W0 of the light guided to the light receiving section 140 shown in FIG. 10. The horizontal axis of FIG. 11 indicates the position of the pixel of the light receiving section 140 and the vertical axis indicates the intensity of a light reception signal. As shown in FIG. 11, the light reception waveform W0 includes a portion corresponding to the primary light and a portion corresponding to the zero-th order light. Like the light reception waveform W0 shown in FIG. 7, the portion of the light reception waveform W0 corresponding to the primary light includes three peaks P0, Px, and Py. The portion of the light reception waveform W0 corresponding to the zero-th order light includes one peak Pz.

In the storing section 151 shown in FIG. 1, a position of a pixel where the center of at least one of the peaks Px, Py, and Pz should appear is stored in advance as a reference position. The control section 152 specifies the positions of the peaks Px to Pz corresponding to the reference position stored in the storing section 151. The control section 152 compares the specified positions of the peaks Px to Pz and the reference position to thereby calculate deviation of the position of the pixel and corrects the position of the light reception waveform W0 on the basis of the calculated deviation of the position of the pixel. In FIG. 11, the light reception waveform W0 after the correction of the position is indicated by a dotted line.

In the storing section 151, an interval of pixels in which the centers of at least two peaks among the peaks Px, Py, and Pz should appear is stored in advance as a reference interval. The control section 152 specifies an interval of the peaks Px to Pz corresponding to the reference interval stored in the storing section 151. The control section 152 compares the specified interval of the peaks Px to Pz and the reference interval to thereby calculate deviation of the interval of the pixels and corrects the shape of the light reception waveform W0 on the basis of the calculated deviation of the interval of the pixels.

As the correction of the temperature characteristic of the light receiving section 140, only one of the correction of the position of the light reception waveform W0 based on the deviation of the position of the pixel and the correction of the shape of the light reception waveform W0 based on the deviation of the interval of the pixels may be performed or both of the corrections may be performed. The correction of the temperature characteristic of the light receiving section 140 is performed earlier than the removal of the base waveform BL. It is possible to more accurately calculate a measurement distance by specifying the peak P0 of the light reception waveform W0 after the correction.

(5) Basic Use Example of the Confocal Displacement Sensor

A basic use example is explained concerning the confocal displacement sensor 500. In the following use example, it is assumed that a power supply of the confocal displacement sensor 500 is turned on in an initial state. It is assumed that the CPU 403 of the control device 400 shown in FIG. 1 is in the measurement mode.

First, the user fixes the measurement object S on a placement table for displacement measurement. Thereafter, the user roughly positions the measurement head 200 with respect to the measurement object S such that light emitted from the measurement head 200 is irradiated on the measurement object S. The measurement head 200 is fixed to a desired position of the user in a desired posture by a clamp member or the like.

Figure 12:
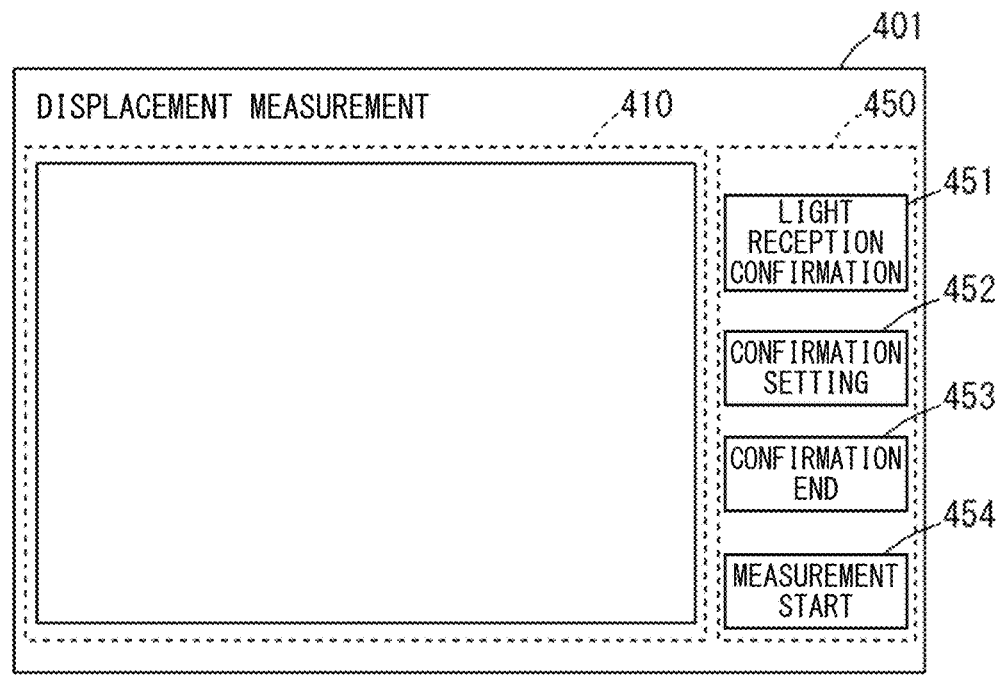
FIG. 12 is a diagram showing a display example of a display device of a control device in an initial state.

FIG. 12 is a diagram showing a display example of the display device 401 of the control device 400 in the initial state. As shown in FIG. 12, for example, a first display region 410 and a second display region 450 are set in the display device 401. In the initial state, nothing is displayed in the first display region 410. On the other hand, a light reception confirmation button 451, a confirmation setting button 452, a confirmation end button 453, and a measurement start button 454 are displayed in the second display region 450.

Unless a relative position and a relative posture of the measurement head 200 with respect to the measurement object S are appropriate, it is difficult to accurately measure displacement of the measurement object S. Therefore, in order to more appropriately adjust the position and the posture of the measurement head 200, the user operates the light reception confirmation button 451 using the operation section 402 shown in FIG. 1. In this case, the CPU 403 is switched from the measurement mode to the confirmation mode. In the confirmation mode, change information is generated at a fixed cycle by the CPU 403. The generated change information is displayed in the first display region 410. Specific content and a display example of the change information are explained below.

In this state, the user can more appropriately position the measurement head 200 by finely adjusting the position and the posture of the measurement head 200 while confirming the change information. When the positioning of the measurement head 200 is completed, the user operates the confirmation end button 453 using the operation section 402 shown in FIG. 1. Consequently, an operation mode of the CPU 403 is switched from the confirmation mode to the measurement mode. Thereafter, the user can measure displacement of the measurement object S by operating the measurement start button 454.

Figure 13:
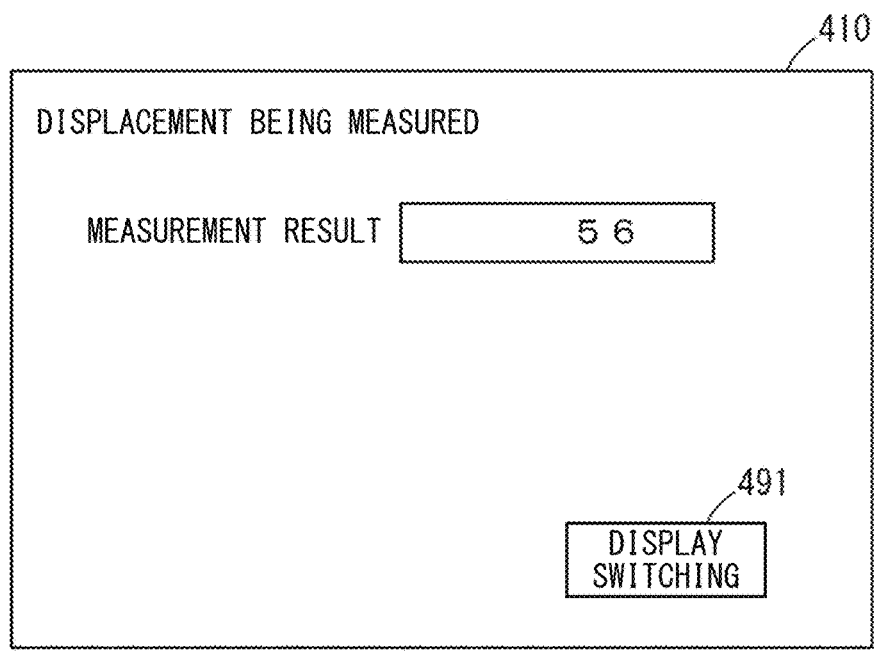
FIG. 13 is a diagram showing an example of a measurement result displayed in a first display region shown in FIG. 12.
Figure 14:
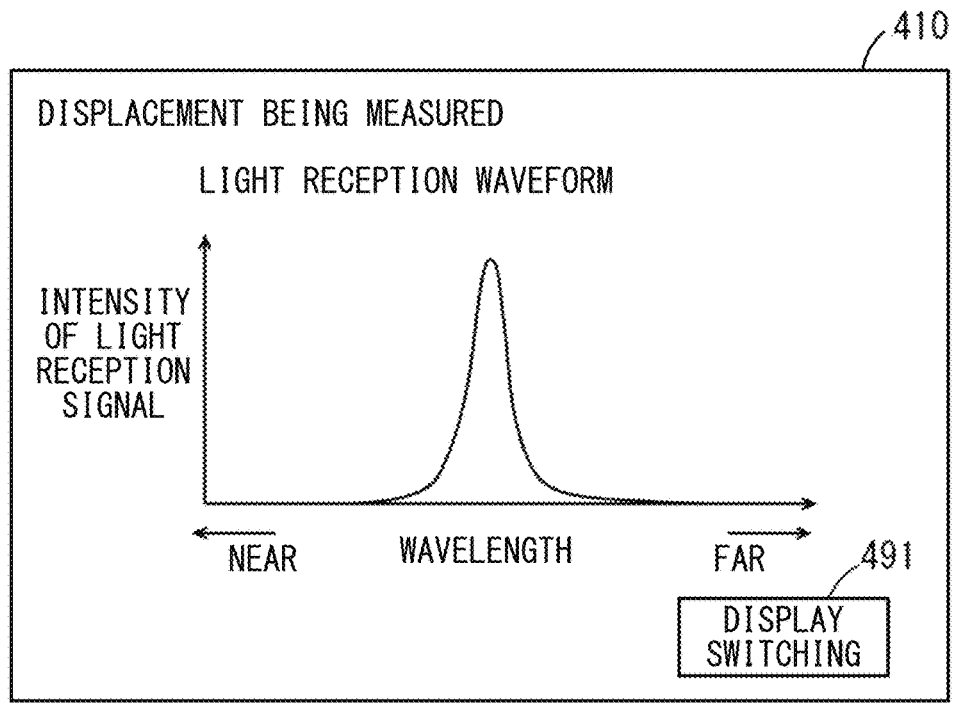
FIG. 14 is a diagram showing an example of a light reception waveform displayed in the first display region shown in FIG. 12.

When displacement of the measurement object S is measured in a state in which the CPU 403 is in the measurement mode, a numerical value indicating a measurement result or a light reception waveform acquired at the present point in time are displayed in the first display region 410 shown in FIG. 12. FIG. 13 is a diagram showing an example of the measurement result displayed in the first display region 410 shown in FIG. 12. FIG. 14 is a diagram showing an example of the light reception waveform displayed in the first display region 410 shown in FIG. 12.

In the example shown in FIG. 13, a numerical value indicating a measurement result of displacement is displayed and a switching button 491 is displayed in the first display region 410. In the example shown in FIG. 14, a light reception waveform acquired at the present point in time is displayed and the switching button 491 is displayed in the first display region 410. The user can switch a display state of the first display region 410 to a display state of the light reception waveform shown in FIG. 14 by operating the switching button 491 shown in FIG. 13 using the operation section 402 shown in FIG. 1. The user can switch the display state of the first display region 410 to a display state of the measurement result by the numerical value shown in FIG. 13 by operating the switching button 491 shown in FIG. 14 using the operation section 402 shown in FIG. 1.

In a state in which the CPU 403 is in the confirmation mode, during light reception confirmation processing, the CPU 403 can determine propriety of the position and the posture of the measurement head 200 (hereinafter referred to as propriety determination) on the basis of whether a peak value of a light reception signal is higher than a certain threshold and cause the display device 401 to display a result of the determination together with the change information. The CPU 403 can use only a peak within a certain wavelength range for the propriety determination. Further, the CPU 403 can display the change information on the display device 401 in various forms.

Various kinds of information including the threshold of the propriety determination used in the light reception confirmation processing, the wavelength range of the propriety determination, and the display forms are stored in the memory 404 shown in FIG. 1 as setting information. The user can cause the memory 404 to store desired setting information by operating the confirmation setting button 452 shown in FIG. 12 and inputting those kinds of information using the operation section 402 shown in FIG. 1.

Figure 15:
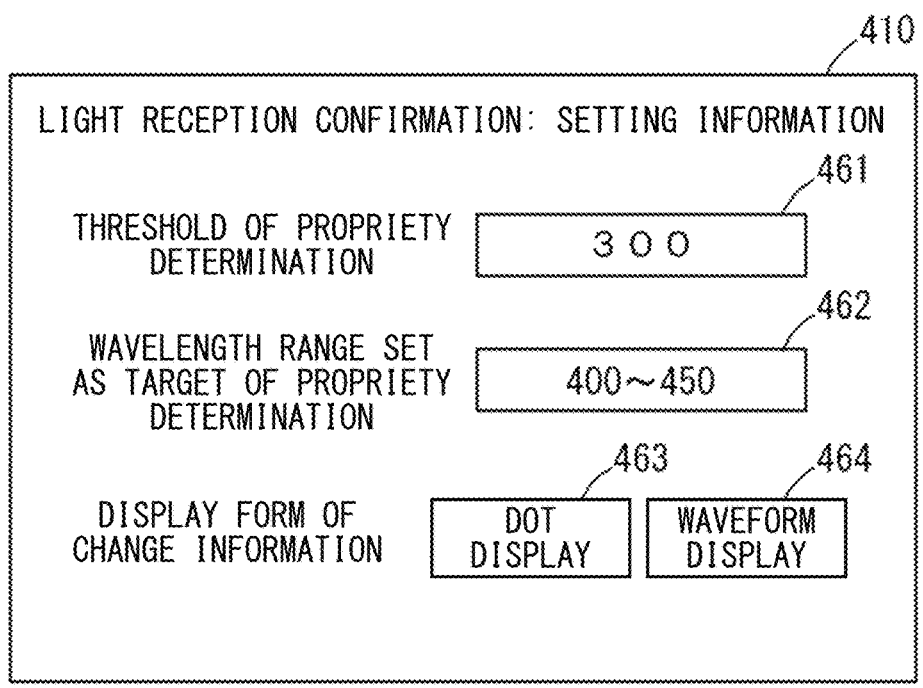
FIG. 15 is a diagram showing an example of an input screen of setting information displayed in the first display region shown in FIG. 12.

FIG. 15 is a diagram showing an example of an input screen for setting information displayed in the first display region 410 shown in FIG. 12. In the example shown in FIG. 15, two input fields 461 and 462 and two display form buttons 463 and 464 are displayed in the first display region 410. One input field 461 is used by the user to designate the threshold of the propriety determination. The other input field 462 is used by the user to designate the wavelength range of the propriety determination. The display form buttons 463 and 464 are used by the user to select whether a change of peak values of light reception amounts from a point in time before the present point in time to the present point in time is displayed by, for example, a dot plot graph or a waveform graph as change information.

Note that the threshold of the propriety determination may be respectively set to different values concerning a plurality of wavelength ranges. In this case, on a setting screen, for example, a plurality of input fields for inputting a plurality of thresholds respectively corresponding to the plurality of wavelength ranges may be displayed. The threshold of the propriety determination may be stored in the memory 404 in advance by a manufacturer of the confocal displacement sensor 500.

FIGS. 16 to 21 are diagrams showing examples of the change information displayed in the first display region 410 shown in FIG. 12 by the light reception confirmation processing. In the example shown in FIG. 16, the change information displayed in the first display region include a peak value of a light reception signal acquired at the present point in time (hereinafter referred to as present peak value), a maximum of peak values of light reception signals acquired from a start of the light reception confirmation processing until the present point in time (hereinafter referred to as maximum peak value in the past), and a dot plot graph that shows a change of the peak values of the light reception signals from the start of the light reception confirmation processing until the present point in time. A propriety determination result of the position and the posture of the measurement head 200 is also displayed.

Figure 16:
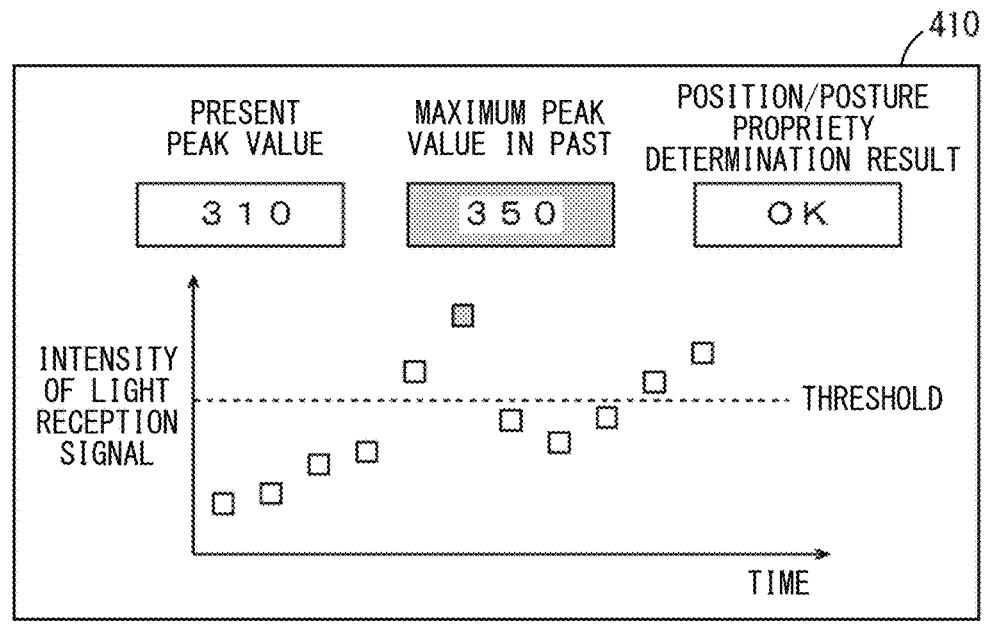
FIG. 16 is a diagram showing an example of change information displayed in the first display region shown in FIG. 12 by light reception confirmation processing.

In the dot plot graph of FIG. 16, the horizontal axis indicates time and the vertical axis indicates the intensity of a light reception signal. In the dot plot graph, peak values of light reception signals acquired by the control section 152 at a fixed cycle from the start of the light reception confirmation processing are displayed as dots and the threshold of the propriety determination set in advance is indicated by a dotted line. Note that the user may be able to set a display cycle of the peak values and a scale of the horizontal axis.

Further, in the example shown in FIG. 16, as indicated by hatching, the maximum peak value in the past and a dot corresponding to the peak value are highlighted. Consequently, the user can easily recognize a change overtime of the peak values of the light reception signals by visually recognizing the display device 401. Therefore, it is possible to adjust the position and the posture of the measurement head 200 such that a higher peak can be obtained.

In the example shown in FIG. 16, a position/posture propriety determination result is displayed. The position/posture propriety determination result is displayed as "OK" when a peak value of a light reception signal exceeds the threshold and displayed as "NG" when a peak value of a light reception signal does not exceed the threshold. When the position/posture propriety determination result is displayed as "OK", the user is urged to end the adjustment. A threshold for displaying "OK" or "NG" of the position/posture propriety determination result may be the same as or may be different from the threshold of the propriety determination set by the screen shown in FIG. 15.

For example, the position/posture propriety determination result may be displayed as "OK" if the position/posture propriety at the present point in time is better than in the past. The position/posture propriety determination result may be displayed as "OK" when the position/posture propriety at the present point in time is better than the position/posture propriety in the past and is higher than a minimum limit range in which the confocal displacement sensor 500 can measure the measurement object S.

When the position/posture propriety determination result is in a range in which further adjustment of the position and the posture does not greatly affect accuracy of measurement, an adjustment end is notified to the user to urge the user to shift to a step of displacement measurement.

Figure 17:
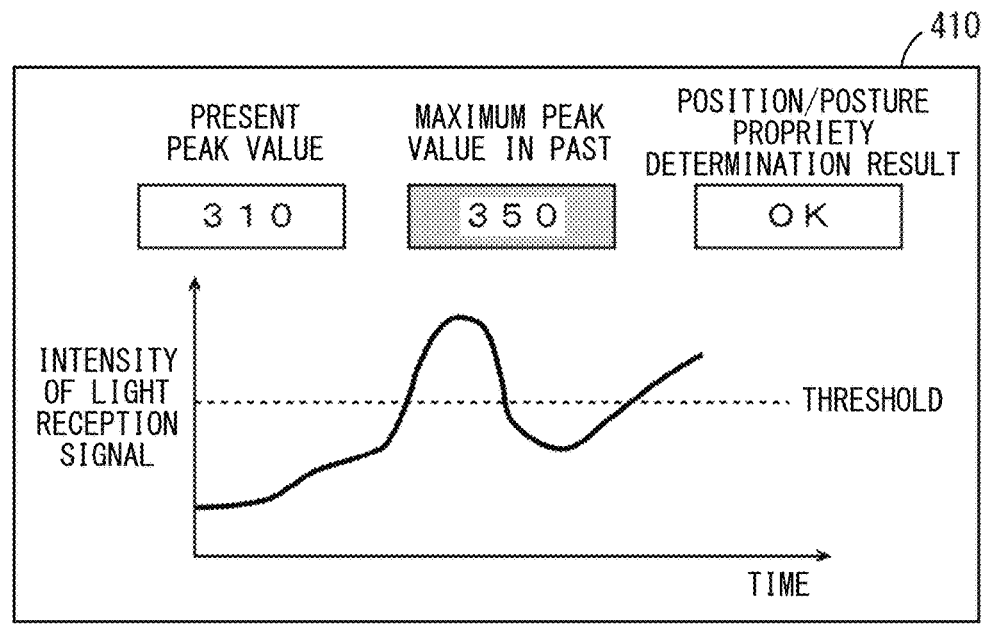
FIG. 17 is a diagram showing an example of the change information displayed in the first display region shown in FIG. 12 by the light reception confirmation processing.

The example shown in FIG. 17 is the same as the example shown in FIG. 16 except points explained below. In the example shown in FIG. 17, the change of the peak values of the light reception signals from the start of the light reception confirmation processing to the present point in time is displayed by a waveform graph instead of the dot plot graph.

Figure 18:
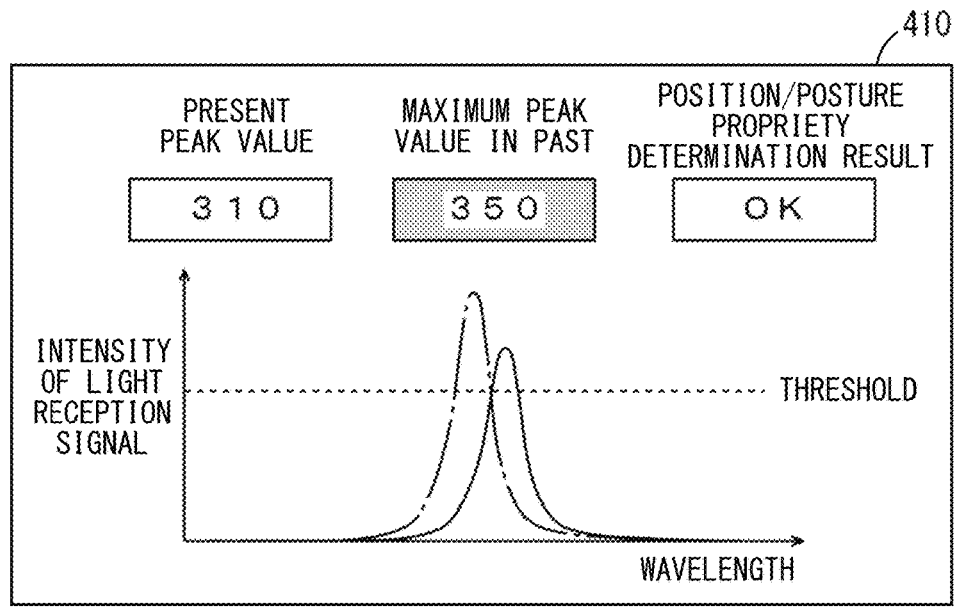
FIG. 18 is a diagram showing an example of the change information displayed in the first display region shown in FIG. 12 by the light reception confirmation processing.

In the example shown in FIG. 18, the present peak value and the maximum peak value in the past are displayed as the change information. A waveform graph including a light reception waveform at the present point in time and a light reception waveform at the time when the maximum peak value in the past is obtained is displayed as the change information. Further, the propriety determination result of the position and the posture of the measurement head 200 is displayed.

In the waveform graph of FIG. 18, the horizontal axis indicates a wavelength of light received by the light receiving section 140 and the vertical axis indicates the intensity of a light reception signal. In the waveform graph, the light reception waveform at the time when the maximum peak value in the past is obtained is indicated by an alternate long and short dash line and the light reception waveform at the present point is indicated by a solid line. Consequently, the user can adjust the position and the posture of the measurement head 200 such that a peak of the light receptor waveform at the present point in time exceeds a peak of the light reception waveform in the past indicated by the alternate long and short dash line while visually recognizing the display device 401.

The wavelength indicated by the horizontal axis of the waveform graph shown in FIG. 18 corresponds to the distance between the measurement object S and the measurement head 200 in the optical axis direction of the measurement head 200. Therefore, the user can recognize a positional relation between the measurement object S and the measurement head 200 in the optical axis direction of the measurement head 200 by visually recognizing a light reception waveform at the present point in time. Consequently, the user can easily adjust the position of the measurement head 200 such that a peak wavelength of the light reception signal is within a range of a wavelength corresponding to the measurement range MR shown in FIG. 2.

Figure 19:
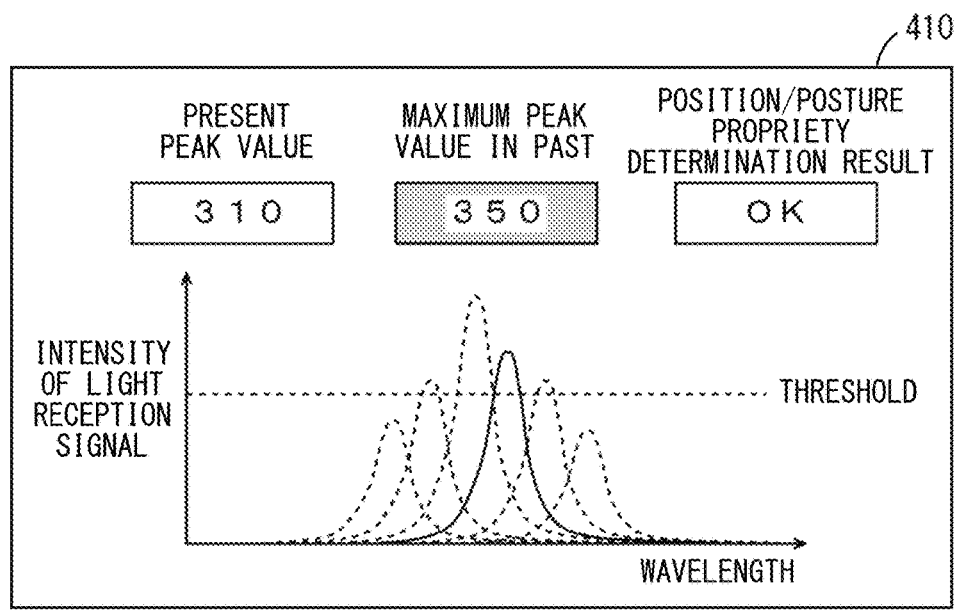
FIG. 19 is a diagram showing an example of the change information displayed in the first display region shown in FIG. 12 by the light reception confirmation processing.

The example shown in FIG. 19 is the same as the example shown in FIG. 18 except points explained below. In the example shown in FIG. 19, a waveform graph including a light reception waveform at the present point in time and a plurality of light reception waveforms acquired by the control section 152 at a fixed cycle from the start of the light reception confirmation processing is displayed instead of the waveform graph shown in FIG. 18.

In the waveform graph shown in FIG. 19, the horizontal axis indicates the wavelength of light received by the light receiving section 140 and the vertical axis indicates the intensity of a light reception signal. In the waveform graph, a plurality of light reception waveforms acquired in the past are indicated by dotted lines and the light reception waveform at the present point in time is indicated by a solid line. Consequently, the user can adjust the position and the posture of the measurement head 200 such that a peak of the light reception signal at the present point in time exceeds a peak of the plurality of light reception waveforms in the past indicated by the dotted lines while visually recognizing the display device 401.

Figure 20:
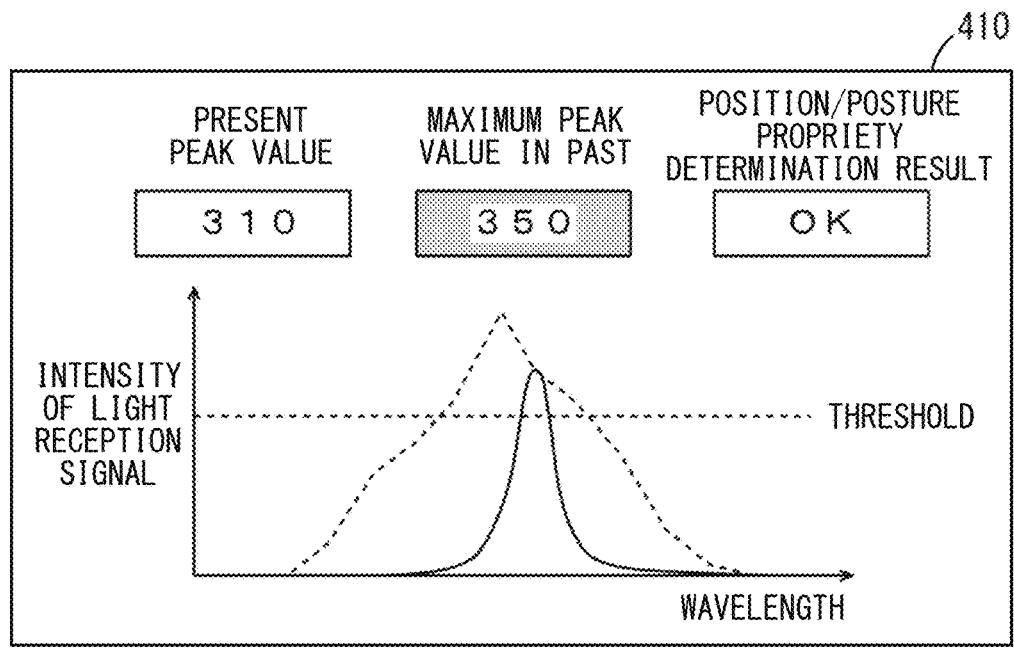
FIG. 20 is a diagram showing an example of the change information displayed in the first display region shown in FIG. 12 by the light reception confirmation processing.

The example shown in FIG. 20 is the same as the example shown in FIG. 18 except points explained below. In the example shown in FIG. 20, a waveform graph including a light reception waveform at the present point in time and an envelope connecting peaks of a plurality of light reception waveforms acquired by the control section 152 from the start of the light reception confirmation processing is displayed instead of the waveform graph shown in FIG. 18.

In the waveform graph shown in FIG. 20, the horizontal axis indicates the waveform of light received by the light receiving section 140 and the vertical axis indicates the intensity of a light reception signal. In the waveform graph, an envelope connecting peaks of a plurality of light reception waveforms acquired in the past is indicated by a dotted line and the light reception waveform at the present point in time is indicated by a solid line. Consequently, the user can adjust the position and the posture of the measurement head 200 such that the height of a peak of the light reception signal at the present point in time approaches a highest point of the envelope indicated by the dotted line or exceeds the highest point while visually recognizing the display device 401.

Figure 21:
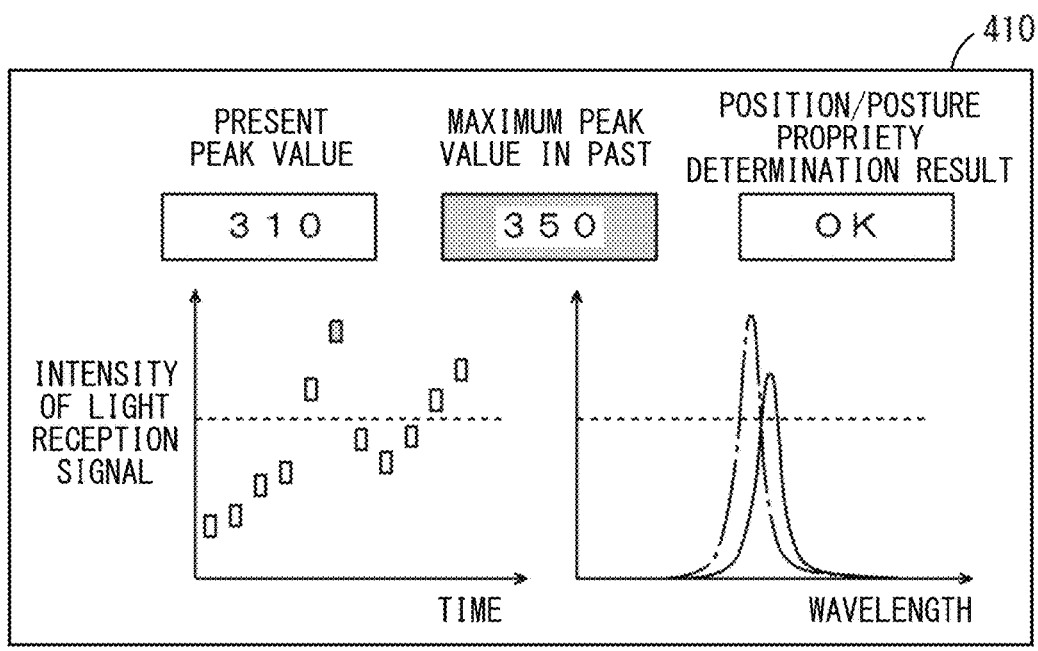
FIG. 21 is a diagram showing an example of the change information displayed in the first display region shown in FIG. 12 by the light reception confirmation processing.

The example shown in FIG. 21 is the same as the example shown in FIG. 16 except points explained below. In the example shown in FIG. 21, the waveform graph of FIG. 18 is displayed together with the dot plot graph of FIG. 16. In this case, the user can easily recognize a change over time of the peak of the light reception signal and a change over time of the light reception waveform. Note that, in the example shown in FIG. 21, the waveform graph of FIG. 17 may be displayed instead of the dot plot graph displayed on the left side of the first display region 410. The waveform graph of FIG. 19 or 20 may be displayed as the waveform graph displayed on the right side of the first display region 410.

(6) Displacement Measurement Processing

Figure 22:
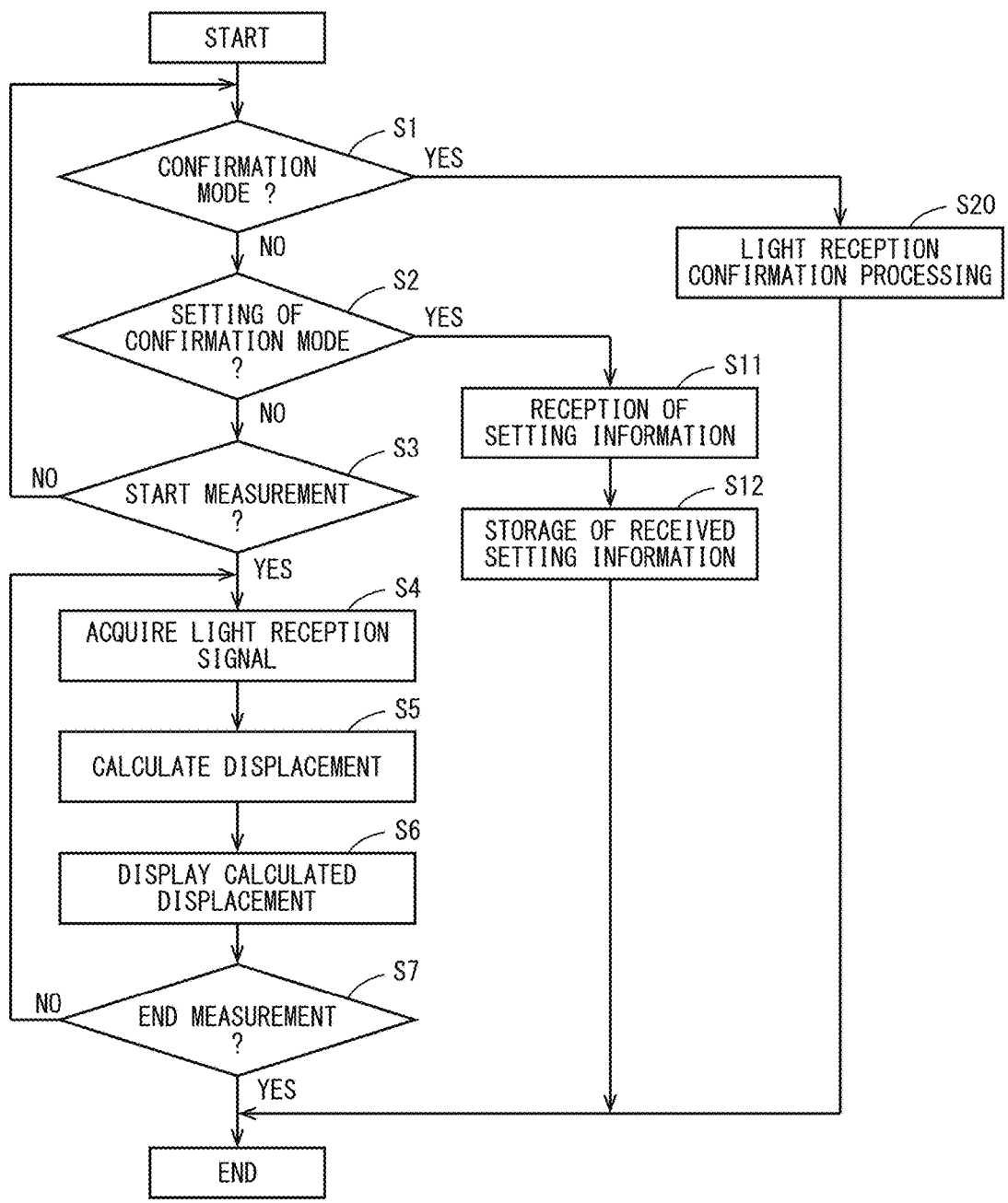
FIG. 22 is a flowchart for explaining displacement measurement processing.

FIG. 22 is a flowchart for explaining the displacement measurement processing. When the power supply of the confocal displacement sensor 500 is turned on, the CPU 403 shown in FIG. 1 executes the displacement measurement processing explained below at a fixed cycle. In an initial state, the CPU 403 is in the measurement mode. It is assumed that the screen shown in FIG. 12 is displayed on the display device 401.

First, the CPU 403 determines whether switching to the confirmation mode is instructed by, for example, operating the light reception confirmation button 451 shown in FIG. 12 (step S1). When the switching to the confirmation mode is instructed, the CPU 403 performs light reception confirmation processing in step S20 explained below and thereafter ends the displacement measurement processing.

On the other hand, when the switching to the confirmation mode is not instructed, the CPU 403 determines whether setting of the confirmation mode is instructed by, for example, operating the confirmation setting button 452 shown in FIG. 12 (step S2). When the setting of the confirmation mode is instructed, the control section 152 receives setting information in response to operation of the operation section 402 by the user (step S11), stores the received setting information in the memory 404 (step S12), and ends the displacement measurement processing.

When the setting of the confirmation mode is not instructed in step S2, the CPU 403 determines whether a start of measurement is instructed by, for example, operating the measurement start button 454 shown in FIG. 12 (step S3). When the start of the measurement is not instructed, the CPU 403 executes the processing in step S1.

On the other hand, when the start of the measurement is instructed, the CPU 403 acquires a light reception signal given from the control section 152 (step S4). The removal of a base waveform and the correction of the temperature characteristic of the light receiving section 140 have been performed by the control section 152 on the light reception signal given from the control section 152.

In the memory 404, as in the storing section 151, a conversion formula for the positions of the pixels of the light receiving section 140, a peak wavelength of an output light reception waveform, and a measurement distance is stored in advance. The CPU 403 calculates displacement of the measurement object S on the basis of the light reception signal after the correction and the conversion formula stored in the memory 404 (step S5). Further, the CPU 403 displays the calculated displacement on the display device 401 (step S6). Thereafter, the CPU 403 determines whether an end of the measurement is instructed by, for example, the user operating the operation section 402 shown in FIG. 1 (step S7). When the end of the measurement is instructed, the CPU 403 ends the displacement measurement processing. When the end of the measurement is not instructed, the CPU 403 executes the processing in step S4.

Figure 23:
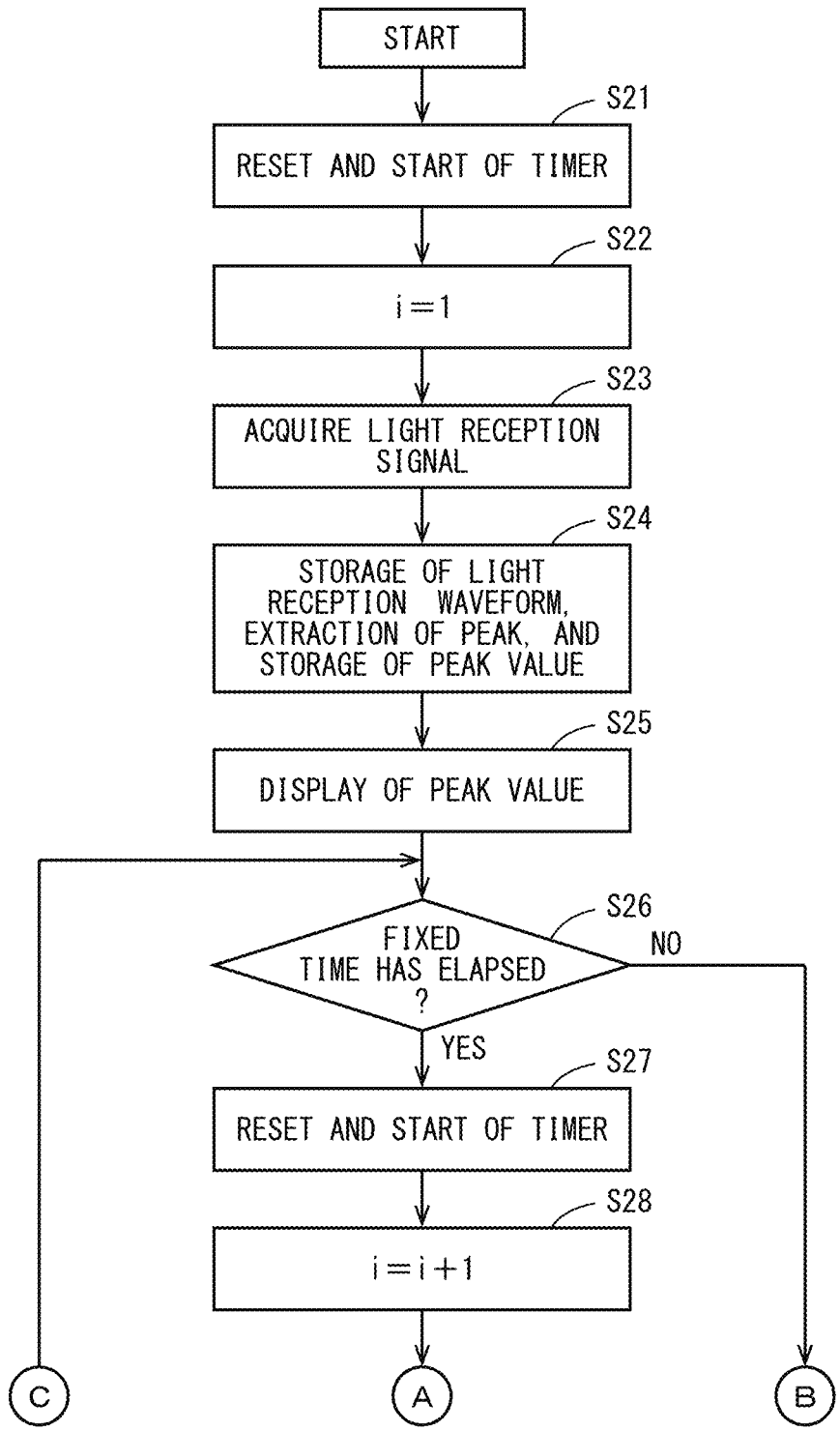
FIG. 23 is a flowchart for explaining the light reception confirmation processing shown in FIG. 22.
Figure 24:
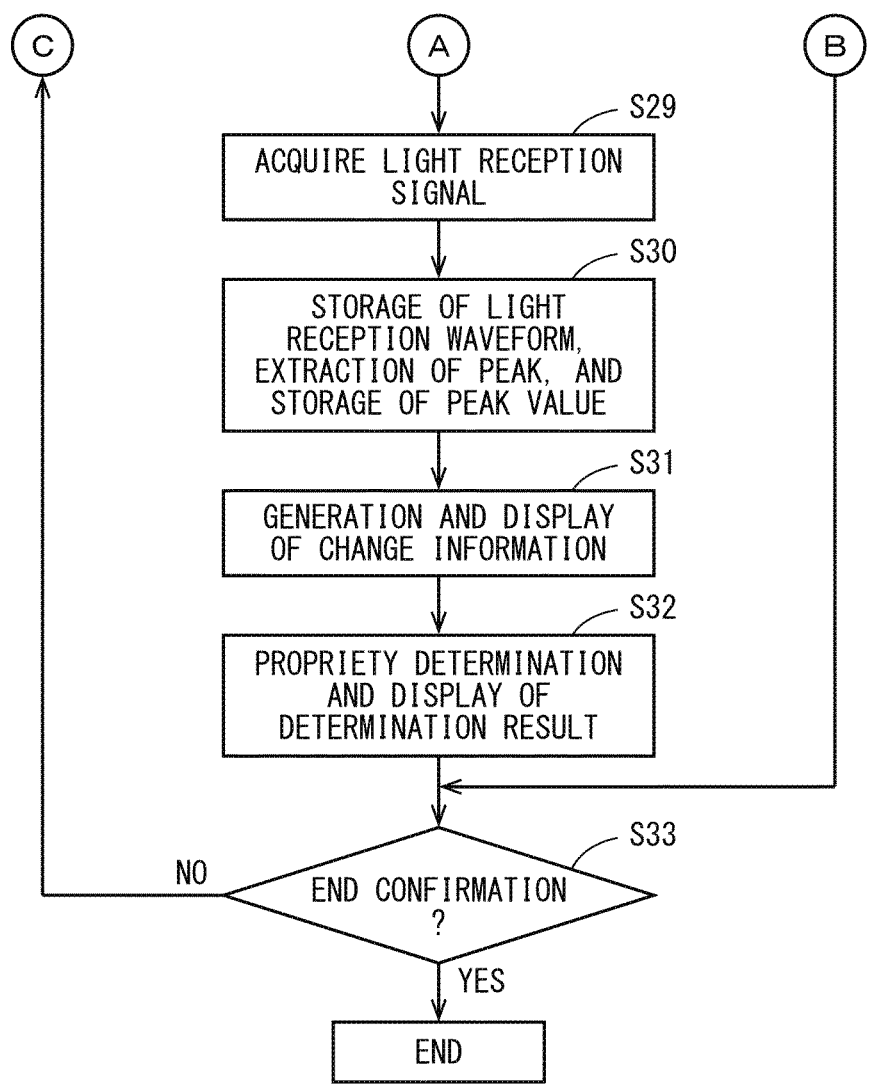
FIG. 24 is a flowchart for explaining the light reception confirmation processing shown in FIG. 22.

FIGS. 23 and 24 are flowcharts for explaining the light reception confirmation processing shown in FIG. 22. As explained above, the light reception confirmation processing shown in FIGS. 23 and 24 is executed when the switching to the confirmation mode is instructed in step S1 in FIG. 22.

First, the CPU 403 resets a not-shown timer incorporated in the control device 400 and starts count (step S21). The CPU 403 sets a value of a variable i indicating the number of times of acquisition of light reception signals to 1 (step S22).

Subsequently, the CPU 403 acquires a light reception signal given from the control section 152 (step S23). The removal of abase waveform and the correction of the temperature characteristic of the light receiving section 140 have been performed by the control section 152 on the light reception signal given from the control section 152. Thereafter, the CPU 403 stores a light reception waveform of the acquired light reception signal in the memory 404 as a first light reception waveform, extracts a peak of the acquired light reception signal, and stores a value of the peak in the memory 404 as a first peak value (step S24). The CPU 403 displays, on the display device 401, as a present peak value, the first peak value stored in the memory 404 (step S25).

Subsequently, the CPU 403 determines, on the basis of the count of the timer, whether a fixed period decided in advance has elapsed from the processing in step S21 (step S26). When the fixed time has not elapsed, the CPU 403 executes processing in step S33 explained below. On the other hand, when the fixed time has elapsed, the CPU 403 resets the timer and starts count (step S27). The CPU 403 adds 1 to the value of the variable i (step S28).

Subsequently, the CPU 403 acquires a light reception signal output from the light receiving section 140 (step S29). The removal of a base waveform and the correction of the temperature characteristic of the light receiving section 140 have been performed on the light reception signal given from the control section 152. Thereafter, the CPU 403 stores a light reception waveform of the acquired light reception signal in the memory 404 as an i-th light reception waveform, extracts a peak of the acquired light reception signal, and stores a value of the peak in the memory 404 as an i-th peak value (step S30). The CPU 403 generates change information on the basis of the i-th peak value and the i-th light reception waveform and the first to (i−1)-th peak values and the first to (i−1)-th light reception waveforms stored in the memory 404 and displays the generated change information on the display device 401 (step S31). Note that the change information includes at least one of the first to (i−1)-th peak values and the i-th peak value (the present peak value).

Thereafter, the CPU 403 determines propriety of the position and the posture of the measurement head 200 on the basis of the threshold stored in the memory 404 in advance as the setting information and displays a result of the determination on the display device 401 (step S32). Note that, when the threshold is not stored in the memory 404, the processing in step S32 may be omitted.

Subsequently, the CPU 403 determines whether an end of the light reception confirmation processing is instructed by, for example, operating the confirmation end button 453 shown in FIG. 12 (step S33). When the end of the light reception confirmation processing is not instructed, the CPU 403 executes the processing in step S26. On the other hand, when the end of the light reception confirmation processing is instructed, the CPU 403 ends the light reception confirmation processing. When the change information includes a graph showing a change over time of peak values of light reception signals (see FIGS. 16 and 17), the CPU 403 may store the graph at the point in time of the end of the light reception confirmation processing in the storing section 151.

(7) Effects

In the confocal displacement sensor 500 according to this embodiment, light having a plurality of wavelengths is emitted by the light projecting section 120. A chromatic aberration is caused by the lens unit 220 in the light emitted by the light projecting section 120. The light having the chromatic aberration is converged by the lens unit 220 and irradiated on the measurement object S. In the light irradiated on the measurement object S through the lens unit 220, light having a wavelength reflected while focusing on the surface of the measurement object S passes through the plurality of optical fibers 313 to 316.

A plurality of lights passed through the plurality of optical fibers 313 to 316 are guided to the spectral section 130 through the fiber coupler 330, the optical fibers 317 and 318, the fiber coupler 320, and the optical fiber 312. Therefore, the plurality of lights passed through the plurality of optical fibers 313 to 316 are combined into one light in a process in which the plurality of lights are guided to the spectral section 130. Consequently, it is possible to easily perform averaging processing for the plurality of lights. Displacement of the measurement object S is calculated by the control section 152 on the basis of the intensity of light after the averaging processing.

Light focused on a position different from the position of the surface of the measurement object S sometimes passes through any one of the optical fibers 313 to 316 because of irregular reflection on the surface of the measurement object S. Even in such a case, with the configuration explained above, intensities for each wavelength concerning the plurality of lights passed through the plurality of optical fibers 313 to 316 are averaged in the averaging processing. Consequently, a component of light that causes a random measurement error due to the irregular reflection is cancelled. As a result, it is possible to reduce an error of measured displacement of the measurement object S. In this configuration, it is unnecessary to perform an arithmetic operation for performing the averaging processing. Consequently, it is possible to efficiently calculate displacement of the measurement object S at high speed.

In this embodiment, the distal end portions of the optical fibers 313 to 316 function as pinholes. In this case, it is unnecessary to separately dispose a plurality of pinholes. Consequently, it is possible to make the configuration of the confocal displacement sensor 500 compact.

In this way, it is desirable to form the clads 310*b* of the optical fibers 313 to 316 as light blocking sections (pinhole members) and form the cores 310*a* as pinholes. Consequently, it is possible to realize a confocal optical system with a simple configuration. On the other hand, when a loss of light can be allowed, a light blocking member obtained by providing a plurality of pinholes in a plate having a light blocking property may be disposed at the end portions of the optical fibers 313 to 316 on the measurement head 200 side.

Further, in this embodiment, the processing device 100 and the measurement head 200 are separately provided and optically connected by the light guide section 300. Therefore, it is easy to perform measurement using the measurement head 200 containing the lens unit 220 that causes an appropriate chromatic aberration according to the shape, the disposition, or the like of the measurement object S or the lens unit 220 having an appropriate focal length. Consequently, it is possible to more easily measure displacement of the measurement object S.

Since the light guide section 300 includes the optical fibers, it is possible to dispose the processing device 100 and the measurement head 200 separately from each other. A mechanically-driven component is not provided in the measurement head 200. A heat generation source is absent in the measurement head 200. Therefore, it is possible to dispose the measurement head 200 in various environments. As explained below, when an exposed portion of the measurement head 200 is formed of glass, it is possible to dispose the measurement head 200 in more various environments.

When a laser light source is used as the light source 121, the light guide section 300 desirably includes the optical fibers. For example, when the phosphor 122 is excited by laser light emitted by the light source 121 to generate light having a plurality of wavelengths as shown in FIG. 5B, it is possible to efficiently extract light generated by using the optical fibers. By using the optical fibers, it is possible to efficiently supply the extracted light to the measurement head 200.

In FIG. 1, the fiber coupler 330 is provided in the housing 210 of the measurement head 200. However, the fiber coupler 330 may be provided in a connector section for the measurement head 200 and the optical fibers 313 to 316. By disposing the fiber coupler 330 in a firm housing (the connector section) of metal or the like, it is possible to prevent the measurement head 200 from increasing in size while fixing and protecting the fiber coupler 330. The fiber coupler 330 may be provided near the connector section.

As shown in FIG. 1, the fiber coupler 320 is disposed on the processing device 100 side and the fiber coupler 330 is disposed on the measurement head 200 side. The fiber couplers 320 and 330 are connected by the optical fibers 317 and 318 each including the two cores 310*a*. With this configuration, it is possible to improve design flexibility for the disposition of the fiber couplers 320 and 330 while reducing a loss of an optical signal reflected from the measurement object S.

(8) Modifications
(a) Modifications of the Light Guide Section

Figure 25:
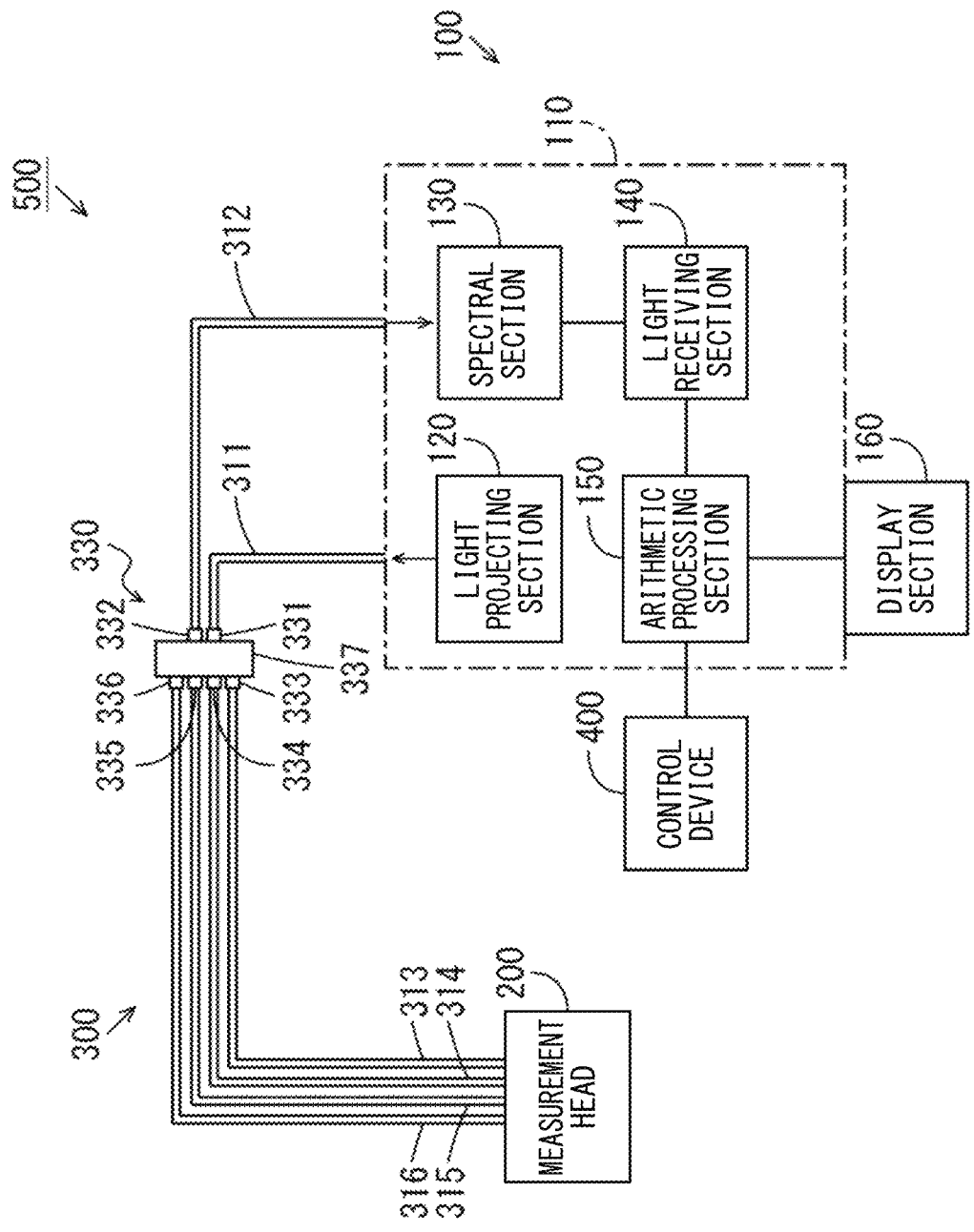
FIG. 25 is a diagram showing a first modification of a light guide section.

In this embodiment, the light guide section 300 includes the two fiber couplers 320 and 330. However, the present invention is not limited to this. The light guide section 300 may not include one or both of the fiber couplers 320 and 330. FIG. 25 is a diagram showing a first modification of the light guide section 300. In the example shown in FIG. 25, the light guide section 300 does not include the optical fibers 317 and 318 and the fiber coupler 320 shown in FIG. 1. The optical fibers 311 to 316 are respectively connected to the ports 331 to 336 of the fiber coupler 330.

In the example shown in FIG. 25, the fiber coupler 330 is provided on the outside of the housing 110 of the processing device 100. However, the fiber coupler 330 may be provided on the inside of the housing 110 of the processing device 100. In the example shown in FIG. 25, the fiber coupler 330 is provided on a side close to the processing device 100 in the light guide section 300. However, the fiber coupler 330 may be provided near the measurement head 200 or in the connector section.

In the example shown in FIG. 25, only one fiber coupler is provided. A fiber coupler is not disposed in the measurement head 200. Therefore, it is easy to assemble the measurement head 200. By disposing the fiber coupler 330 on the processing device 100 side having a large housing space compared with the measurement head 200, it is possible to achieve both of easiness of assembly and a reduction in a loss of light.

Figure 26:
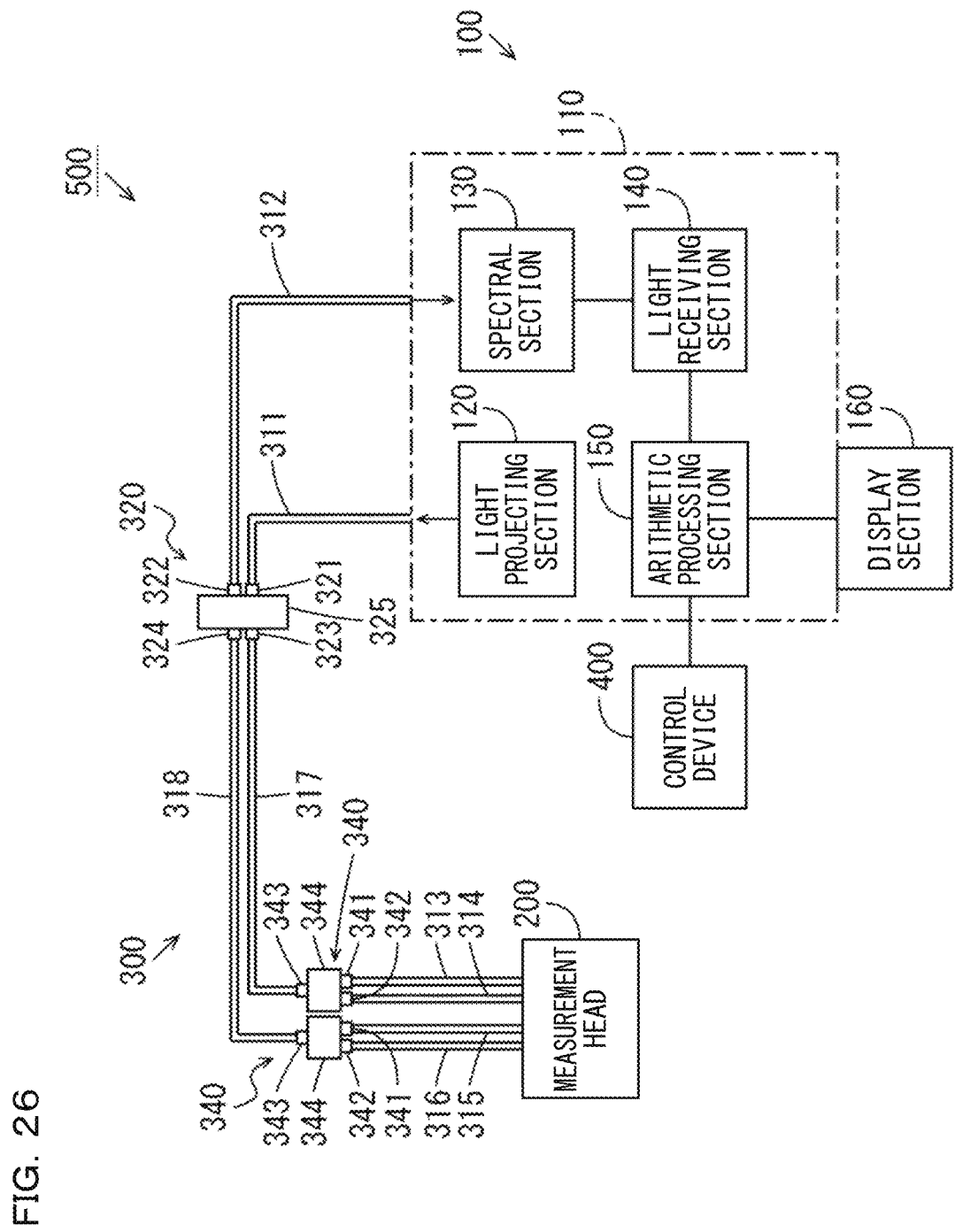
FIG. 26 is a diagram showing a second modification of the light guide section.

FIG. 26 is a diagram showing a second modification of the light guide section 300. In the example shown in FIG. 26, the light guide section 300 includes two fiber couplers 340 instead of the fiber coupler 330 shown in FIG. 1. Each of the fiber couplers 340 has a so-called 1×2-type configuration and includes three ports 341 to 343 and a main body section 344. The ports 341 and 342 and the port 343 are connected to the main body section 344 to be opposed to each other across the main body section 344. Light input to at least one of the ports 341 and 342 is output from the port 343. Light input to the port 343 is output from each of the ports 341 and 342.

The optical fibers 313 and 314 are respectively connected to the ports 341 and 342 of one fiber coupler 340. The optical fibers 315 and 316 are respectively connected to the ports 341 and 342 of the other fiber coupler 340. The port 323 of the fiber coupler 320 and the port 343 of one fiber coupler 340 are connected by the optical fiber 317. The port 324 of the fiber coupler 320 and the port 343 of the other fiber coupler 340 are connected by the optical fiber 318.

In the example shown in FIG. 26, the fiber coupler 320 is provided on the outside of the housing 110 of the processing device 100. However, the fiber coupler 320 may be provided on the inside of the housing 110 of the processing device 100. The fiber couplers 340 are provided on the outside of the measurement head 200. However, the fiber couplers 340 may be housed in the connector section of the measurement head 200.

In the example shown in FIG. 26, the two fiber couplers 340 are provided on the measurement head 200 side. In this case, it is possible to easily perform layout of design for providing the fiber couplers 340 in the measurement head 200. It is possible to reduce a loss of light reflected from the measurement object S.

Figure 27:
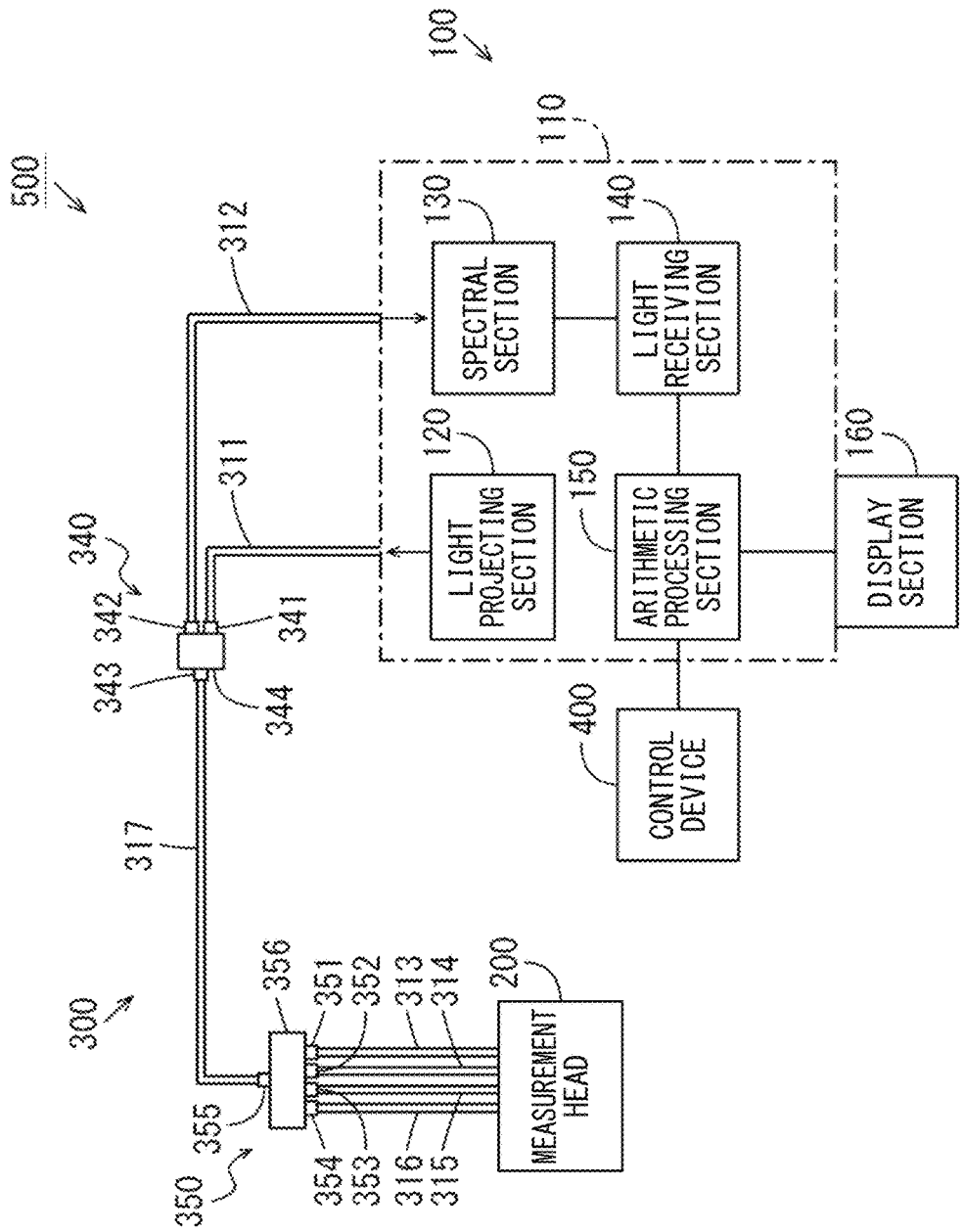
FIG. 27 is a diagram showing a third modification of the light guide section.

FIG. 27 is a diagram showing a third modification of the light guide section 300. In the example shown in FIG. 27, the light guide section 300 includes two fiber couplers 340 and 350 instead of the fiber couplers 320 and 330 shown in FIG. 1. The light guide section 300 shown in FIG. 27 does not include the optical fiber 318 shown in FIG. 1. The fiber coupler 340 shown in FIG. 27 has the same configuration as the configuration of the fiber couplers 340 shown in FIG. 26.

The fiber coupler 350 has a so-called 1×4-type configuration and includes five ports 351 to 355 and a main body section 356. The ports 351 to 354 and the port 355 are connected to the main body section 356 to be opposed to each other across the main body section 356. Light input to at least one of the ports 351 to 354 is output from the port 355. Light input to the port 355 is output from each of the ports 351 to 354.

The optical fibers 311 and 312 are respectively connected to the ports 341 and 342 of the fiber coupler 340. The optical fibers 313 to 316 are respectively connected to the ports 351 to 354 of the fiber coupler 350. The port 343 of the fiber coupler 340 and the port 355 of the fiber coupler 350 are connected by the optical fiber 317.

In this embodiment, coupling and division of lights are performed using the fiber couplers 320, 330, 340, and 350. However, the present invention is not limited to this. The coupling and division of lights may be performed using a plurality of optical fibers 311 to 318, in each of which a plurality of cores 310a are fused into one, without using the fiber couplers 320, 330, 340, and 350.

In the example shown in FIG. 27, the fiber coupler 340 is provided on the outside of the housing 110 of the processing device 100. However, the fiber coupler 340 may be provided in the housing 110 of the processing device 100. The fiber coupler 350 is provided on the outside of the measurement head 200. However, the fiber coupler 350 may be housed in the connector section of the measurement head 200. An optical circulator may be used instead of the fiber coupler 340. Consequently, it is possible to further reduce a loss of light compared with when the fiber coupler 340 is used.

(b) Modifications of the Lens Unit

In this embodiment, the lens unit 220 includes the refraction lens 221 and the diffraction lens 222. However, the present invention is not limited to this. The lens unit 220 may not include one or both of the refraction lens 221 and the diffraction lens 222. FIGS. 28A to 28D are diagrams showing first to fourth modifications of the lens unit 220.

Figure 28A:
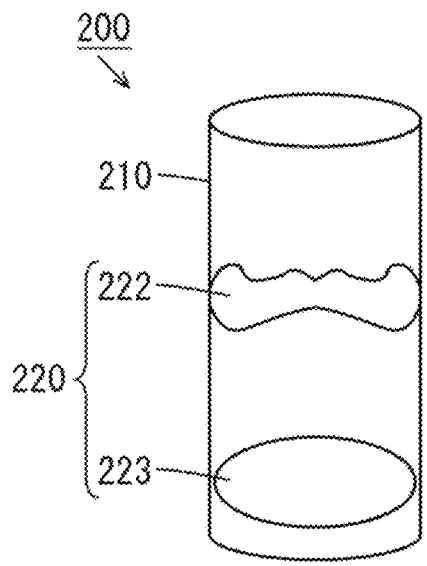
FIGS. 28A to 28D are diagrams showing first to fourth modifications of a lens unit.
Figure 28B:
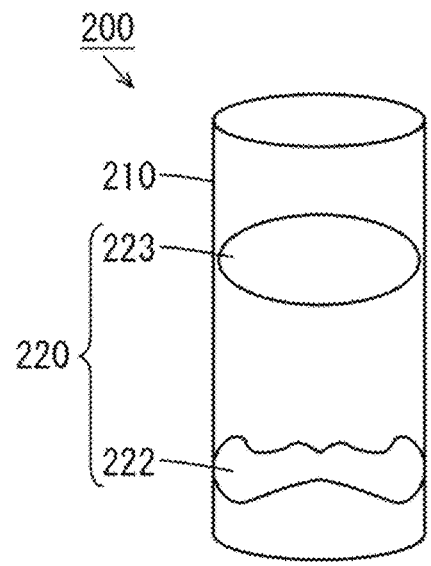

As shown in FIG. 28A, the lens unit 220 in the first modification includes the diffraction lens 222 and the objective lens 223 without including the refraction lens 221 shown in FIG. 1. As shown in FIG. 28B, as in the first modification, the lens unit 220 in the second modification includes the diffraction lens 222 and the objective lens 223 without including the refraction lens 221 shown in FIG. 1. In the second modification, the diffraction lens 222 and the objective lens 223 are disposed oppositely to the positions of the diffraction lens 222 and the objective lens 223 in the first modification.

Figure 28C:
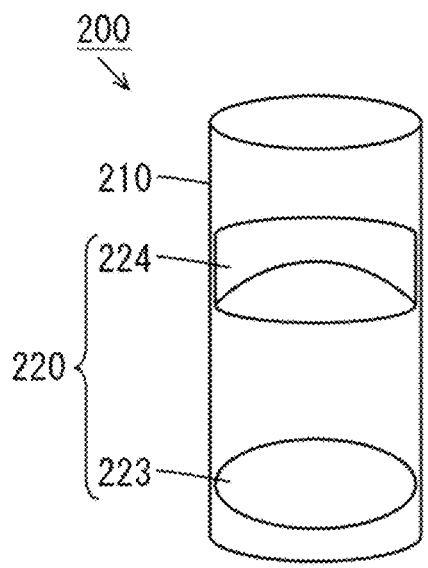
Figure 28D:
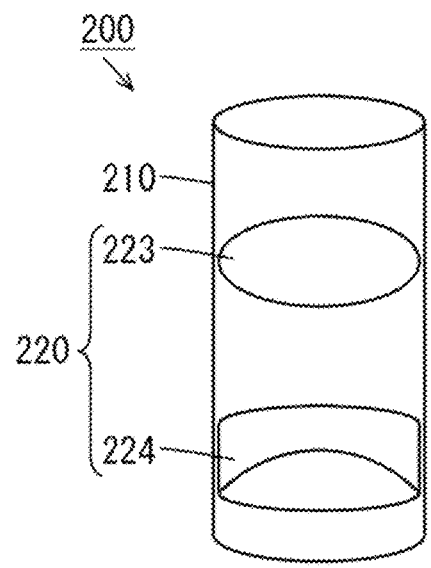

As shown in FIG. 28C, the lens unit 220 in the third modification includes a tablet lens 224 instead of the diffraction lens 222 in the first modification. As shown in FIG. 28D, the lens unit 220 in the fourth modification includes the tablet lens 224 instead of the diffraction lens 222 in the second modification.

In this way, the lens unit 220 may be configured by, for example, a diffraction lens, a tablet lens, a GRIN (graded index) lens, or a prism or a combination of these lenses. With these configurations of the lens unit 220, it is possible to cause a chromatic aberration along the optical axis direction in light emitted by the light projecting section 120. It is possible to converge the light having the chromatic aberration and irradiate the light on the measurement object S.

The lens may be a glass lens, may be a resin lens, or may be a lens of resin-treated glass. The glass lens has high heat resistance. The resin lens can be inexpensively manufactured. The lens of the resin-treated glass can be relatively inexpensively manufactured and has relatively high heat resistance.

A lens closest to the measurement object S in the lens unit 220 is desirably formed by glass. The measurement head 200 is disposed in an environment in which water, oil, or the like is present in a manufacturing line of a factory or the like. When an optical system of a portion exposed to the outside of the measurement head 200 such as a lens is formed of glass, it is possible to improve oil resistance, water resistance, and contamination resistance of the measurement head 200.

Similarly, a portion exposed to the outdoor air in the optical system of the lens unit 220 is desirably formed of glass. Alternatively, the refraction lens 221, the diffraction lens 222, the objective lens 223, or the tablet lens 224 may be formed of resin rather than glass. The portion exposed to the outdoor air of the lens unit 220 may be formed of glass. For example, in the example shown in FIG. 28B, cover glass may be provided on the lower side (the measurement object S side) of the diffraction lens 222.

(c) Modifications of the Light Projecting Section

Figure 29:
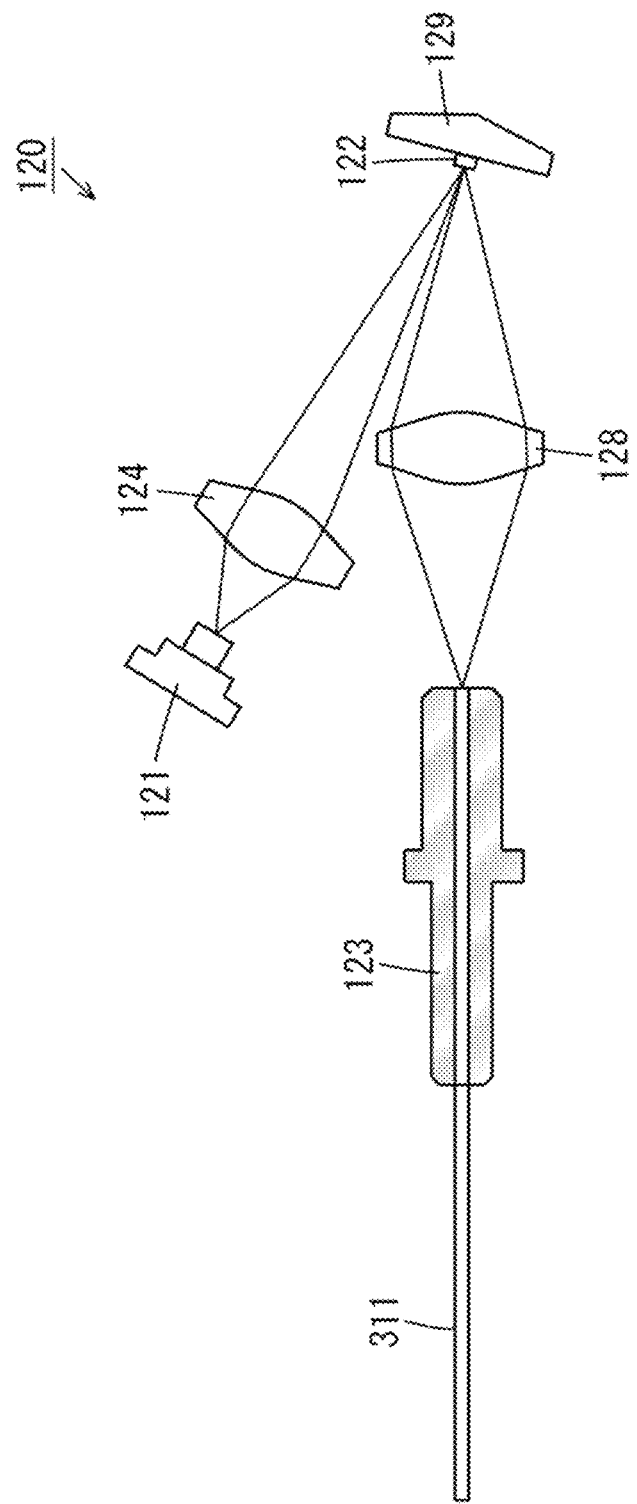
FIG. 29 is a diagram showing a modification of the light projecting section.

In this embodiment, the optical axis of light emitted from the light source 121 and the center axis of the ferrule 123 are disposed on a straight line. However, the present invention is not limited to this. FIG. 29 is a diagram showing a modification of the light projecting section 120. As shown in FIG. 29, the light projecting section 120 in the modification includes the light source 121, the phosphor 122, the ferrule 123, lenses 124 and 128, and a reflection member 129. The lens 124 is disposed between the light source 121 and the reflection member 129. The lens 128 is disposed between the reflection member 129 and the ferrule 123. The phosphor 122 is applied to a reflection surface of the reflection member 129.

Light emitted by the light source 121 passes through the lens 124 to thereby be condensed on the phosphor 122 applied to the reflection member 129 as excitation light. The phosphor 122 absorbs the excitation light and discharges fluorescent light. The excitation light transmitted through the phosphor 122 without being absorbed by the phosphor 122 and the fluorescent light discharged from the phosphor 122 are mixed, whereby light in a wide wavelength band is generated. The generated light is reflected on the reflection surface of the reflection member 129 to thereby be guided to the ferrule 123 through the lens 128. Consequently, the light is input to the optical fiber 311. In this configuration, flexibility of disposition of optical elements increases. Therefore, it is easy to reduce the light projecting section 120 in size.

In order to increase the intensity of light generated by the light projecting section 120, it is desirable to increase a light amount of the light emitted by the light source 121. On the other hand, when the light amount of the light emitted from the light source 121 is increased, heat generation of the phosphor 122 increases. Therefore, reflection efficiency of the reflection member 129 decreases and the discharge of the fluorescent light from the phosphor 122 is easily saturated. Therefore, the reflection member 129 may be configured to rotatable or movable. Consequently, the phosphor 122 is cooled and the heat generation can be reduced. As a result, it is possible to further increase the intensity of the light generated by the light projecting section 120.

(d) Modifications of the Spectral Section

Figure 30:
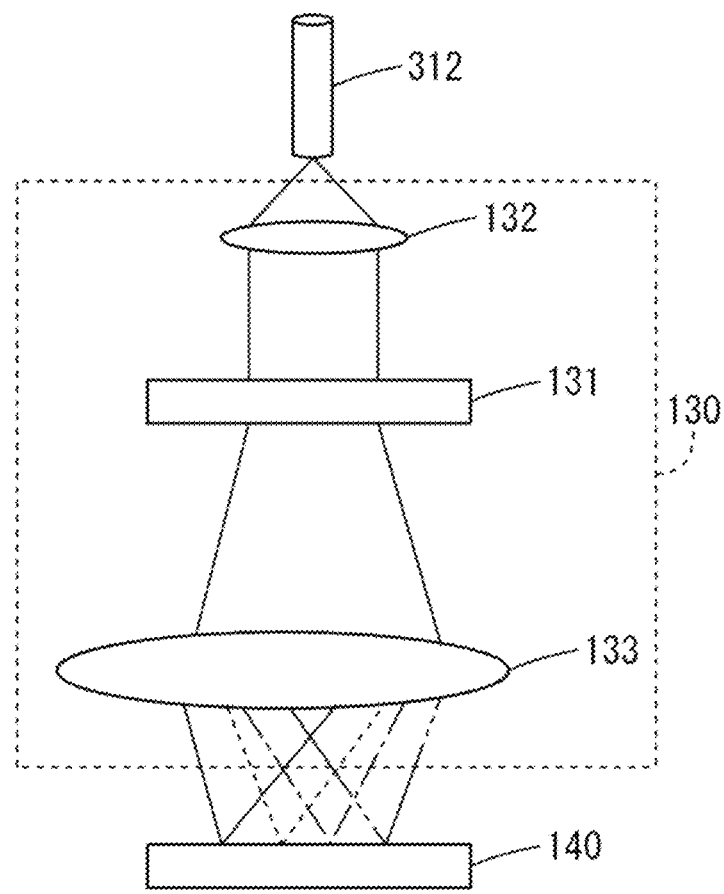
FIG. 30 is a diagram showing a modification of the spectral section.

In this embodiment, the diffraction grating 131 of the spectral section 130 is a reflection type. However, the present invention is not limited to this. FIG. 30 is a diagram showing a modification of the spectral section 130. As shown in FIG. 30, in the modification of the spectral section 130, the diffraction grating 131 is a transmission type. Light made incident on the diffraction grating 131 is spectrally dispersed to transmit at an angle different for each wavelength. The light spectrally dispersed by the diffraction grating 131 passes through the lens 133 to thereby be focused on the position of the pixel of the light receiving section 140 different for each wavelength.

[2] Second Embodiment (1) Basic Configuration of a Confocal Displacement Sensor

Figure 31:
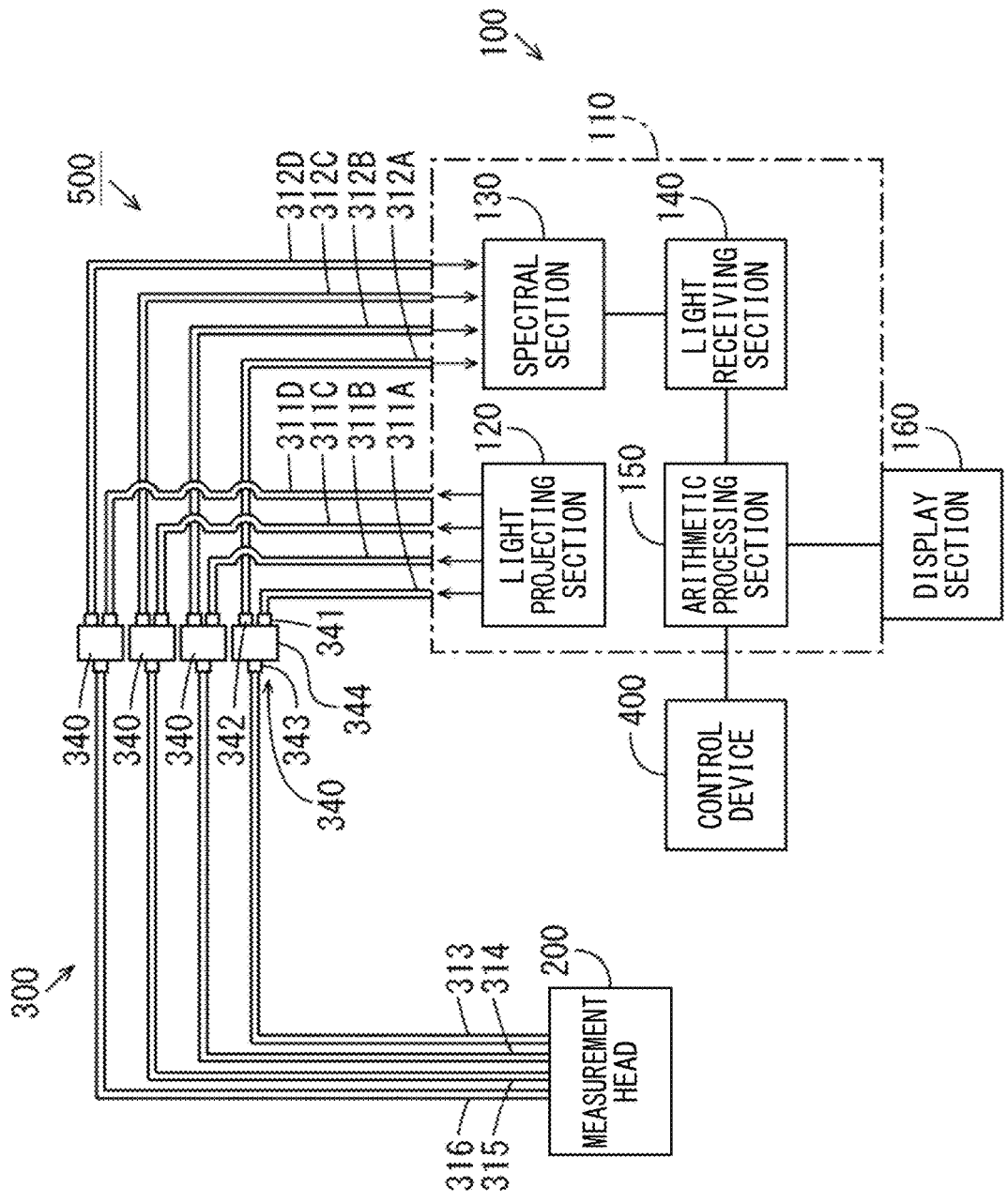
FIG. 31 is a schematic diagram showing the configuration of a confocal displacement sensor according to a second embodiment of the present invention.

Concerning a confocal displacement sensor according to a second embodiment of the present invention, differences from the confocal displacement sensor 500 according to the first embodiment are explained. FIG. 31 is a schematic diagram showing the configuration of the confocal displacement sensor according to the second embodiment of the present invention. As shown in FIG. 31, the light guide section 300 of the confocal displacement sensor 500 includes a plurality of (in this example, four) fiber couplers 340 and a plurality of (in this example, twelve) optical fibers 311A to 311D, 312A to 312D, and 313 to 316. The fiber couplers 340 shown in FIG. 31 have the same configuration as the configuration of the fiber coupler 340 shown in FIG. 26.

The optical fibers 311A to 311D are respectively connected to the ports 341 of the four fiber couplers 340. The optical fibers 312A to 312D are respectively connected to the ports 342 of the four fiber couplers 340. The optical fibers 313 to 316 are respectively connected to the ports 343 of the four fiber couplers 340. Lights emitted by the light projecting section 120 are input to the optical fibers 311A to 311D. The lights output from the optical fibers 312A to 312D are guided to the spectral section 130.

With this configuration, the lights emitted by the light projecting section 120 are input to the ports 341 of the fiber couplers 340 through the optical fibers 311A to 311D. The lights input to the ports 341 are output from the ports 343 corresponding to the ports 341 and irradiated on the measurement object S through the optical fibers 313 to 316 corresponding to the ports 341 and the measurement head 200. A part of the lights reflected on the surface of the measurement object S is input to the ports 343 through the measurement head 200 and the optical fibers 313 to 316. The lights input to the ports 343 are output from the ports 341 and 342 corresponding to the ports 343. The lights output from the ports 342 are guided to the spectral section 130 through the optical fibers 312A to 312D.

Figure 32:
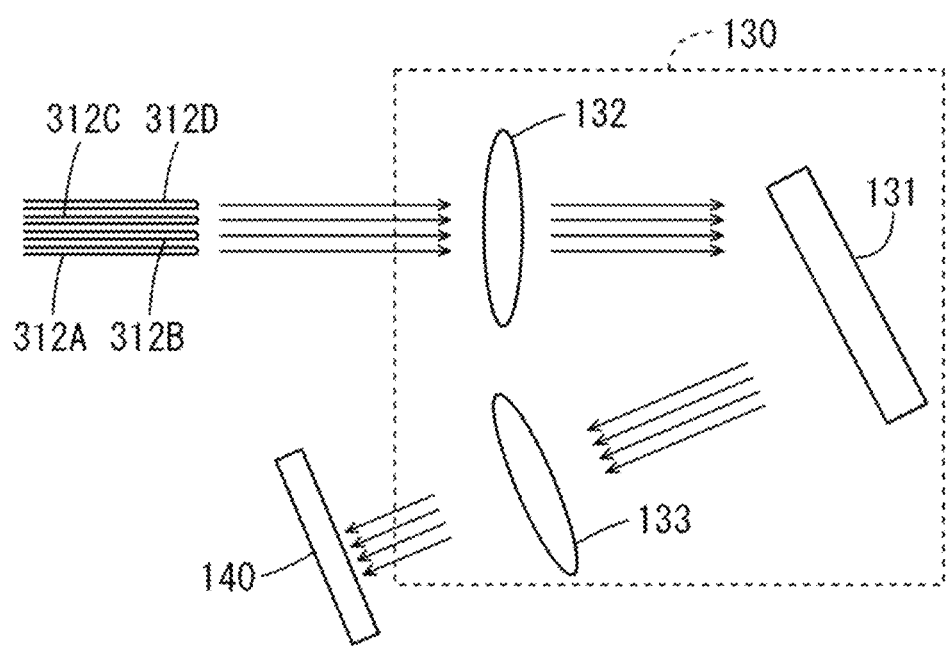
FIG. 32 is a diagram showing the configuration of a spectral section shown in FIG. 31.

FIG. 32 is a diagram showing the configuration of the spectral section 130 shown in FIG. 31. As shown in FIG. 32, lights output from the optical fibers 312A to 312D pass through the lens 132 to thereby be substantially collimated and are made incident on the diffraction grating 131. The lights made incident on the diffraction grating 131 are spectrally dispersed to reflect at an angle different for each wavelength.

Figure 33B:
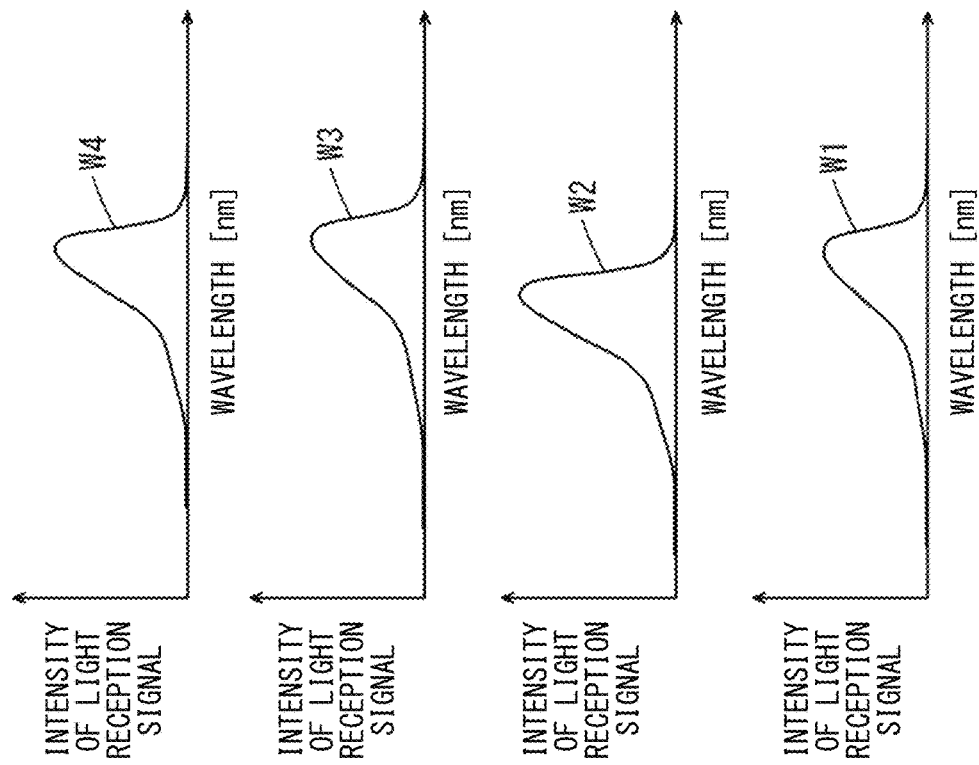
FIGS. 33A and 33B are diagrams showing a light receiving section shown in FIG. 32 and a light reception waveform.
Figure 33A:
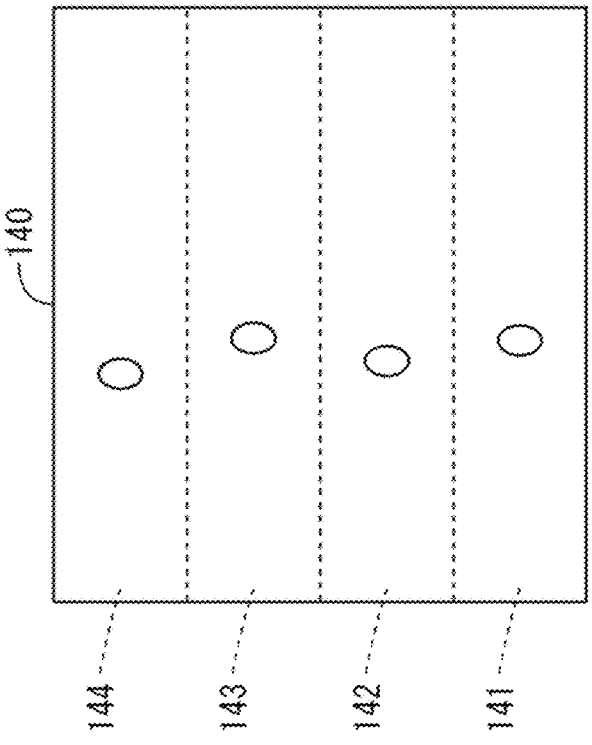

FIGS. 33A an 33B are diagrams showing the light receiving section 140 shown in FIG. 32 and light reception waveforms. As shown in FIG. 33A, the light receiving section 140 includes an imaging element (a two-dimensional line sensor) on which a plurality of pixels are two-dimensionally arrayed. The imaging element may be a multi-division PD, a CCD camera, or a CMOS image sensor or may be other elements. The light receiving section 140 includes four rectangular light receiving regions 141 to 144. The light receiving regions 141 to 144 are arrayed side by side in the width direction (a direction orthogonal to the longitudinal direction). The light receiving regions 141 to 144 function as a one-dimensional line sensor.

The lights output from the optical fibers 312A to 312D and spectrally dispersed by the diffraction grating 131 shown in FIG. 32 pass through the lens 133 to thereby be respectively focused on positions on one dimension different for each wavelength on the light receiving regions 141 to 144. Light reception signals corresponding to light reception amounts are output to the arithmetic processing section 150 from pixels of the light receiving regions 141 to 144. In FIG. 33A, pixels that output light reception signals having the largest intensity in the light receiving regions 141 to 144 are indicated by white circles.

The horizontal axis of FIG. 33B indicates the wavelength of received light and the vertical axis indicates the intensity of a light reception signal. The arithmetic processing section 150 shown in FIG. 32 acquires light reception waveforms W1 to W4 corresponding to the light receiving regions 141 to 144 as shown in FIG. 33B. The arithmetic processing section 150 performs averaging processing on the acquired light reception waveforms W1 to W4 to thereby generate the same light reception waveform W0 as the light reception waveform W0 shown in FIG. 4.

The averaging processing may be calculation of an average, may be calculation of an integrated value, or may be calculation of a weighted average or other operation values. In the averaging processing, it is possible to perform desired averaging or integration taking into account the intensities of a plurality of lights passed through the plurality of optical fibers 313 to 316. In this way, the averaging processing for the light reception waveform W0 is electrically performed. Consequently, a component of light that causes a random measurement error due to irregular reflection is cancelled. It is possible to more accurately specify a measurement distance by specifying the peak wavelength 20 of the light reception waveform W0.

With the configuration shown in FIG. 31, when an abnormal value is present among optical signals of the optical fibers 312A to 312D, it is possible to easily exclude the abnormal value and calculate displacement. For example, it is conceivable that only the intensity of the light reception signal corresponding to the light receiving region 143 shown in FIG. 33A is large or small compared with the intensities of the light reception signals corresponding to the other light receiving regions 141, 142, and 144. In this case, it is conceivable that there is a stain in the measurement head 200 or the abnormal value is detected because of the influence of stray light or the like. Therefore, it is possible to exclude the light reception signal corresponding to the light receiving region 143 and calculate displacement using the light reception signals corresponding to the other light receiving regions 141, 142, and 144.

Since the four optical signals are received independently from each other, it is possible to perform any arithmetic operation such as weighted integration as the averaging processing in calculating displacement. Further, since the light receiving regions 141 to 144 of the light receiving section 140 are connected, it is possible to reduce a disposition space of the light receiving section 140. Optical circulators may be used instead of the fiber couplers 340. Consequently, it is possible to reduce a loss of light compared with when the fiber couplers 340 are used.

(2) Modifications (a) First Modification in the Second Embodiment

Figure 34:
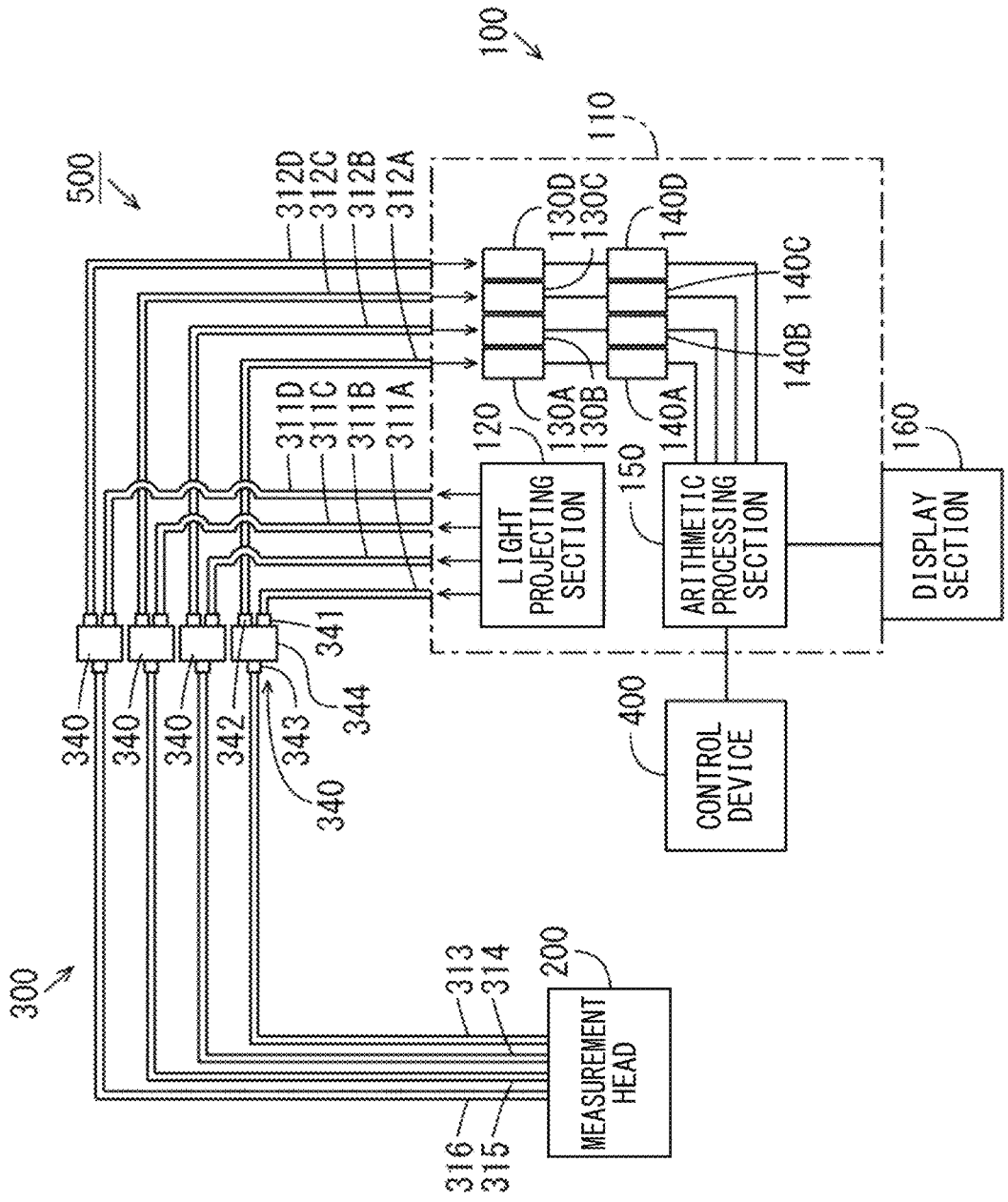
FIG. 34 is a schematic diagram showing the configuration of a confocal displacement sensor according to a first modification in the second embodiment.

In this embodiment, the light receiving section 140 is realized by the two-dimensional line sensor. However, the present invention is not limited to this. FIG. 34 is a schematic diagram showing the configuration of the confocal displacement sensor 500 according to a first modification in the second embodiment. As shown in FIG. 34, the confocal displacement sensor 500 according to the first modification includes a plurality of (in this example, four) spectral sections 130A to 130D and a plurality of (in this example, four) light receiving sections 140A to 140D instead of the spectral section 130 and the light receiving section 140 shown in FIG. 31.

The spectral sections 130A to 130D have the same configuration as the configuration of the spectral section 130 shown in FIG. 1 in the first embodiment. The light receiving sections 140A to 140D have the same configuration as the configuration of the light receiving section 140 shown in FIG. 1 in the first embodiment. Therefore, the light receiving sections 140A to 140D are realized by one-dimensional line sensors. The light receiving sections 140A to 140D are disposed to respectively receive lights spectrally dispersed by the spectral sections 130A to 130D.

Lights output from the optical fibers 312A to 312D are respectively guided to the spectral sections 130A to 130D. The lights output from the optical fibers 312A to 312D pass through the lenses 132 shown in FIG. 32 to thereby be substantially collimated in the spectral sections 130A to 130D corresponding to the optical fibers 312A to 312D and are made incident on the diffraction gratings 131. The lights made incident on the diffraction gratings 131 are spectrally dispersed to be reflected at an angle different for each wavelength. The lights spectrally dispersed by the diffraction gratings 131 pass through the lenses 133 to thereby be focused on the positions of pixels of the light receiving sections 140A to 140D different for each wavelength.

Light reception signals corresponding to light reception amounts are output to the arithmetic processing section 150 from the pixels of the light receiving sections 140A to 140D. The arithmetic processing section 150 electrically performs averaging processing on light reception waveforms acquired from the light receiving sections 140A to 140D to thereby generate the same light reception waveform W0 as the light reception waveform W0 shown in FIG. 4. Consequently, a measurement distance is calculated.

In the first modification in the second embodiment, the diffraction gratings 131 and the lenses 132 and 133 in the plurality of spectral sections 130A to 130D may be respectively realized by common diffraction gratings 131 and lenses 132 and 133. That is, the light receiving regions 141 to 144 of the light receiving section 140 shown in FIG. 33A may be respectively realized by separate one-dimensional line sensors.

With the configuration shown in FIG. 34, since the plurality of light receiving sections 140A to 140D are independently disposed, it is possible to apply independent signal processing to the lights received by the light receiving sections 140A to 140D. Consequently, it is possible to calculate displacement from which noise is removed.

(b) Second Modification in the Second Embodiment

Figure 35:
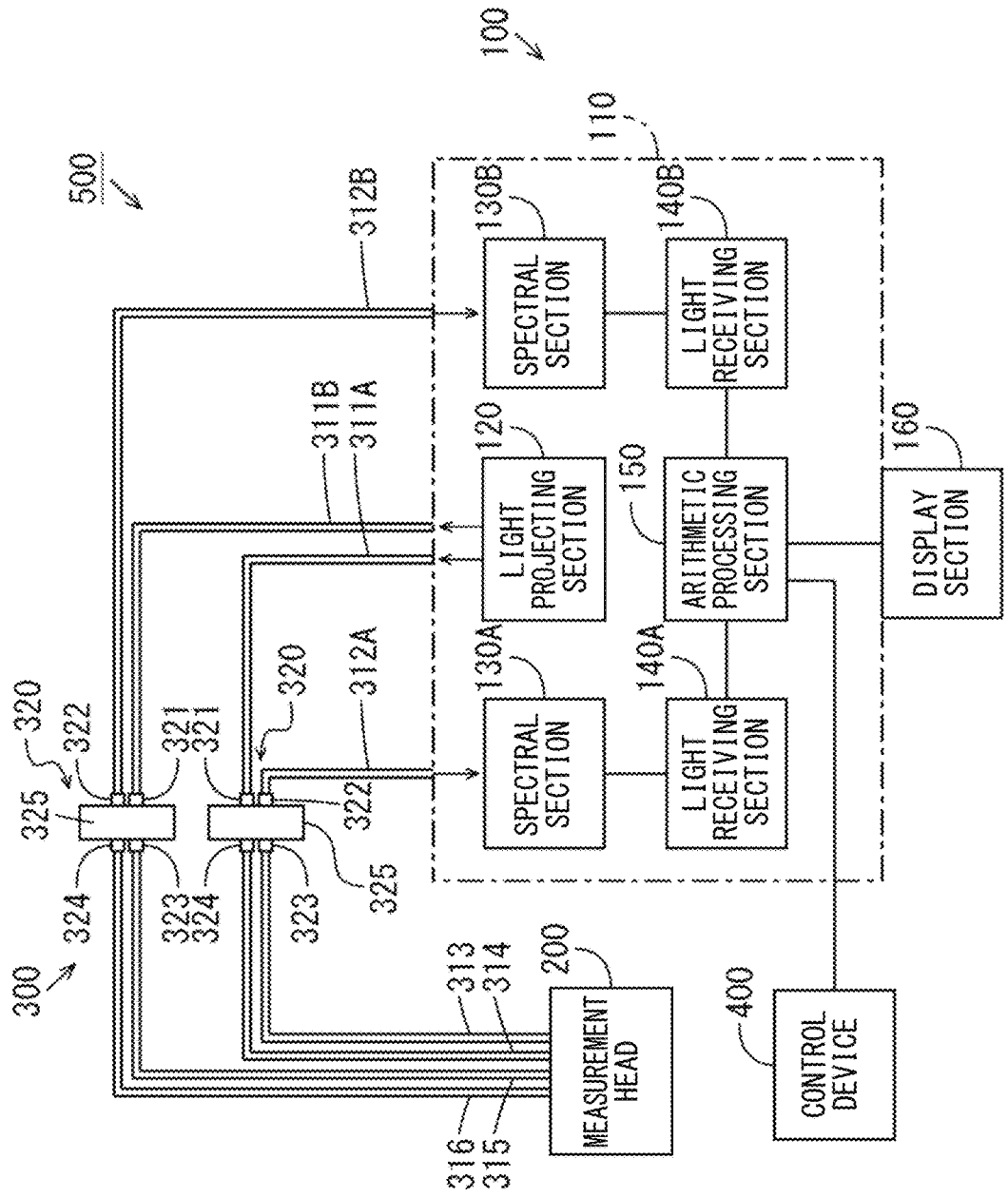
FIG. 35 is a schematic diagram showing the configuration of a confocal displacement sensor according to a second modification in the second embodiment.

FIG. 35 is a schematic diagram showing the configuration of the confocal displacement sensor 500 according to a second modification in the second embodiment. As shown in FIG. 35, the confocal displacement sensor 500 according to the second modification includes a plurality of (in this example, two) spectral sections 130A and 130B, a plurality of (in this example, two) light receiving sections 140A and 140B, and a plurality of (in this example, two) fiber couplers 320 instead of the spectral section 130, the light receiving section 140, and the fiber couplers 340 shown in FIG. 31. The confocal displacement sensor 500 according to the second modification does not include the optical fibers 311C, 311D, 312C, and 312D shown in FIG. 31.

The fiber couplers 320 have the same configuration as the configuration of the fiber coupler 320 shown in FIG. 1. The optical fibers 311A and 311B are respectively connected to the ports 321 of two fiber couplers 320. The optical fibers 312A and 312B are respectively connected to the ports 322 of the two fiber couplers 320. The optical fibers 313 and 314 are respectively connected to the ports 323 and 324 of one fiber coupler 320. The optical fibers 315 and 316 are respectively connected to the ports 323 and 324 of the other fiber coupler 320.

The spectral sections 130A and 130B have the same configuration as the configuration of the spectral sections 130A to 130D shown in FIG. 34. The light receiving sections 140A and 140B have the same configuration as the configuration of the light receiving sections 140A to 140D shown in FIG. 34. Therefore, the light receiving sections 140A and 140B are realized by one-dimensional line sensors. Lights emitted by the light projecting section 120 are input to the optical fibers 311A and 311B. The lights output from the optical fibers 312A and 312B are respectively guided to the spectral sections 130A and 130B. The lights spectrally dispersed by the spectral sections 130A and 130B are respectively received by the light receiving sections 140A and 140B.

With this configuration, the lights emitted by the light projecting section 120 are input to the ports 321 of the fiber couplers 320 through the optical fibers 311A and 311B. The lights input to the ports 321 are output from the ports 323 and 324 corresponding to the ports 321 and irradiated on the measurement object S through the optical fibers 313 to 316 corresponding to the ports 321 and the measurement head 200. A part of the lights reflected on the surface of the measurement object S is input to the ports 323 and 324 through the measurement head 200 and the optical fibers 313 to 316. The lights input to the ports 323 and 324 are output from the ports 321 and 322 corresponding to the ports 323 and 324. The lights output from the ports 322 are guided to the spectral sections 130A and 130B corresponding to the ports 322 through the optical fibers 312A and 312B corresponding to the ports 322.

The lights input to the optical fibers 313 and 314 are mixed in a process until the lights are output from the optical fiber 312A. The lights input to the optical fibers 315 and 316 are mixed in a process until the lights are output from the optical fiber 312B. Consequently, averaging processing (in this example, integration processing) for intensity is performed on the light output from the optical fiber 312A and the light output from the optical fiber 312B.

The lights output from the optical fibers 312A and 312B pass through the lenses 132 to thereby be substantially collimated as shown in FIG. 1 in the spectral sections 130A and 130B corresponding to the optical fibers 312A and 312B and are made incident on the diffraction gratings 131. The lights made incident on the diffraction gratings 131 are spectrally dispersed to be reflected at an angle different for each wavelength. The lights spectrally dispersed by the diffraction gratings 131 pass through the lenses 133 to thereby be focused on the positions of pixels of the light receiving sections 140A and 140B different for each wavelength.

Light reception signals corresponding to light reception amounts are output to the arithmetic processing section 150 from the pixels of the light receiving sections 140A and 140B. The arithmetic processing section 150 performs further averting processing on light reception waveforms acquired from the light receiving sections 140A and 140B to thereby generate the same light reception waveform W0 as the light reception waveform W0 shown in FIG. 4. In this way, in this example, the averaging processing for the light reception waveform W0 is optically and electrically performed. Consequently, a measurement distance is calculated.

With the configuration shown in FIG. 35, it is possible to optionally select a set of two lights on which integration of intensities is performed. By integrating the intensities of two lights respectively output from two optical fibers opposed to each other across the center of the fiber unit 301 shown in FIG. 3, it is possible to more efficiently remove a component of light that causes a random measurement error due to irregular reflection.

Therefore, the optical fibers 313 and 316 opposed to each other across the center of the fiber unit 301 are desirably respectively connected to the ports 323 and 324 of one fiber coupler 320. Similarly, the optical fibers 314 and 315 opposed to each other across the center of the fiber unit 301 are desirably respectively connected to the ports 323 and 324 of the other fiber coupler 320.

[3] Third Embodiment

Figure 36:
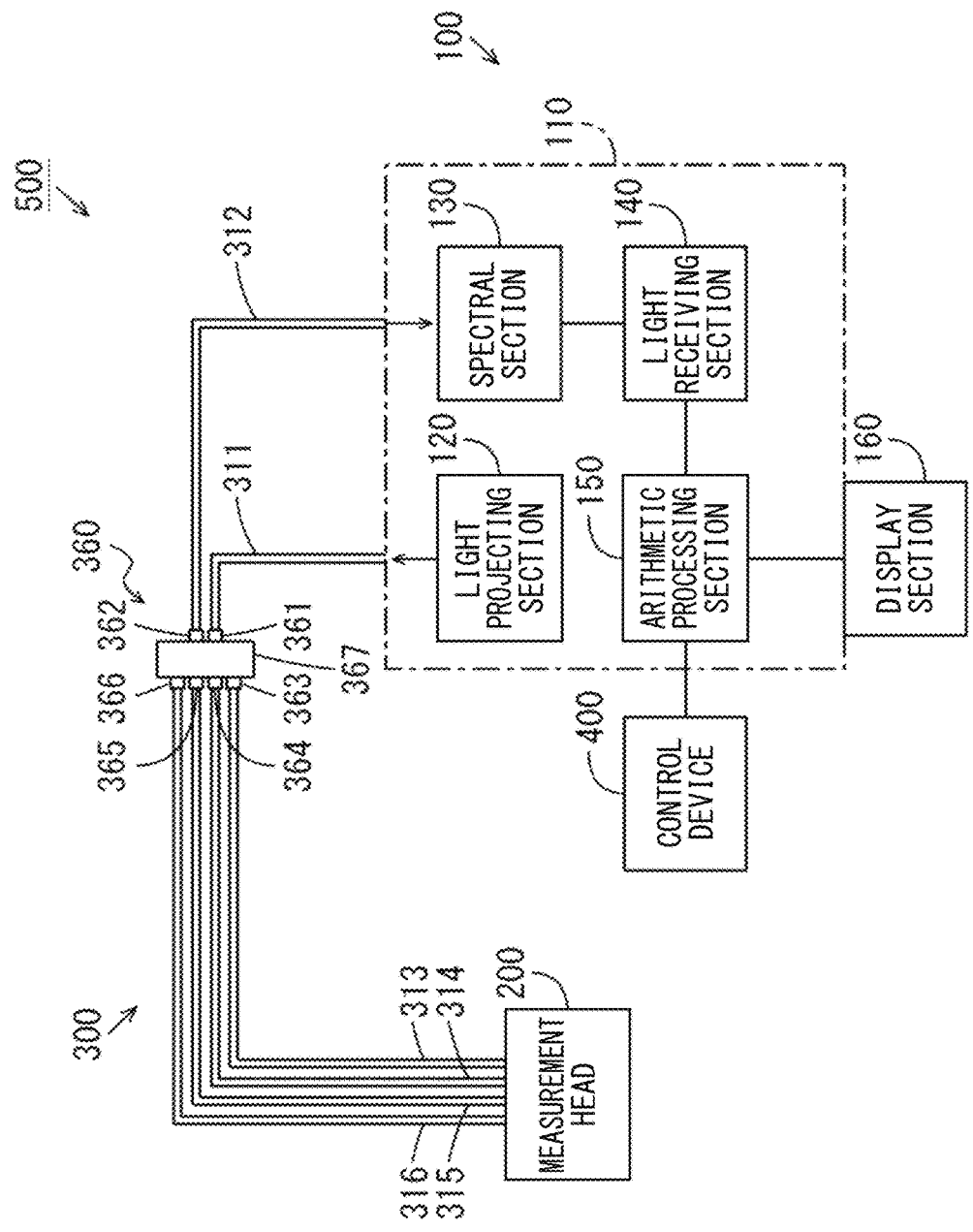
FIG. 36 is a schematic diagram showing the configuration of a confocal displacement sensor according to a third embodiment of the present invention.

Concerning a confocal displacement sensor according to a third embodiment of the present invention, differences from the confocal displacement sensor 500 according to the first embodiment are explained. FIG. 36 is a schematic diagram showing the configuration of the confocal displacement sensor according to the third embodiment of the present invention. As shown in FIG. 36, the light guide section 300 of the confocal displacement sensor 500 includes one optical switch 360 instead of the two fiber couplers 320 and 330 shown in FIG. 1. The light guide section 300 does not include the optical fibers 317 and 318 shown in FIG. 1.

The optical switch 360 has a so-called 2×4-type configuration and includes six ports 361 to 366 and a main body section 367. The ports 361 and 362 and the ports 363 to 366 are connected to the main body section 367 to be opposed to each other across the main body section 367. The optical fibers 311 to 316 are respectively connected to the ports 361 to 366 of the optical switch 360.

Light input to either one of the ports 361 and 362 can be output from any one of the ports 363 to 366. Light input to any one of the ports 363 to 366 can be output from either one of the ports 361 and 362. The control section 152 of the arithmetic processing section 150 switches a connection state between the ports 361 and 362 and the ports 363 to 366 for each of four periods t1 to t4 having an equal length one another.

In the period t1, light input to the port 361 is output from the port 363 and light input to the port 363 is output from the port 362. In the period t2 after the period t1, light input to the port 361 is output from the port 364 and light input to the port 364 is output from the port 362. In the period t3 after the period t2, light input to the port 361 is output from the port 365 and light input to the port 365 is output from the port 362. In the period t4 after the period t3, light input to the port 361 is output from the port 366 and light input to the port 366 is output from the port 362.

With this configuration, in the period t1, light emitted by the light projecting section 120 of the processing device 100 is input to the port 361 of the optical switch 360 through the optical fiber 311. The light input to the port 361 is output from the port 363 and irradiated on the measurement object S through the optical fiber 313 and the lens unit 220. A part of the light reflected on the surface of the measurement object S is input to the port 363 through the lens unit 220 and the optical fiber 313. The light input to the port 363 is output from the port 362 and guided to the spectral section 130 through the optical fiber 312.

Similarly, in the period t2, light emitted by the light projecting section 120 of the processing device 100 is input to the port 361 of the optical switch 360 through the optical fiber 311. The light input to the port 361 is output from the port 364 and irradiated on the measurement object S through the optical fiber 314 and the lens unit 220. A part of the light reflected on the surface of the measurement object S is input to the port 364 through the lens unit 220 and the optical fiber 314. The light input to the port 364 is output from the port 362 and guided to the spectral section 130 through the optical fiber 312.

In the period t3, light emitted by the light projecting section 120 of the processing device 100 is input to the port 361 of the optical switch 360 through the optical fiber 311. The light input to the port 361 is output from the port 365 and irradiated on the measurement object S through the optical fiber 315 and the lens unit 220. A part of the light reflected on the surface of the measurement object S is input to the port 365 through the lens unit 220 and the optical fiber 315. The light input to the port 365 is output from the port 362 and guided to the spectral section 130 through the optical fiber 312.

In the period t4, light emitted by the light projecting section 120 of the processing device 100 is input to the port 361 of the optical switch 360 through the optical fiber 311. The light input to the port 361 is output from the port 366 and irradiated on the measurement object S through the optical fiber 316 and the lens unit 220. A part of the light reflected on the surface of the measurement object S is input to the port 366 through the lens unit 220 and the optical fiber 316. The light input to the port 366 is output from the port 362 and guided to the spectral section 130 through the optical fiber 312.

Figure 37:
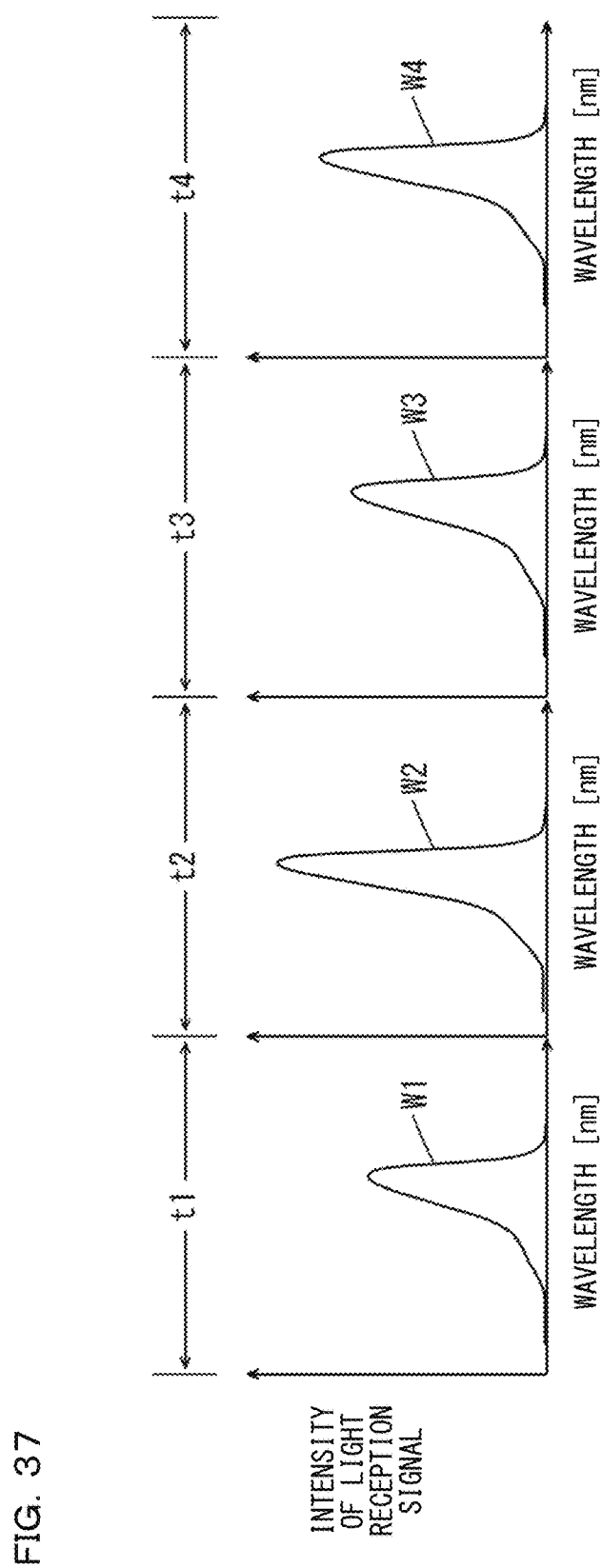
FIG. 37 is a diagram showing a light reception waveform acquired by an arithmetic processing section.

Light reception signals are output to the arithmetic processing section 150 from the pixels of the light receiving section 140. FIG. 37 is a diagram showing light reception waveforms acquired by the arithmetic processing section 150. The horizontal axis in periods shown in FIG. 37 indicates the wavelength of received light and the vertical axis indicates the intensity of a light reception signal. As shown in FIG. 37, the arithmetic processing section 150 acquires light reception waveforms W1 to W4 respectively in the periods t1 to t4.

The arithmetic processing section 150 performs the averaging processing on the acquired light reception waveforms W1 to W4 to thereby generate the same light reception waveform W0 as the light reception waveform W0 shown in FIG. 4. As in the second embodiment, the averting processing may be calculation of an average, may be calculation of an integrated value, or may be calculation of a weighted average or other operation values. In the averaging processing, it is possible to perform desired averaging or integration taking into account the intensities of a plurality of lights passed through the plurality of optical fibers 313 to 316. In this way, the averaging processing for the light reception waveform W0 is electrically performed. Consequently, a component of light that causes a random measurement error due to irregular reflection is cancelled. It is possible to more accurately specify a measurement distance by specifying the peak wavelength $\lambda 0$ of the light reception waveform W0.

Alternatively, the light receiving section 140 may perform exposure in the periods t1 to t4. Light reception signals integrated in the exposure period may be output to the arithmetic processing section 150 from the pixels of the light receiving section 140. In this case, the arithmetic processing section 150 acquires the light reception waveform W0 corresponding to light on which averaging processing (in this example, integration processing) for intensity is performed. In this case, it is unnecessary to perform an arithmetic operation for performing the averaging processing. Consequently, it is possible to efficiently calculate displacement of the measurement object S at high speed.

In this way, in the first to third embodiments, since the light guide section 300 includes the optical fibers, the confocal displacement sensor 500 can be easily configured. With this configuration, it is easy to perform division and combination of lights using various optical components. It is easy to mix lights by connecting a plurality of optical fibers. Further, it is easy to propagate an optical signal between the processing device 100 and the measurement head 200. In the light projecting section 120, the phosphor 122 is excited by a laser light emitted by the light source 121. Light having a plurality of wavelengths is generated. Therefore, it is possible to efficiently emit the generated light using the optical fibers.

[4] Other Embodiments (1) In the embodiments explained above, the light guide section 300 includes the optical fibers. Light is transmitted between the processing device 100 and the measurement head 200 using the optical fibers. However, the present invention is not limited to this.

The light guide section 300 may not include the optical fibers. Light may be transmitted between the processing device 100 and the measurement head 200 using optical elements such as a mirror and a half mirror.

Figure 38:
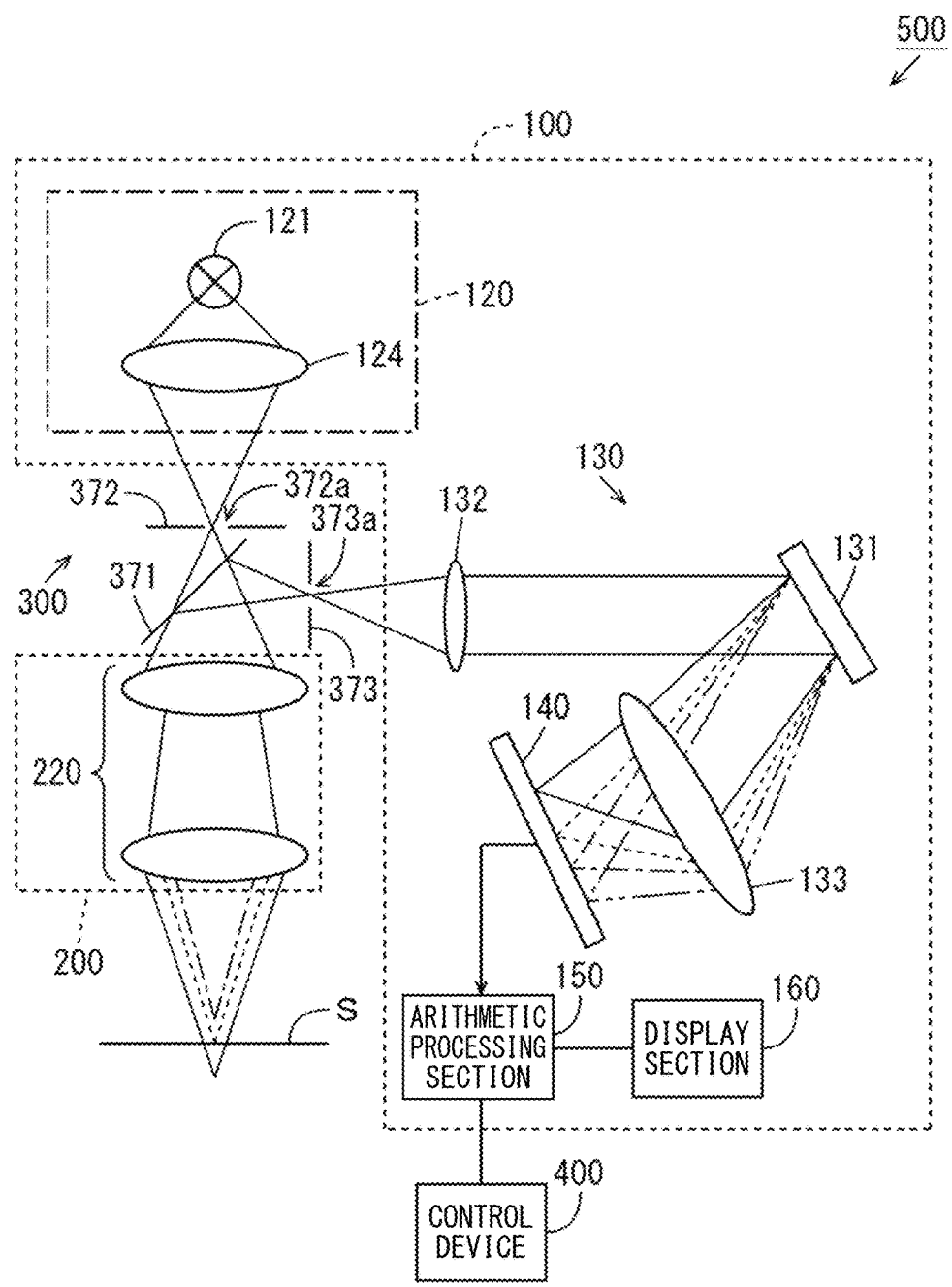
FIG. 38 is a schematic diagram showing the configuration of a confocal displacement sensor according to another embodiment.

FIG. 38 is a schematic diagram showing the configuration of a confocal displacement sensor according to another embodiment. In FIG. 38, to facilitate understanding, a path of light irradiated only on one portion of the measurement object S is shown. In FIG. 38, illustration of paths of lights irradiated on other three portions of the measurement object S is omitted. However, in the confocal displacement sensor 500 shown in FIG. 38, four light sources 121 and four spatial filters 372 and four spatial filters 373 respectively corresponding to the four light sources 121 are provided.

As shown in FIG. 38, the light guide section 300 includes a half mirror 371 and the spatial filters 372 and 373 instead of the optical fibers 311 to 318 and the fiber couplers 320 and 330 shown in FIG. 1. Pinholes 372a and 373a are respectively formed in the spatial filters 372 and 373.

Light emitted from the light projecting section 120 passes through the pinhole 372a of the spatial filter 372 and thereafter passes through the half mirror 371. The light passed through the half mirror 371 is irradiated on the measurement object S through the lens unit 220. A part of the light reflected on the surface of the measurement object S passes through the lens unit 220 to be reflected by the half mirror 371. The light reflected by the half mirror 371 passes through the pinhole 373a of the spatial filter 373 to be guided to the spectral section 130. The light receiving section 140 receives the light spectrally dispersed by the spectral section 130 and outputs a light reception signal.

The arithmetic processing section 150 acquires, on the basis of the light reception signal output by the light receiving section 140, the light reception waveform W0 on which the averaging processing is optically or electrically performed explained in the embodiments. In this way, the averaging processing for the light reception waveform W0 is electrically or optically performed. Consequently, a component of light that causes a random measurement error due to irregular reflection is cancelled. It is possible to more accurately specify a measurement distance by specifying the peak wavelength λ0 of the light reception waveform W0.

(2) In the embodiments, the light projecting section 120 shown in FIGS. 5A and 5B or FIG. 29 mixes the excitation light emitted from the light source 121 and the fluorescent light discharged from the phosphor 122 to thereby emit the light in the wider wavelength band. However, the present invention is not limited to this. The light projecting section 120 may include a light source that emits light in a wide wavelength band instead of the light source 121 and the phosphor 122. For example, the light projecting section 120 may include an LED (a light emitting diode) or a halogen lamp that emits while light as a light source.

(3) In the embodiments, the light projecting section 120 emits the light having the continuous wavelength of 500 nm to 700 nm. However, the present invention is not limited to this. The light projecting section 120 may emit lights in other wavelength bands having continuous wavelengths. For example, the light projecting section 120 may emit light in an infrared region having a continuous wavelength or may emit light in an ultraviolet region having a continuous wavelength.

(4) In the embodiments, the processing device 100 and the measurement head 200 are separately configured. However, the present invention is not limited to this. The processing device 100 and the measurement head 200 may be integrally configured.

(5) In the embodiments, the confocal displacement sensor 500 is configured such that lights are irradiated on the four portions of the surface of the measurement object S. However, the present invention is not limited to this. The confocal displacement sensor 500 may be configured such that lights are irradiated on two portions, three portions, or five or more portions of the surface of the measurement object S.

Therefore, the number of optical fibers included in the fiber unit 301 is desirably equal to or greater than two and more desirably equal to or greater than four. When the number of optical fibers of the fiber unit 301 is increased, it is possible to further improve measurement accuracy through the averaging processing. On the other hand, the outer diameter of the fiber unit 301 increases. Therefore, the number of optical fibers may be determined according to requested measurement accuracy and the outer diameter of the fiber unit 301.

(6) In the embodiments, the fiber unit 301 is disposed such that the center of the fiber unit 301 substantially coincides with the optical axis of the lens unit 220. However, the present invention is not limited to this. The fiber unit 301 may be disposed with the center separated from the optical axis of the lens unit 220.

(7) In the embodiments, the plurality of optical fibers 313 to 316 are disposed not to overlap the center of the fiber unit 301. However, the present invention is not limited to this. For example, one optical fiber may be disposed to overlap the center of the fiber unit 301. The other plurality of optical fibers may be disposed around the optical fiber.

The optical fibers 313 and 315 may be disposed to be displaced by a half of the distance L2 in an array direction of the optical fibers 313 and 315 from the positions of the optical fibers 313 and 315 shown in FIG. 3. In this case, the optical fibers 313 to 316 may be disposed such that the optical fiber 313 is in contact with the optical fibers 314 and 316 and the optical fiber 316 is in contact with the optical fibers 313 and 315.

(8) In the embodiments, in the light reception confirmation processing, the CPU 403 determines the propriety of the position and the posture of the measurement head 200 on the basis of whether the peak value of the light reception signal is higher than the certain threshold. However, the present invention is not limited to this. The CPU 403 may determine the propriety of the position and the posture of the measurement head 200 on the basis of whether the present peak value is higher than a predetermined ratio (hereinafter referred to as threshold ratio) of the maximum peak value in the past. In this case, the user may be able to set the threshold ratio.

Figure 39:
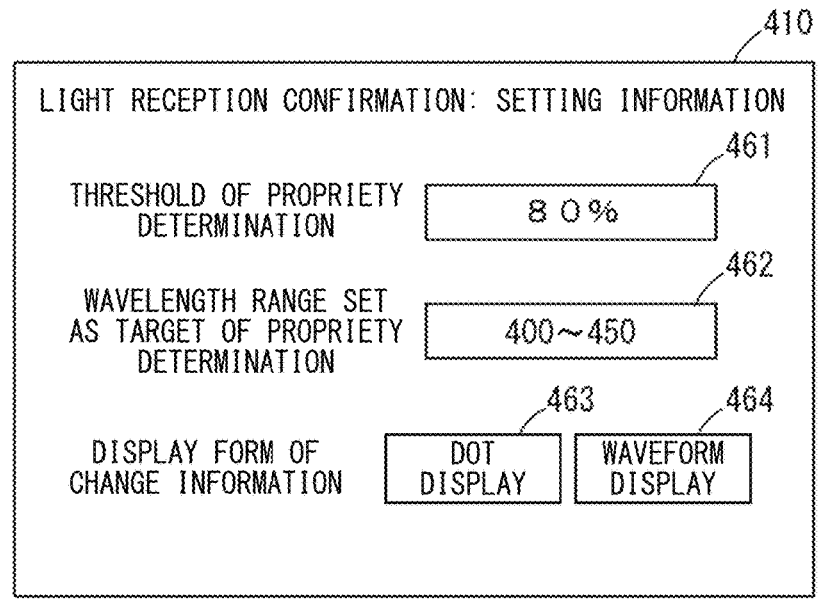
FIG. 39 is a diagram showing another example of an input screen for setting information displayed in the first display region shown in FIG. 12.

FIG. 39 is a diagram showing another example of an input screen of setting information displayed in the first display region 410 shown in FIG. 12. In the example shown in FIG. 39, an uppermost input field 461 is used by the user to designate the threshold ratio. The user inputs a desired ratio to the input field 461, whereby the input ratio is set as the threshold ratio.

Figure 40:
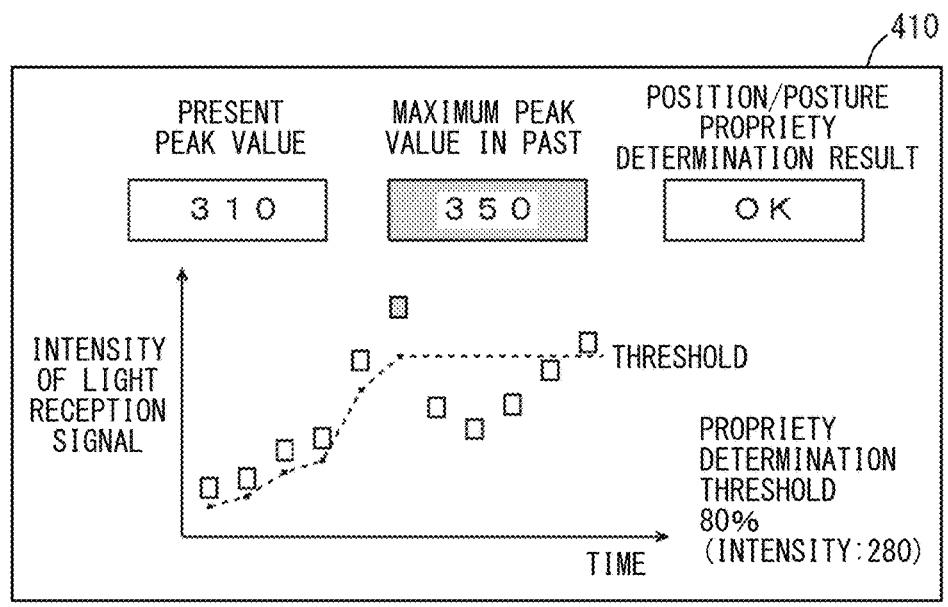
FIG. 40 is a diagram showing an example of change information displayed in the first display region shown in FIG. 12 by the light reception confirmation processing in a state in which a threshold ratio is set by a user.

FIG. 40 is a diagram showing an example of change information displayed in the first display region 410 shown in FIG. 12 by the light reception confirmation processing in a state in which the threshold ratio is set by the user. In the example shown in FIG. 40, as in the example shown in FIG. 16, a present peak value, a maximum peak value in the past, and a dot plot graph showing a change of peak values of light reception signals from a start of the light reception confirmation processing until the present point in time are displayed. A propriety determination result of the position and the posture of the measurement head 200 is also displayed.

Further, in this example, the threshold ratio set by the user is displayed in percentage. A value of the threshold ratio with respect to the maximum peak value in the past at the present point in time is displayed as a value of the intensity of a light reception signal. In the dot plot graph shown in FIG. 40, the threshold of the propriety determination, which changes every time the maximum peak value in the past is updated, is indicated by a dotted line.

(9) In the embodiments, as shown in FIGS. 16 to 21 and FIG. 40, the threshold with respect to the intensity of the light reception signal or the threshold ratio is displayed on the display device 401 in the light reception confirmation processing. However, the threshold may not be displayed. The user may be able to switch display and non-display of the threshold with an input from the operation section 402.

(10) In the examples shown in FIGS. 16, 17, 21, and 40, when a plot or a waveform fit in the screen is lower than the maximum peak value in the past and the maximum peak value in the past is present outside the screen according to the elapse of time involved in the adjustment, an indicator indicating the presence of the maximum peak value in the past may be shown in the intensity of a light reception signal equivalent to the maximum peak value in the past. The intensity of the light reception signal of the vertical axis may be normalized on the basis of the present peak value or the maximum peak value in the past up to the present point in time. For example, when the maximum peak value in the past is 80, the vertical axis may be configured such that 80 is located near an upper limit on the vertical axis of the light reception intensity. When the maximum peak value in the past increases to 350 according to the adjustment and the elapse of time, the vertical axis of the trend graph may be normalized such that 350 is located near the upper limit on the vertical axis of the light reception intensity.

[5] Correspondence Relation Between the Constituent Elements of Claims and the Sections in the Embodiments An example of correspondence between the constituent elements of claims and the sections in the embodiments is explained below. However, the present invention is not limited to the example explained below.

In the embodiments, the measurement object S is an example of the measurement object. The confocal displacement sensor 500 is an example of the confocal displacement sensor. The light projecting section 120 is an example of the light projecting section. The lens unit 220 is an example of the optical member. The distal end portions of the optical fibers 313 to 316 or the pinhole 373a is an example of the pinhole. The optical fibers 313 to 316 or the spatial filter 373 is an example of the pinhole member. The processing device 100 and the light guide section 300 are examples of the displacement measuring section.

The spectral sections 130 and 130A to 130D are an example of the spectral section. The light receiving sections 140 and 140A to 140D are an example of the light receiving section. The arithmetic processing section 150 is an example of the calculating section. The optical fibers 313 to 316 are an example of the first optical fiber. The optical switch 360 is an example of the switching section. The core 310a is an example of the core. The processing device 100 is an example of the processing device. The measurement head 200 is an example of the head section. The housings 110 and 210 are respectively examples of the first and second housings. The light source 121 is an example of the light source. The phosphor 122 is an example of the phosphor.

In the configuration shown in FIG. 1, the fiber couplers 320 and 330 and the optical fibers 312 to 318 are examples of the combining section. The fiber couplers 320 and 330 are respectively examples of the first and second fiber couplers. The optical fibers 311 and 312 are respectively examples of the second and third optical fibers. The optical fibers 317 and 318 are an example of the fourth optical fibers. In the configuration shown in FIG. 25, the fiber coupler 330 and the optical fibers 312 to 316 are examples of the combining section. The fiber coupler 330 is an example of the fiber coupler. The optical fibers 311 and 312 are respectively examples of the second and third optical fibers.

In the configuration shown in FIG. 26, the fiber couplers 320 and 340 and the optical fibers 312 to 318 are examples of the combining section. The fiber couplers 320 and 340 are respectively examples of the first and second fiber couplers. The optical fibers 311 and 312 are respectively examples of the second and third optical fibers. The optical fibers 317 and 318 are an example of the fourth optical fiber. In the configuration shown in FIG. 27, the fiber couplers 340 and 350 and the optical fibers 312 to 317 are examples of the combining sections. The fiber couplers 340 and 350 are respectively examples of the first and second fiber couplers. The optical fibers 311, 312, and 317 are respectively examples of the second to fourth optical fibers. In the configuration shown in FIG. 35, the fiber coupler 320 and the optical fibers 311A, 311B, 312A, 312B, and 313 to 316 are examples of the combining section.

As the constituent elements of claims, other various elements having the configurations and the functions described in claims can also be used.

The present invention can be effectively used for various confocal displacement sensors.

What is claimed is:
1. A confocal displacement sensor that measures displacement of a measurement object in a measurement region using a confocal optical system,
the confocal displacement sensor comprising:
a head unit including:
a first housing;

a plurality of pinholes corresponding to the confocal optical system, and disposed in the first housing; and an optical member disposed in the first housing, including a lens having a characteristic associated with a chromatic aberration along an optical axis direction, and configured to converge respective light outputted from the plurality of pinholes on different positions in the measurement region along the optical axis direction in accordance with a wavelength of the respective light;

a fiber assembly including:

a plurality optical fibers having a first end thereof, and the plurality optical fibers at the first end corresponding to the plurality of the pinholes of the head unit; and an optical coupler optically coupled to the plurality optical fibers; and a processing unit mechanically and optically coupled to the head unit via the fiber assembly, and including:

a second housing;

a light projecting section disposed in the second housing, and configured to emit light having a plurality of wavelengths, the light emitted from light projecting section being guided by the fiber assembly to the plurality of the pinholes of the head unit to irradiate the light through the plurality of the pinholes on a measurement object in the measurement region;

a spectral section disposed in the second housing, configured to receive light reflected by the measurement object through each of the plurality of pinholes of the head unit and the fiber assembly, and configured to spectrally disperse the light from the fiber assembly;

a light receiving section disposed in the second housing, and configured to receive the light spectrally dispersed by the spectral section and output an electric signal; and a calculating section disposed in the second housing, and configured to calculate the displacement of the measurement object on the basis of signal intensity for each wavelength of an average signal corresponding to an average of intensities for the each wavelength concerning a plurality of lights passed through the plurality of optical fibers, the signal intensity being based on the electric signal output from the light receiving section.

2. The confocal displacement sensor according to claim 1, wherein the light projecting section includes a laser light source; and a phosphor configured to absorb light emitted by the laser light source and discharge light having a wavelength different from a wavelength of the light emitted by the laser light source, and the light passed through the phosphor is entered to the optical fiber.

3. The confocal displacement sensor according to claim 1, wherein the processing unit includes the optical coupler configured to combine the plurality of lights passed through the plurality of optical fibers to thereby generate a combined light, and the spectral section is configured to spectrally disperse the light combined by the optical coupler, the light receiving section is configured to receive the light spectrally dispersed by the spectral section and output, as the average signal, the electric light reception signal indicating a light reception amount for each wavelength concerning the light combined by the optical coupler, and the calculating section is configured to calculate the displacement of the measurement object on the basis of the average signal output from the light receiving section.

4. The confocal displacement sensor according to claim 1, wherein the spectral section is configured to respectively spectrally disperse the plurality of lights passed through the plurality of pinholes, the light receiving section is configured to respectively receive the plurality of lights spectrally dispersed by the spectral section and output a plurality of electric light reception signals indicating light reception amounts for each wavelength concerning the respective plurality of lights passed through the plurality of pinholes, and the calculating section is configured to average or integrate, for each wavelength, the plurality of light reception signals output from the light receiving section to thereby calculate the average signal as signal intensity for the each wavelength and calculate the displacement of the measurement object on the basis of the calculated average signal.

5. The confocal displacement sensor according to claim 1, wherein the processing unit includes a switching section configured to switch irradiation and non-irradiation on the measurement object of the light converged by the optical member such that the plurality of lights are sequentially irradiated on the measurement object, and the spectral section is configured to respectively spectrally disperse the plurality of lights sequentially passed through the plurality of pinholes after being irradiated on the measurement object by the switching section;

the light receiving section is configured to receive, in a single exposure period, the plurality of lights spectrally dispersed by the spectral section and output, as the average signal, an electric light reception signal indicating a light reception amount for each wavelength concerning the received lights; and the calculating section is configured to calculate the displacement of the measurement object on the basis of the average signal output from the light receiving section.

6. The confocal displacement sensor according to claim 1, wherein the processing unit includes a switching section configured to switch irradiation and non-irradiation on the measurement object of the light converged by the optical member such that the plurality of lights are sequentially irradiated on the measurement object, and the spectral section is configured to respectively spectrally disperse the plurality of lights sequentially passed through the plurality of pinholes after being irradiated on the measurement object by the switching section;

the light receiving section is configured to respectively receive the plurality of lights spectrally dispersed by the spectral section and output a plurality of electric light reception signals indicating light reception amounts for each wavelength concerning the respective plurality of lights passed through the plurality of pinholes; and the calculating section is configured to average or integrate, for each wavelength, the plurality of light reception signals output from the light receiving section to thereby calculate an average signal as signal intensity for the each wavelength and calculate the displacement of the measurement object on the basis of the calculated average signal.

7. The confocal displacement sensor according to claim 1, wherein the plurality of optical fibers are disposed side by side in a plane crossing an optical path at the first end in the head section.

8. The confocal displacement sensor according to claim 1, wherein the light receiving section includes a plurality of light receiving sections, the plurality of light receiving sections configured to receive the light spectrally dispersed by the spectral section and output an electric signal, respectively, and the calculating section is configured to calculate the average signal corresponding to the average of intensities for the each wavelength based on the electric signals output from the plurality of light receiving sections, and calculate the displacement of the measurement object based on the average signal.

9. The confocal displacement sensor according to claim 1, further comprising, a display device connected to the processing unit and configured to display a waveform based on the average signal outputted from the calculating section.

10. The confocal displacement sensor according to claim 9, wherein the light receiving section is configured to receive the light which includes an unnecessary component, the calculating section is configured to calculate signal intensity for each wavelength of the average signal after removing the unnecessary component, and the display device is configured to display the waveform based on the average signal which unnecessary component is removed from.

11. The confocal displacement sensor according to claim 1, wherein the optical member causing the chromatic aberration along the optical axis direction includes a diffraction lens.

12. The confocal displacement sensor according to claim 11, wherein the optical member further includes an objective lens.

13. The confocal displacement sensor according to claim 1, wherein the fiber assembly further includes a second coupler optically coupled to the plurality optical fibers.

* * * * *